US008175993B2

(12) United States Patent  
Izuno et al.

(10) Patent No.: US 8,175,993 B2  
(45) Date of Patent: May 8, 2012

(54) COMPUTER-READABLE STORAGE MEDIUM HAVING INFORMATION PROCESSING PROGRAM STORED THEREON AND INFORMATION PROCESSING APPARATUS

(75) Inventors: Toshiharu Izuno, Kyoto (JP); Satoshi Kira, Kyoto (JP); Yuichi Kimura, Shibuya-ku (JP); Tomokazu Mizuno, Shibuya-ku (JP)

(73) Assignees: Nintendo Co., Ltd., Kyoto (JP); Kabushiki Kaisha Taito, Tokyo (JP)

( * ) Notice: Subject to any disclaimer, the term of this patent is extended or adjusted under 35 U.S.C. 154(b) by 596 days.

(21) Appl. No.: 12/406,480

(22) Filed: Mar. 18, 2009

(65) Prior Publication Data

US 2009/0241038 A1    Sep. 24, 2009

(30) Foreign Application Priority Data

Mar. 24, 2008    (JP) ................................. 2008-076739

(51) Int. Cl.  
*G06F 17/00* (2006.01)  
*G06N 5/00* (2006.01)

(52) U.S. Cl. ....................................................... 706/45
(58) Field of Classification Search ..................... 706/45  
See application file for complete search history.

(56) References Cited

U.S. PATENT DOCUMENTS

| | | | |
|---|---|---|---|
| 7,209,872 B2 * | 4/2007 | Kawakami | 703/7 |
| 7,585,225 B2 * | 9/2009 | Minagawa | 463/33 |
| 7,606,689 B2 * | 10/2009 | Kawakami | 703/7 |
| 7,815,509 B2 * | 10/2010 | Yamaya et al. | 463/46 |

FOREIGN PATENT DOCUMENTS

JP    2006-305176    11/2006

* cited by examiner

*Primary Examiner* — Michael B Holmes  
(74) *Attorney, Agent, or Firm* — Nixon & Vanderhye P.C.

(57) ABSTRACT

An instruction target object which is located outside a predetermined area of a virtual space is detected at an interval of the unit time, and a substitute icon associated with the instruction target object is displayed in a screen. Next, after it is detected that a first operation has been performed on the substitute icon from the operation data, it is detected that a second operation has also been performed. Based on the pointed position in the screen when the second operation was detected, the instruction target object associated with the substitute icon processed by the first operation is caused to perform a predetermined motion.

38 Claims, 33 Drawing Sheets

F I G. 3
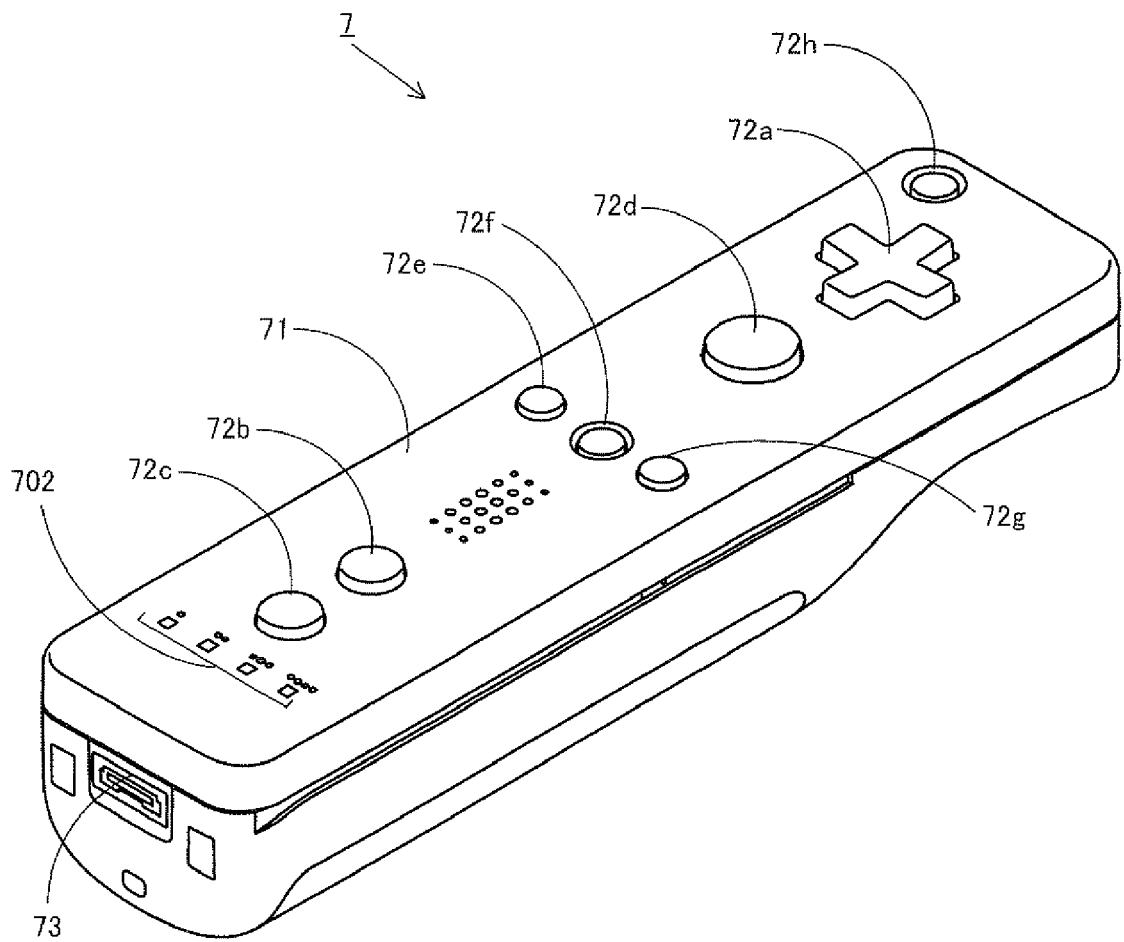
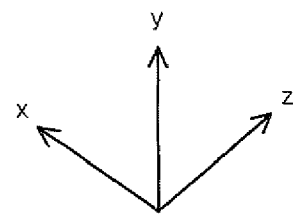

F I G. 5
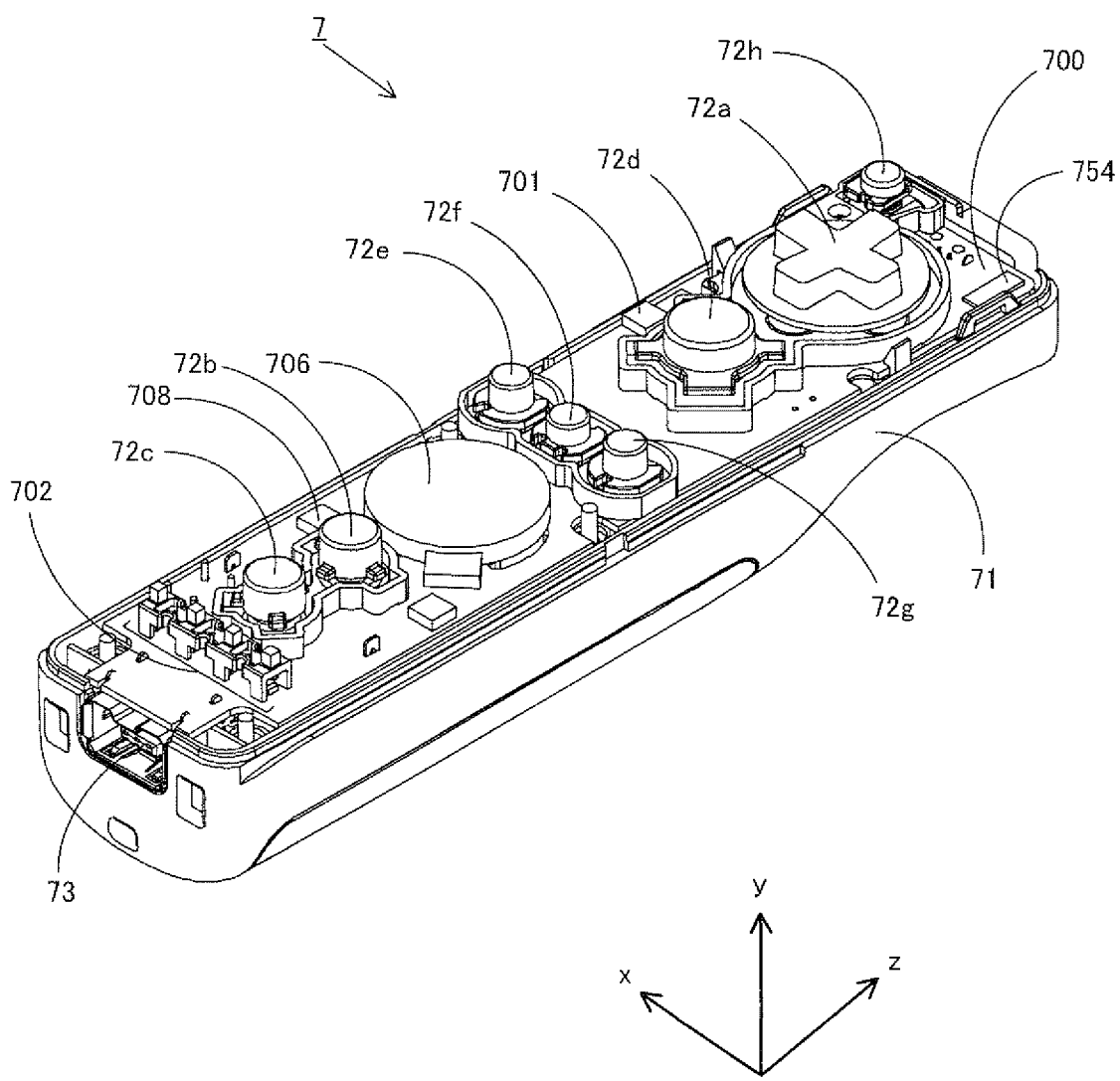

F I G. 1 8
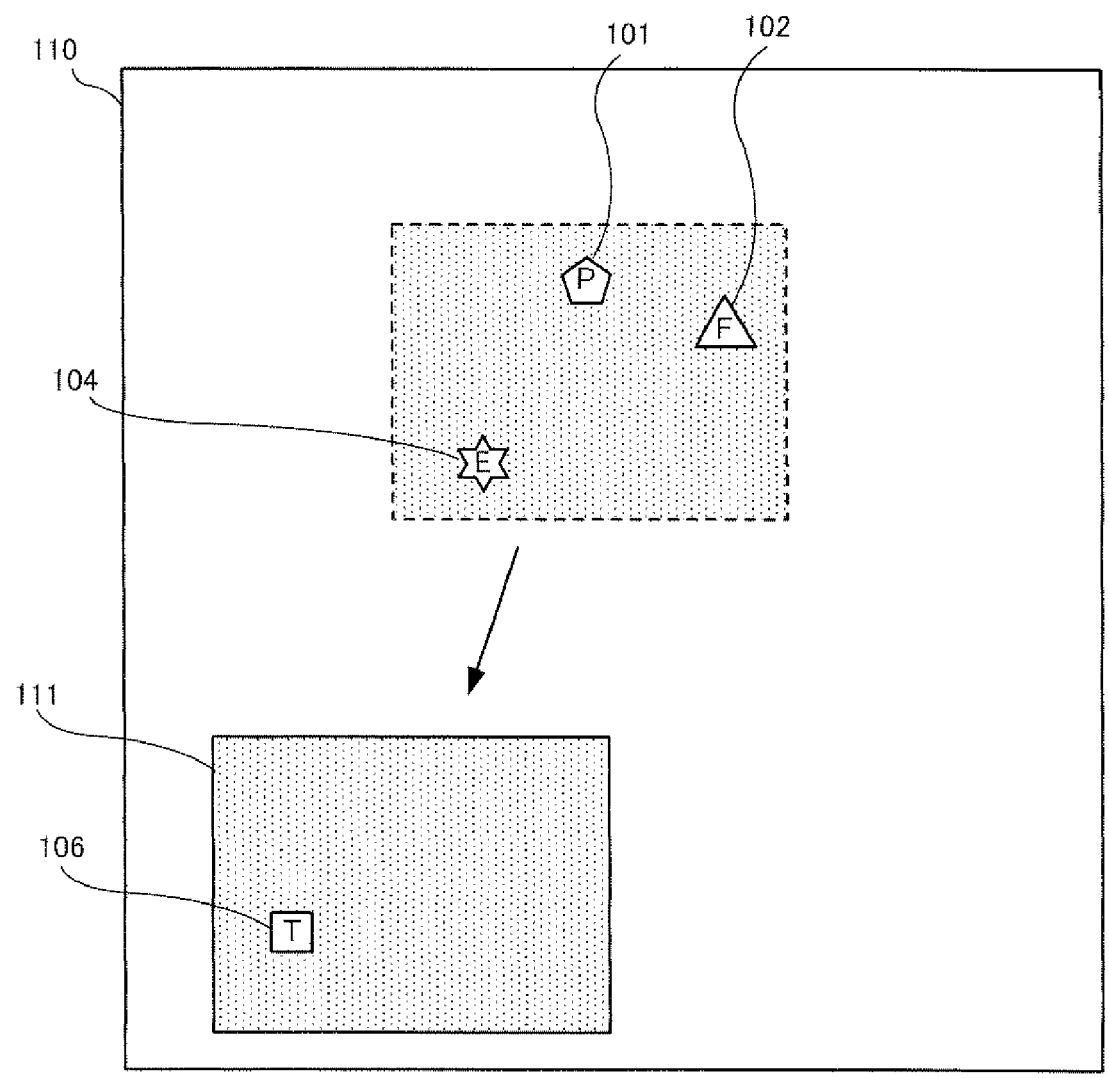

F I G. 2 2
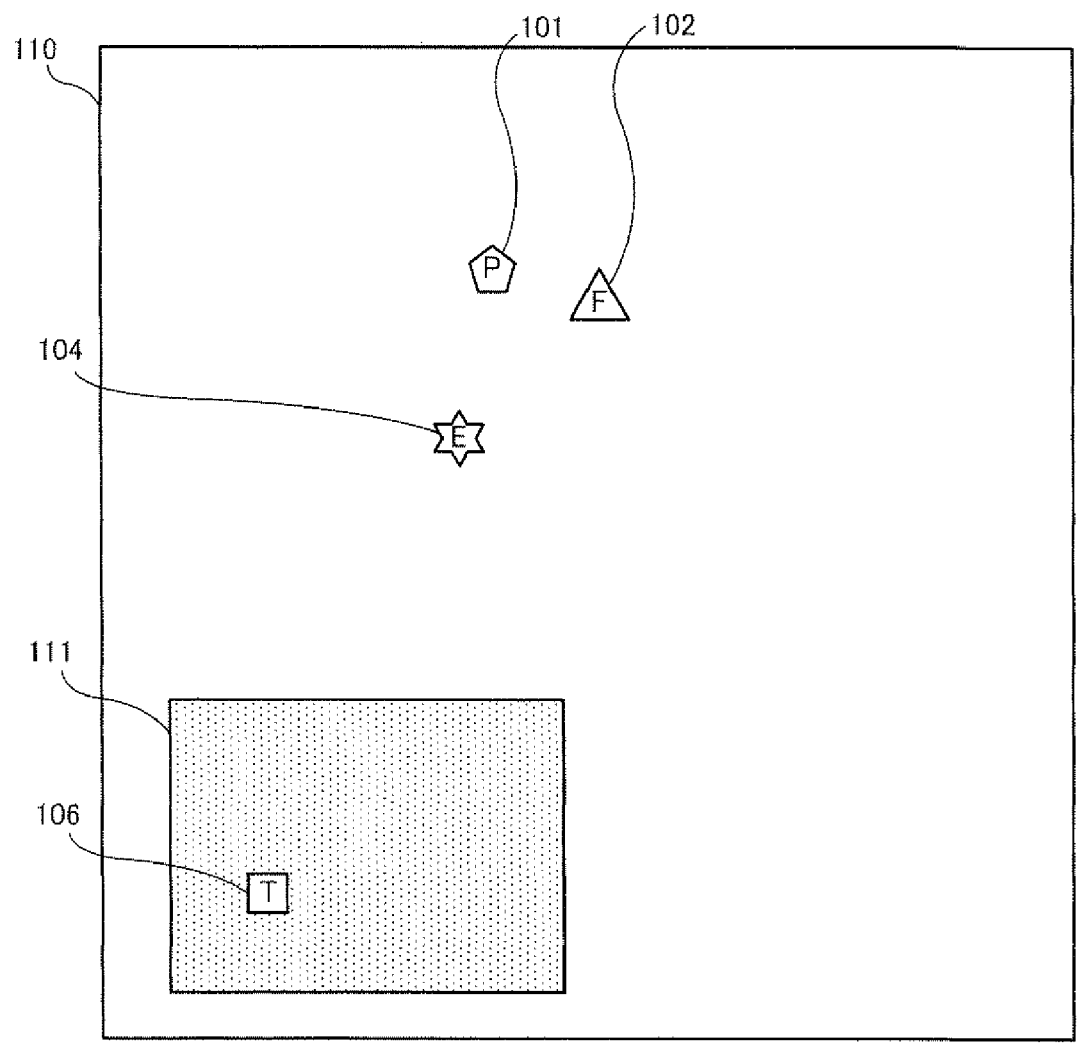

F I G. 3 7
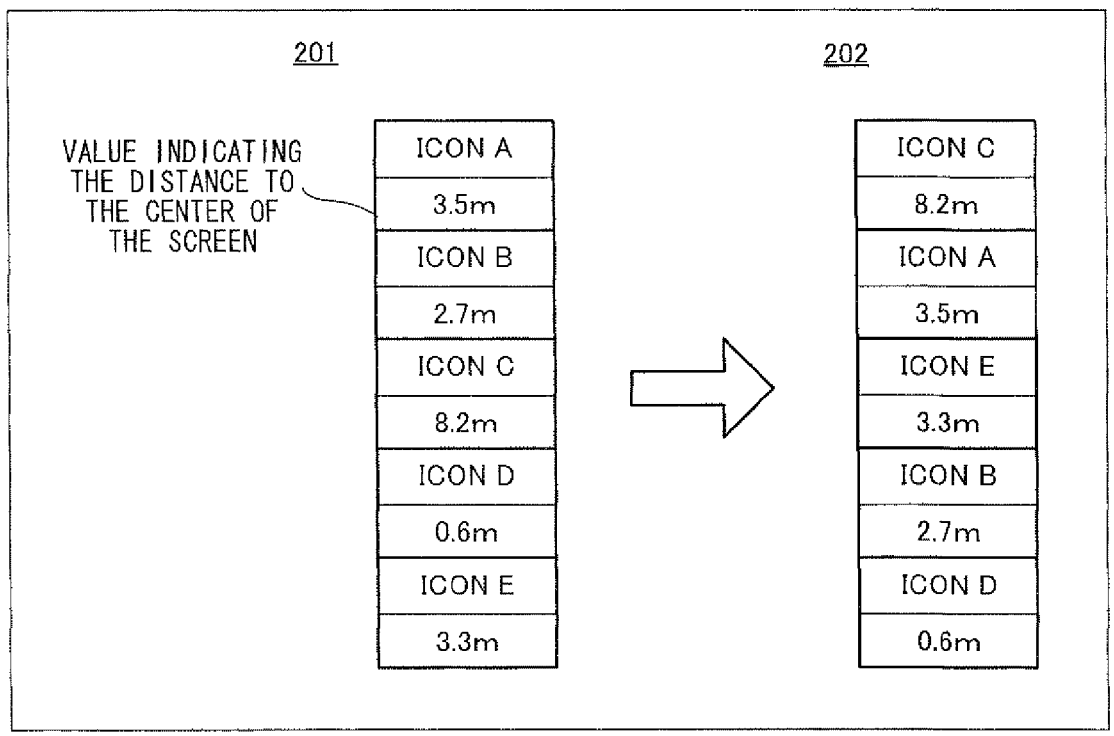

F I G. 4 0
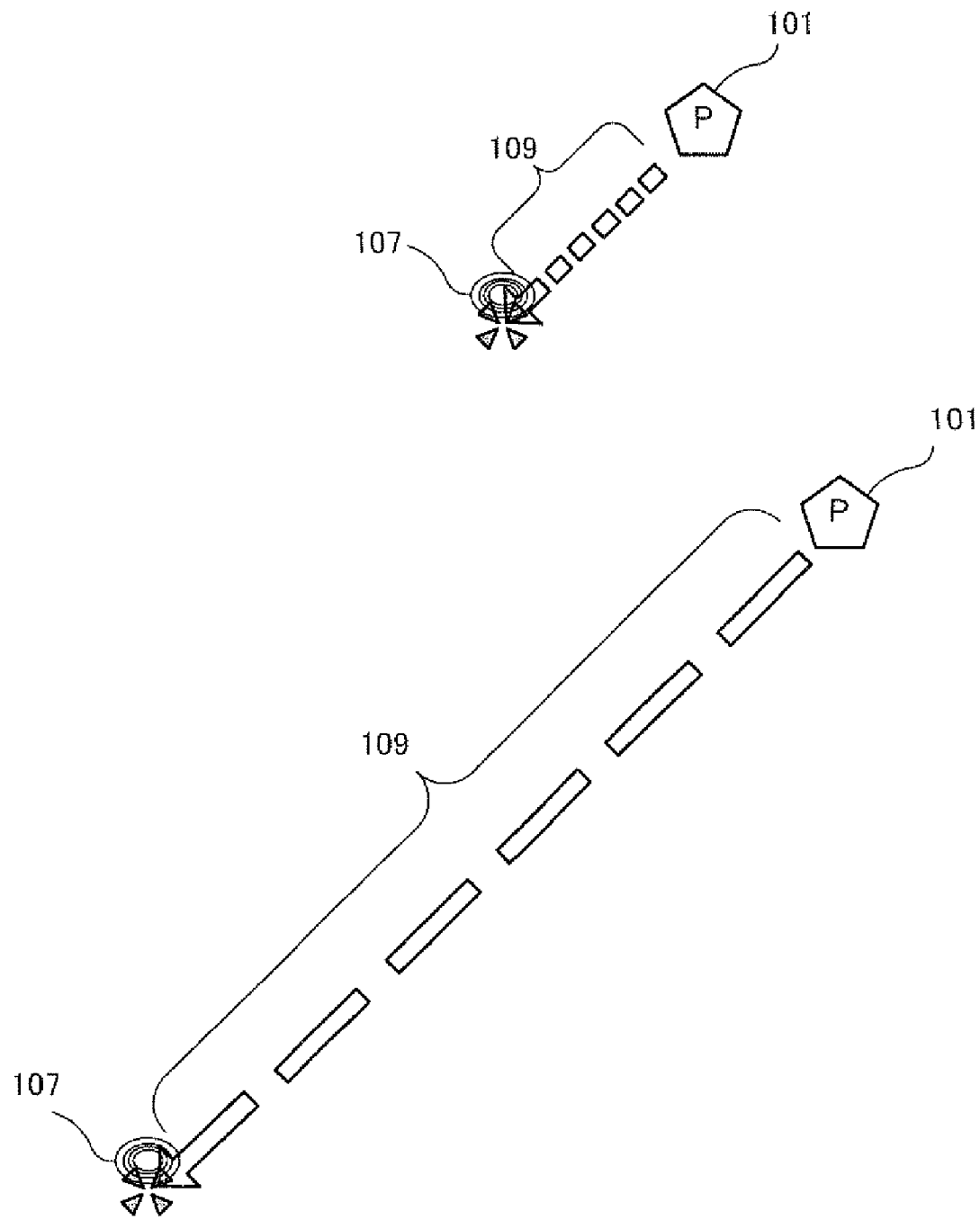

COMPUTER-READABLE STORAGE MEDIUM HAVING INFORMATION PROCESSING PROGRAM STORED THEREON AND INFORMATION PROCESSING APPARATUS

CROSS REFERENCE TO RELATED APPLICATION

The disclosure of Japanese Patent Application No. 2008-76739, filed on Mar. 24, 2008, is incorporated herein by reference.

FIELD

The technology herein relates to information processing of displaying a virtual space at an interval of a unit time, and more specifically to operation processing of a player in information processing of displaying a virtual space containing at least one instruction target object which performs a predetermined motion based on the operation of the player.

BACKGROUND AND SUMMARY

Conventionally, games represented by simulation games or the like, in which a player manipulates a plurality of characters (units) are known. For such a game, a game apparatus which displays characters operable by the player on a screen as icons and allows the player to change (switch) the character to manipulate using such an icon is disclosed (for example, Japanese Laid-Open Patent Publication No. 2006-305176).

According to the above game apparatus, any one of a plurality of characters operable by the player (hereinafter, such characters will be referred to as the "ally characters") is set as an operation target. The game apparatus displays the icons representing the ally characters, which are not displayed on the screen, at the right bottom corner of the screen. The player may select one of the icons with a cross key or the like and press a predetermined button to set the alley character represented by the selected icon as the operation target. In accompaniment with this operation of changing the operation target, the settings on a virtual camera are changed to the settings based on the selected character, and the game screen is switched to display the selected character.

However, the above-described game apparatus has the following problems where, for example, the above-described technology is applied to a game such as an RTS (Real-time Strategy) game. The above-described icon selection operation allows the ally character as the operation target to be switched and also allows the game screen to be switched accordingly. However, an instruction to attack an enemy character, for example, needs to be issued again after the game screen is switched. Now, it is assumed that an instruction to attack an enemy character located far in the game space is to be issued. In this case, the enemy character located far needs to be specified as an attack target. Before specifying the attack target, it is necessary to switch the game screen by the above-mentioned icon selection, and then, for example, scroll the screen until the enemy character as the attack target is displayed. Such an operation flow is troublesome in a game such as an RTS game in which operations close to real-time operations are enjoyable and quick operations are required to play the game advantageously. Such a troublesome operation makes it difficult for the player to enjoy the game.

Therefore, an object of certain example embodiments provide a computer-readable storage medium having an information processing program stored thereon and an information processing apparatus for improving the operability of information processing in, for example, a game of operating a plurality of characters.

Certain example embodiments have the following features to attain the object mentioned above. The reference numerals, additional explanations and the like in parentheses in this section of the specification indicate the correspondence with the embodiments described later for easier understanding, and do not limit the present invention in any way.

A first aspect of certain example embodiments is directed to a computer-readable storage medium having stored thereon an information processing program to be executed by a computer of an information processing apparatus for displaying, in a screen (2) at an interval of a unit time, a virtual space containing at least one instruction target object which performs a predetermined motion based on an operation of a player. The information processing program causes the computer to perform an outside-the-area object detection step (S11), a substitute icon display step (S12), a pointed position calculation step (S63), a first operation detection step (S61), a second operation detection step (S71), and a motion execution step (S74, S76). The outside-the-area object detection step detects, at an interval of the unit time, the instruction target object which is located outside a predetermined area of the virtual space. The substitute icon display step, when the instruction target object which is located outside the predetermined area is detected in the outside-the-area object detection step, displays a substitute icon associated with the instruction target object in the screen. The pointed position calculation step obtains operation data from an operation device (7) at an interval of the unit time and calculating a pointed position on the screen pointed to by the operation device based on the operation data. The first operation detection step detects, from the operation data, that a first operation has been performed on the substitute icon. The second operation detection step detects, from the operation data, that a second operation has been performed after the first operation was detected in the first operation detection step. The motion execution step causes the instruction target object associated with the substitute icon processed by the first operation to perform a predetermined motion based on the pointed position when the second operation was detected in the second operation detection step.

According to the first aspect, the operability of the instruction operation on the instruction target object can be improved.

In a second aspect based on the first aspect, the outside-the-area object detection step performs the detection where an area displayed in the screen is set as the predetermined area.

According to the second aspect, even when the instruction target object is not displayed in the screen, the player can quickly issue an instruction to the instruction target object using the substitute icon. This can improve the operability.

In a third aspect based on the first aspect, the motion execution step moves the instruction target object associated with the substitute icon processed by the first operation to a position in the virtual space corresponding to the pointed position.

According to the third aspect, even when, for example, the instruction target object is not displayed in the screen, the player can move the instruction target object to a spot in the virtual space displayed in the screen by a simple and quick operation.

In a fourth aspect based on the first aspect, the motion execution step causes the instruction target object to perform a predetermined motion on an object located at a position in the virtual space corresponding to the pointed position.

According to the fourth aspect, even when, for example, the instruction target object is not displayed in the screen, the player can cause the instruction target object to perform a predetermined motion (attack motion, etc.) on a predetermined object displayed on the screen, by a simple and quick operation.

In a fifth aspect based on the first aspect, the substitute icon display step displays the substitute icon at a position in the screen closest to the instruction target object associated with the substitute icon.

According to the fifth aspect, the player is allowed to intuitively perceive the position of the instruction target object in the virtual space.

In a sixth aspect based on the fifth aspect, the substitute icon display step displays a plurality of the substitute icons while adjusting display positions thereof so that the substitute icons do not cross each other.

According to the sixth aspect, even when a plurality of substitute icons are displayed in the screen, each substitute icon can be easily pointed to and thus the operability can be improved.

In a seventh aspect based on the first aspect, the information processing program further causes the computer to execute a line display step (S67) of generating a line connecting the instruction target object associated with the substituted icon processed by the first operation and a position in the virtual space corresponding to the pointed position and displays the line on the screen, after the first operation is detected before the second operation is detected.

According to the seventh aspect, when there are a plurality of instruction target objects, the player is allowed to intuitively perceive to which instruction target object he/she is about to issue an instruction.

In an eighth aspect based on the seventh aspect, the line display step displays information regarding a distance between the substituted icon or the instruction target object associated with the substituted icon and the position in the virtual space corresponding to the pointed position.

According to the eighth aspect, the player is allowed to intuitively perceive a distance, for example, how far the instruction target object is in the virtual space.

In a ninth aspect based on the first aspect, the operation device includes at least one key; the first operation detection step detects that a predetermined key among the at least one key has been pressed in the state where the substitute icon and the pointed position overlap each other, as the first operation based on the operation data; and the second operation detection step detects that the pressed state of the key predetermined detected as the first operation has been cancelled, as the second operation based on the operation data.

According to the ninth aspect, an operation method which can be performed simply and intuitively can be provided to the player.

In a tenth aspect based on the first aspect, the operation device includes imaging means for imaging an imaging target; the operation data includes at least any of data on a taken image imaged by the imaging means, data representing two predetermined positions of the imaging target in the taken image, and data representing a position of the imaging target in the taken image; and the pointed position calculation step calculates the pointed position from any of the data on the taken image imaged by the imaging means, the data representing two predetermined positions of the imaging target in the taken image, and the data representing the position of the imaging target in the taken image, which are obtained from the operation device.

According to the tenth aspect, an operation method which can be performed intuitively can be provided to the player for pointing to a position on the screen.

In an eleventh aspect based on the first aspect, the operation device includes an analog stick, which is an analog system direction pointing device; and the information processing program further causes the computer to execute a stick scroll step of scrolling the screen in accordance with a direction pointed by the analog stick.

In a twelfth aspect based on the first aspect, the information processing program further causes the computer to execute a screen end scroll step of determining whether or not the pointed position overlaps a predetermined area including any of top, bottom, right and left ends of the screen, and when the pointed position overlaps, scrolling the screen in accordance with the direction represented by the end included in the overlapping predetermined area.

According to the eleventh and twelfth aspects, the operability of scrolling the screen can be improved.

In a thirteenth aspect based on the first aspect, the substitute icon display step displays, as attached to the substitute icon, information based on a parameter representing a state of the instruction target object associated with the substitute icon.

According to the thirteenth aspect, the state of, for example, an instruction target object which is not displayed in the screen can be quickly grasped.

In a fourteenth aspect based on the first aspect, the virtual space contains at least one related object associated with the instruction target object; and the motion execution step causes the instruction target object and also the related object to execute the predetermined motion.

According to the fourteenth aspect, an instruction can be issued to a group of a plurality of objects at the same time.

In a fifteenth aspect based on the fourteenth aspect, the substitute icon display step displays, as attached to the substitute icon, information on the number of the related objects associated with the instruction target object.

According to the fifteenth aspect, increase or decrease of the number of objects related to an instruction target object which is not displayed in the screen can be intuitively grasped.

In a sixteenth aspect based on the first aspect, the information processing program further causes the computer to execute an action information display step (S65) of, when the first operation is detected, providing an action information display representing an action which can be taken by the instruction target object, associated with the substitute icon processed by the first operation, on an object displayed in the screen other than the instruction target object, the an action information display being provided as overlapping the object other than the instruction operation object.

According to the sixteenth aspect, the player is allowed to intuitively perceive what type of action can be taken on which object by the instruction target object when the player performs the first operation.

A seventeenth aspect of certain example embodiments is directed to an information processing apparatus for displaying, in a screen (2) at an interval of a unit time, a virtual space containing at least one instruction target object which performs a predetermined motion based on an operation of a player. The information processing program comprises outside-the-area object detection means (10), substitute icon display means (10), pointed position calculation means (10), first operation detection means (10), second operation detection means (10), and motion execution means (10). The outside-the-area object detection means detects, at an interval of the unit time, the instruction target object which is located outside a predetermined area of the virtual space. The substitute icon display means, when the instruction target object which is located outside the predetermined area is detected by the outside-the-area object detection means, displays a substitute icon associated with the instruction target object in the screen. The pointed position calculation means obtains operation data from an operation device (7) at an interval of the unit time and calculating a pointed position on the screen pointed to by the operation device based on the operation data. The first operation detection means detects that a first operation has been performed on the substitute icon. The second operation detection means detects that a second operation different from the first operation has been performed after the first operation was detected by the first operation detection means. The motion execution means causes the instruction target object associated with the substitute icon processed by the first operation to perform a predetermined motion based on the pointed position when the second operation was detected by the second operation detection means.

In an eighteenth aspect based on the seventeenth aspect, the outside-the-area object detection means performs the detection where an area displayed on the screen is set as the predetermined area.

In a nineteenth aspect based on the seventeenth aspect, the motion execution means moves the instruction target object associated with the substitute icon processed by the first operation to a position in the virtual space corresponding to the pointed position.

In a twentieth aspect based on the seventeenth aspect, the motion execution means causes the instruction target object to perform a predetermined motion on an object located at a position in the virtual space corresponding to the pointed position.

In a twenty-first aspect based on the seventeenth aspect, the substitute icon display means displays the substitute icon at a position in the screen closest to the instruction target object associated with the substitute icon.

In a twenty-second aspect based on the twenty-first aspect, the substitute icon display means displays a plurality of the substitute icons while adjusting display positions thereof so that the substitute icons do not cross each other.

In a twenty-third aspect based on the seventeenth aspect, the information processing apparatus further comprises line display means for generating a line connecting the instruction target object associated with the substituted icon processed by the first operation and a position in the virtual space corresponding to the pointed position and displays the line on the screen, after the first operation is detected before the second operation is detected.

In a twenty-fourth aspect based on the twenty-third aspect, the line display means displays information regarding a distance between the substituted icon or the instruction target object associated with the substituted icon and the position in the virtual space corresponding to the pointed position.

In a twenty-fifth aspect based on the seventeenth aspect, the operation device includes at least one key; the first operation detection means detects that a predetermined key among the at least one key has been pressed in the state where the substitute icon and the pointed position overlap each other, as the first operation based on the operation data; and the second operation detection means detects that the pressed state of the predetermined key detected as the first operation has been cancelled, as the second operation based on the operation data.

In a twenty-sixth aspect based on the seventeenth aspect, the operation device includes imaging means for imaging an imaging target; the operation data includes at least any of data on a taken image imaged by the imaging means, data representing two predetermined positions of the imaging target in the taken image, and data representing a position of the imaging target in the taken image; and the pointed position calculation means calculates the pointed position from any of the data on the taken image imaged by the imaging means, the data representing two predetermined positions of the imaging target in the taken image, and the data representing the position of the imaging target in the taken image, which are obtained from the operation device.

In a twenty-seventh aspect based on the seventeenth aspect, the operation device includes an analog stick, which is an analog system direction pointing device; and the information processing apparatus further comprises stick scroll means for scrolling the screen in accordance with a direction pointed by the analog stick.

In a twenty-eighth aspect based on the seventeenth aspect, the information processing apparatus further comprises screen end scroll means for determining whether or not the pointed position overlaps a predetermined area including any of top, bottom, right and left ends of the screen, and when the pointed position overlaps, scrolling the screen in accordance with the direction represented by the end included in the overlapping predetermined area.

In a twenty-ninth aspect based on the seventeenth aspect, the substitute icon display means displays, as attached to the substitute icon, information based on a parameter representing a state of the instruction target object associated with the substitute icon.

In a thirtieth aspect based on the seventeenth aspect, the virtual space contains at least one related object associated with the instruction target object; and the motion execution means causes the instruction target object and also the related object to execute the predetermined motion.

In a thirty-first aspect based on the thirtieth aspect, the substitute icon display means displays, as attached to the substitute icon, information on the number of the related objects associated with the instruction target object.

In a thirty-second aspect based on the seventeenth aspect, the information processing apparatus further comprises action information display means for, when the first operation is detected, providing an action information display representing an action which can be taken by the instruction target object, associated with the substitute icon processed by the first operation, on an object displayed in the screen other than the instruction target object, the an action information display being provided as overlapping the object other than the instruction operation object.

According to the seventeenth through thirty-second aspects, substantially the same effects as those of the computer-readable storage medium having stored thereon an information processing program according to the above-described aspects can be provided.

A thirty-third aspect of certain example embodiments is directed to a computer-readable storage medium having stored thereon an information processing program to be executed by a computer of an information processing apparatus for displaying, in a screen at an interval of a unit time, a virtual space containing at least one instruction target object which performs a predetermined motion based on an operation of a player. The information processing program causes the computer to perform an outside-the-area object detection step (S11), a substitute icon display step (S12), and a motion execution step (S74, S76). The outside-the-area object detection step detects, at an interval of the unit time, the instruction target object which is located outside a predetermined area of the virtual space. The substitute icon display step, when the instruction target object which is located outside the predetermined area is detected in the outside-the-area object detection step, displays a substitute icon associated with the instruction target object in the screen, and when there are a plurality of the substitute icons, displays the substitute icons while adjusting display positions thereof so that the substitute icons do not cross each other. The motion execution step of causes the instruction target object associated with the substitute icon to perform a predetermined motion based on a predetermined operation.

A thirty-fourth aspect of certain example embodiments is directed to an information processing apparatus for displaying, in a screen at an interval of a unit time, a virtual space containing at least one instruction target object which performs a predetermined motion based on an operation of a player. The information processing apparatus comprises outside-the-area object detection means (10), substitute icon display means (10), and motion execution means (10). The outside-the-area object detection means detects, at an interval of the unit time, the instruction target object which is located outside a predetermined area of the virtual space. The substitute icon display means, when the instruction target object which is located outside the predetermined area is detected by the outside-the-area object detection means, displays a substitute icon associated with the instruction target object in the screen, and when there are a plurality of the substitute icons, displaying the substitute icons while adjusting display positions thereof so that the substitute icons do not cross each other. The motion execution means causes the instruction target object associated with the substitute icon to perform a predetermined motion based on a predetermined operation.

According to the thirty-third and thirty-fourth aspects, even when a plurality of substitute icons are displayed in the screen, each substitute icon can be easily pointed to and thus the operability can be improved.

According to certain example embodiments, an instruction operation by the player to the instruction target object can be made more simply and more quickly, and thus the operability can be improved.

These and other objects, features, aspects and advantages will become more apparent from the following detailed description when taken in conjunction with the accompanying drawings.

BRIEF DESCRIPTION OF THE DRAWINGS

FIG. 3 is an isometric view of a controller 7 shown in FIG. 1 seen from the top rear side thereof;

FIG. 5 is an isometric view of the controller 7 shown in FIG. 3 in the state where an upper housing is removed;

FIG. 18 shows the relationship between the entire virtual game space and the area displayed on the screen;

FIG. 22 shows the relationship between the entire virtual game space and the area displayed on the screen;

FIG. 37 shows an example of icon lists;

FIG. 40 shows examples of a dashed line locus;

DESCRIPTION

Hereinafter, embodiments will be described with reference to the drawings. These embodiments do not limit the present invention in any way.

(Overall Structure of the Game System)

Figure 1:
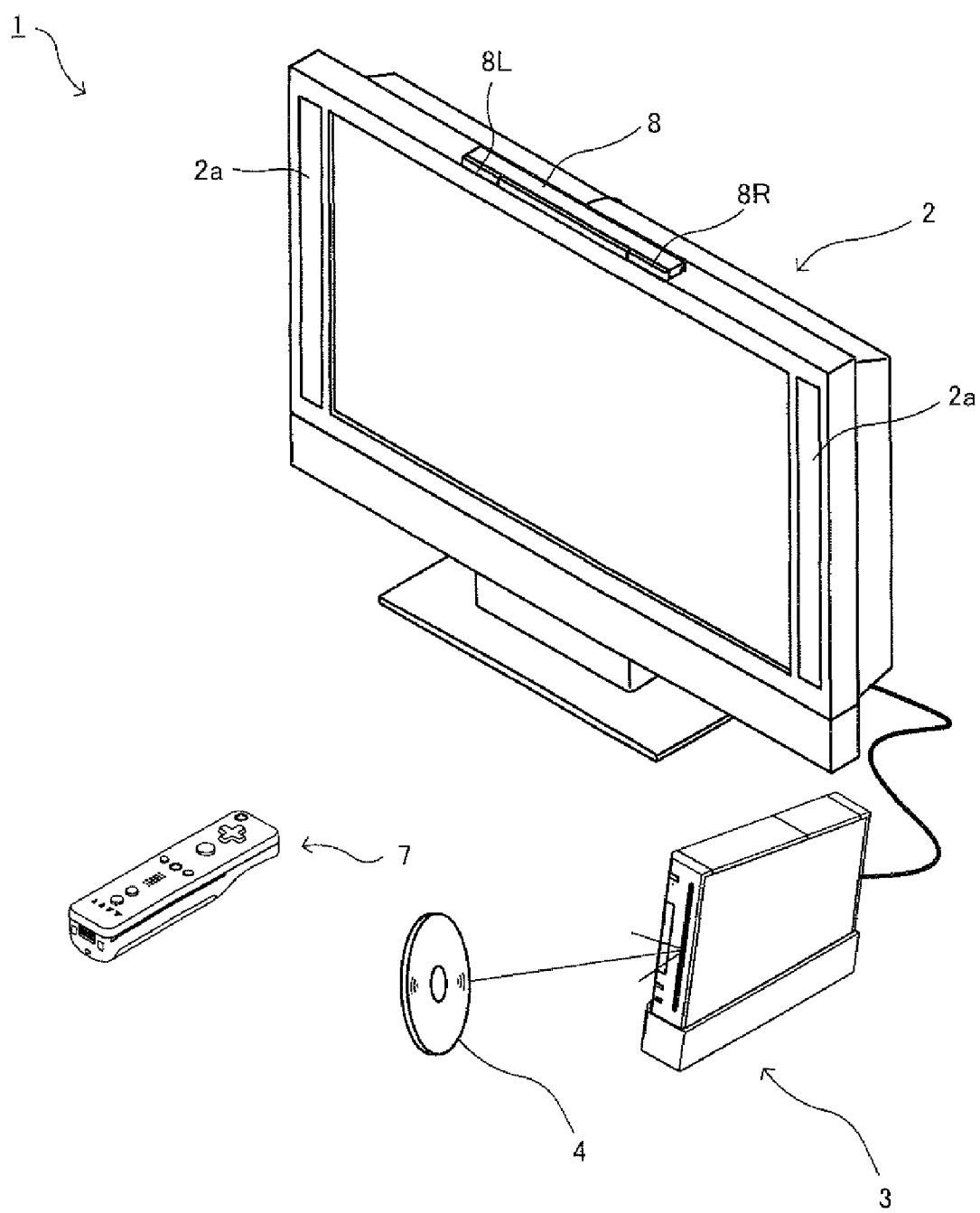
FIG. 1 is an external view of a game system 1 according to an embodiment.

With reference to FIG. 1, a game system 1 including a game apparatus 3 according to an embodiment will be described. FIG. 1 is an external view of the game system 1. Hereinafter, a game apparatus and a game program according to this embodiment will be described. In the following example, the game apparatus 3 is of an installation type. As shown in FIG. 1, the game system 1 includes a TV receiver 2 (hereinafter, referred to simply as a "TV") 2, the game apparatus 3, an optical disc 4, a controller 7, and a marker section 8. In the game system 1, game processing is executed by the game apparatus 3 based on a game operation performed using the controller 7.

On the game apparatus 3, the optical disc 4 is detachably mountable as an exemplary information storage medium exchangeably usable for the game apparatus 3. The optical disc 4 has stored thereon a game program to be executed by the game apparatus 3. The game apparatus 3 has an insertion opening for mounting the optical disc 4 on a front surface thereof. The game apparatus 3 reads and executes the game program stored on the optical disc 4 inserted into the insertion opening, and thus performs the game processing.

The game apparatus 3 is connected to the TV 2 as an exemplary display device via a connection cord. The TV 2 displays a game image obtained as a result of the game processing executed by the game apparatus 3. The marker section 8 is provided in the vicinity of a display screen of the TV 2 (above the display screen in FIG. 1). The marker section 8 includes two markers 8R and 8L respectively at two ends thereof. Specifically, the marker 8R (also the marker 8L) includes at least one infrared LED, and outputs infrared light forward from the TV 2. The marker section 8 is connected to the game apparatus 3, and the game apparatus 3 can control each of the infrared LEDs to be lit up or out.

The controller 7 is an input device for providing the game apparatus 3 with operation data indicating the particulars of the operation made on the controller 7 itself. The controller 7 and the game apparatus 3 are wirelessly communicable to each other. In this embodiment, the controller 7 and the game apparatus 3 are communicable to each other by, for example, the Bluetooth (registered trademark) technology. In other embodiments, the controller 7 and the game apparatus 3 may be connected with each other in a wired manner.

(Internal Structure of the Game Apparatus 3)

Figure 2:
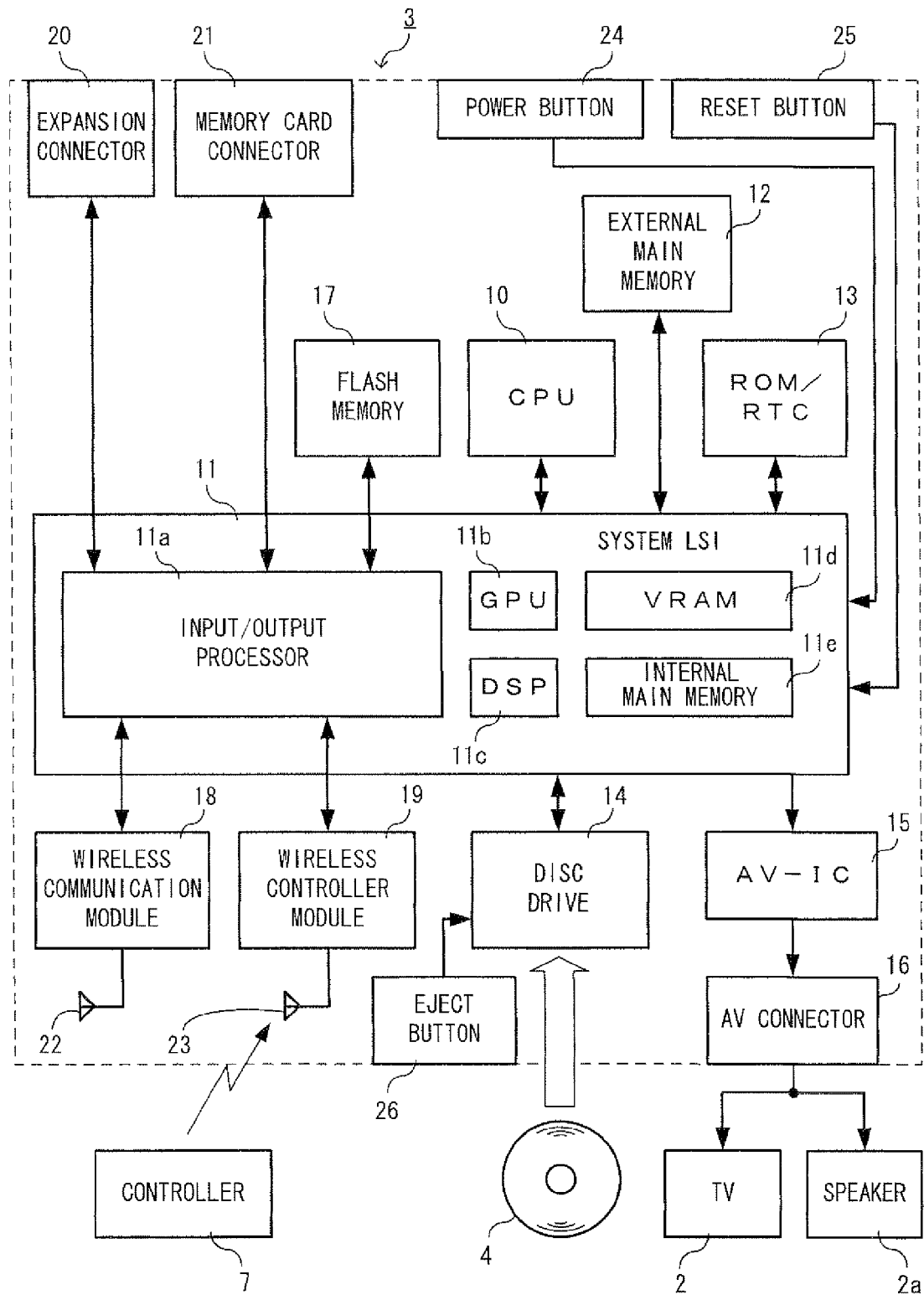
FIG. 2 is a functional block diagram of a game apparatus 3 included in the game system 1 shown in FIG. 1.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing the game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11, for example, controls data transfer between the elements connected thereto, generates images to be displayed, and obtains data from external devices. An internal structure of the system LSI 11 will be described later. The external main memory 12, which is volatile, has stored thereon programs including the game program read from the optical disc 4 or from a flash memory 17, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory 11e or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected with each other via an internal bus.

The GPU 11b is a part of drawing means and generates an image in accordance with a graphics command (a command to draw an image) from the CPU 10. More specifically, the GPU 11b generates game image data by executing calculation processing necessary to display 3D graphics in accordance with the graphics command, for example, by executing coordinate conversion from a 3D coordinate to a 2D coordinate as pre-processing to rendering, or executing final rendering processing including texture pasting. The CPU 10 gives the GPU 11b an image generation program necessary to generate the game image data as well as the graphics command. The VRAM 11d stores data necessary for the GPU 11b to execute the graphics command (polygon data, texture data or other data). The GPU 11b uses the data stored on the VRAM 11d to generate image data.

The DSP 11c acts as au audio processor and generates audio data using sound data or sound wave (sound tone) data stored on the internal main memory 11e or the external main memory 12. Like the external main memory 12, the internal main memory 11e is also used for storing programs and various types of data or as a work area or a buffer area of the CPU 10.

The image data and the audio data generated as described above are read by the AV-IC 15. The AV-IC 15 outputs the read image data to the TV 2 via an AV connector 16, and outputs the read audio data to a speaker 2a built in the TV 2. Thus, the image is displayed on the TV 2 and also the sound is output from the speaker 2a.

The input/output processor (I/O processor) 11a transmits or receives data to or from the elements connected thereto, or downloads data from external devices. The input/output processor 11a is connected to the flash memory 17, a wireless communication module 18, a wireless controller module 19, an expansion connector 20, and a memory card connector 21. The wireless communication module 18 is connected to an antenna 22, and the wireless controller module 19 is connected to an antenna 23.

The input/output processor 11a is connected to the network via the wireless communication module 18 and the antenna 22 and thus can communicate with other game apparatuses or various servers also connected to the network. The input/output processor 11a periodically accesses the flash memory 17, and detects whether or not there is data which needs to be transmitted to the network. When there is such data, the input/output processor 11a transmits such data to the network via the wireless communication module 18 and the antenna 22. The input/output processor 11a receives data transmitted from other game apparatuses or downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored therein data saved as a result of playing the game using the game apparatus 3 (data after or in the middle of the game) as well as the data to be transmitted to, or data received from, the other game apparatuses or various servers.

The input/output processor 11a receives operation data which is transmitted from the controller 22 via the antenna 23 and the wireless controller module 19 and stores the operation data in a buffer area of the internal main memory 11e or the external main memory 12 (temporary storage).

The input/output processor 11a is connected to the expansion connector 20 and the memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The memory card connector 21 is a connector for an external storage medium such as a memory card or the like. For example, the input/output processor 11a can access an external storage medium via the expansion connector 20 or the memory card connector 21 to store or read data.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the power button 24 is pressed while the power is on, the game apparatus 3 is placed into a low power standby mode. The game apparatus 3 is provided with power even in this state and thus can be connected to a network such as the Internet or the like full time. When the power button 24 is pressed for a predetermined period of time while the power is on, the game apparatus 3 is turned off. When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

Figure 4:
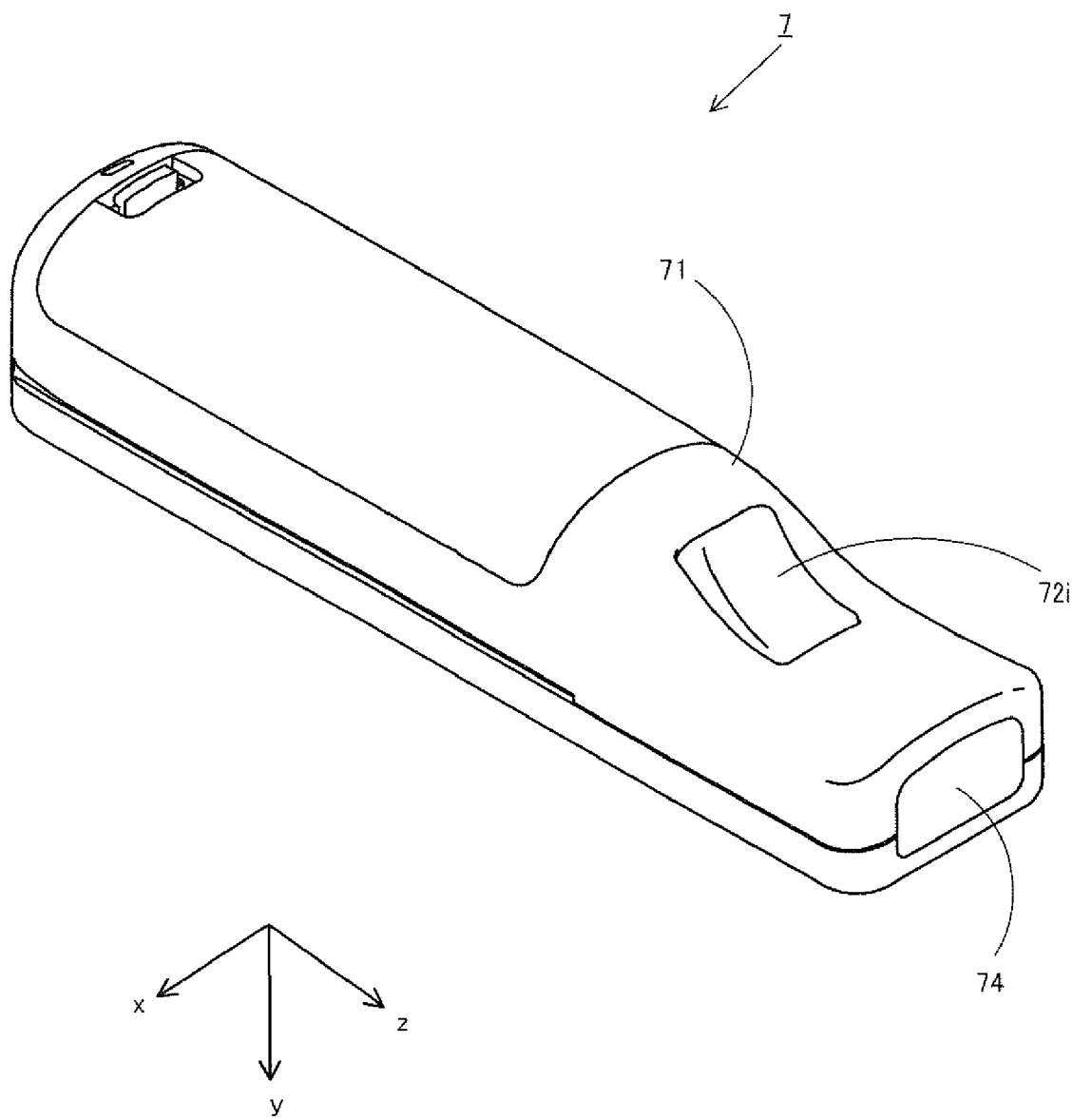
FIG. 4 is an isometric view of the controller 7 shown in FIG. 3 seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 and an operation section 72 including a plurality of operation buttons provided on a surface of the housing 71. The housing 71 has a generally parallelepiped shape extending in a longitudinal direction from front to rear. The overall size of the housing 71 is small enough to be held by one hand of an adult or even a child. The housing 71 is formed by plastic molding or the like.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed by the player. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus 3. In the exemplary arrangement shown in FIG. 3, the operation buttons 72b through 72d are arranged in a line extending in the front-rear direction at the center of the top surface of the housing 71. The operation buttons 72e through 72g are arranged in a line extending in the left-right direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the game apparatus 3, one of the plurality of LEDs 702 corresponding to the controller type is lit up.

On the top surface of the housing 71, sound holes for outputting a sound from a speaker (speaker 706 in FIG. 5) described later is provided between the operation button 72b and the operation buttons 72e through 72g.

On a bottom surface of the housing 71, a recessed portion is formed. The recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 6) included in the imaging information calculation section 74 is provided. The imaging information calculation section 74 is a system for analyzing image data which is taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 (FIG. 5) is provided. The connector 73 is, for example, an edge connector, and is used for engaging and connecting the controller 7 with a connection cable.

In order to give a specific description below, a coordinate system which is set for the controller 7 will be defined. As shown in FIG. 3 and FIG. 4, x, y and z axes perpendicular to one another are defined for the controller 7. Specifically, the longitudinal direction of the housing 71, i.e., the front-rear direction of the controller 7, is set as the z axis. A direction toward the front surface of the controller 7 (the surface having the imaging information calculation section 74) is set as a positive z-axis direction. The up-to-down direction of the controller 7 is set as the y axis. A direction toward the top surface of the controller housing 71 (the surface having the operation buttons 72a and the like) is set as a positive y-axis direction. The left-right direction of the controller 7 is set as the x axis. A direction toward a left surface of the housing 71 (the surface which is not shown in FIG. 3 but is shown in FIG. 4) is set as a positive x-axis direction.

Figure 6:
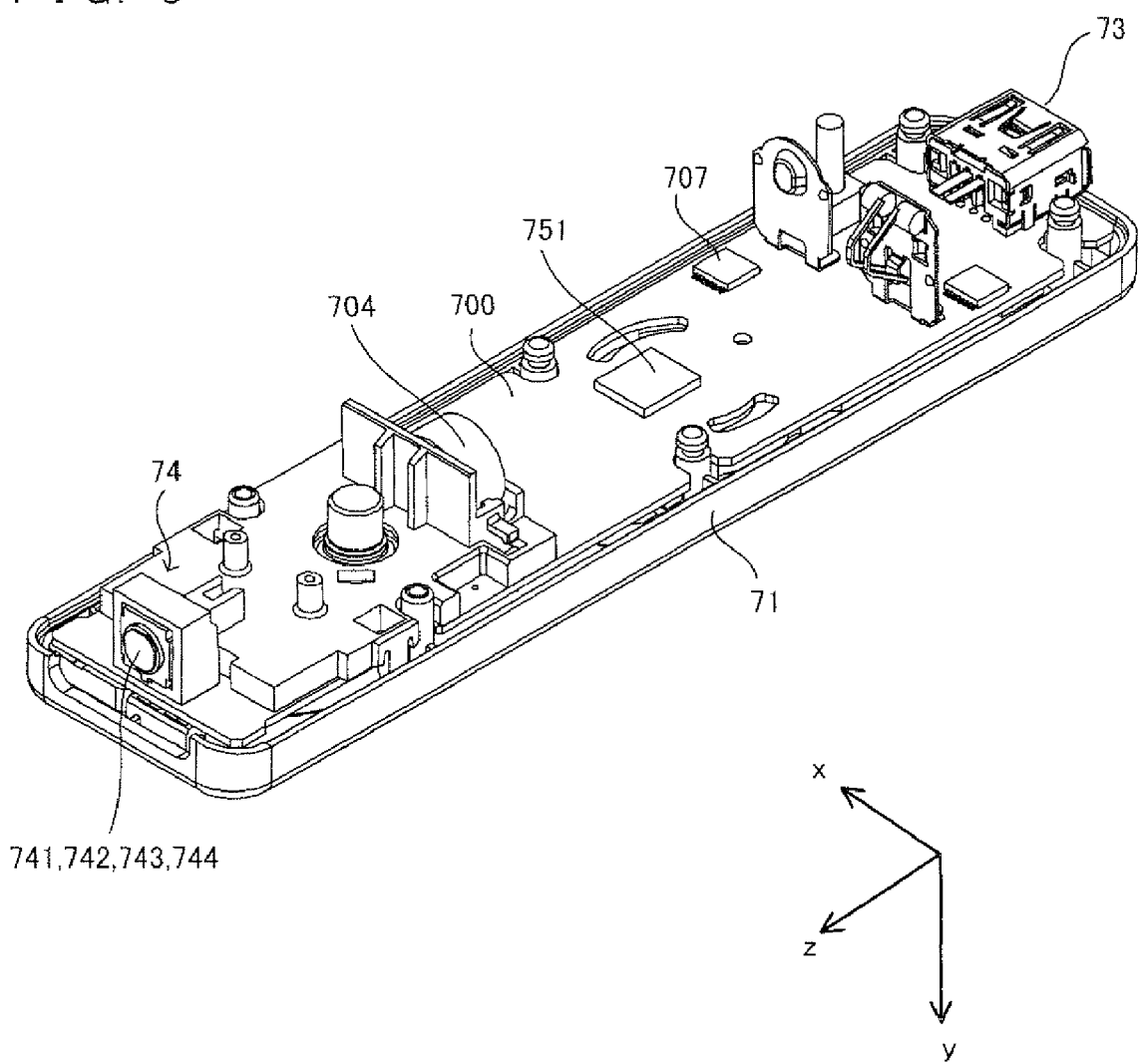
FIG. 6 is an isometric view of the controller 7 shown in FIG. 3 in the state where a lower housing is removed.

With reference to FIG. 5 and FIG. 6, an internal structure of the controller 7 will be described. FIG. 5 is an isometric view of the controller 7 seen from the rear side, illustrating a state where an upper housing (a part of the housing 71) of the controller 7 is removed. FIG. 6 is an isometric view of the controller 7 seen from the front side, illustrating a state where a lower housing (a part of the housing 71) of the controller 7 is removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The microcomputer 751 is one example of button data generation means according and acts to generate operation button data in accordance with the type of the operation button 72a or the like. This mechanism is known and is realized by, for example, the microcomputer 751 detecting whether the line is connected or disconnected by a switch mechanism, for example, a tact switch, provided on the keytop. More specifically, when an operation button is, for example, pressed, the corresponding line is connected and becomes conductive. The microcomputer 751 detects the operation button to which the line that has become conductive is connected and generates a signal corresponding to the type of the operation button.

The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area). Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus 3 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus 3.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus 3. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

Figure 7:
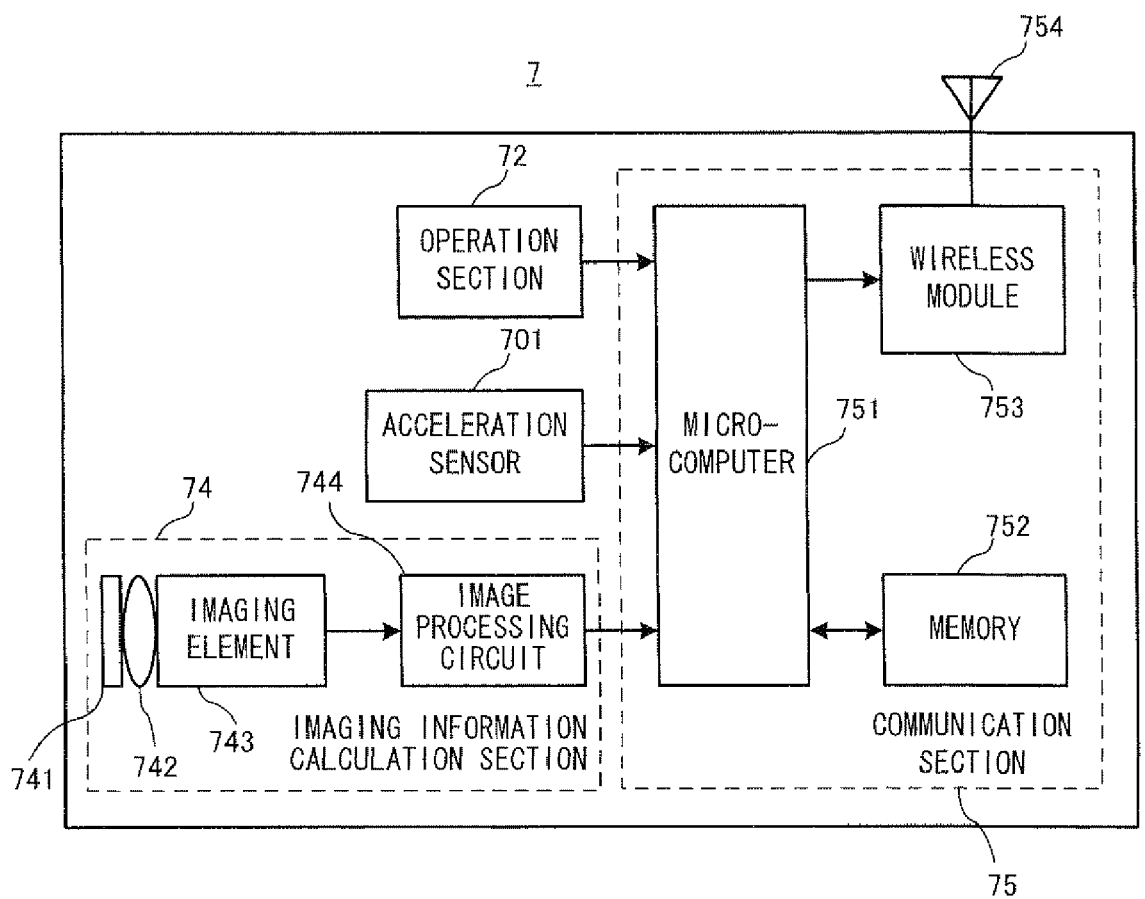
FIG. 7 is a block diagram showing a structure of the controller 7 shown in FIG. 3.

With respect to FIG. 7, the internal structure of the controller 7 will be described. FIG. 7 is a block diagram showing the structure of the controller 7.

As shown in FIG. 7, the controller 7 includes a communication section 75 in addition to the operation section 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The markers 8L and 8R located in the vicinity of the display screen of the TV 2 are infrared LEDs for outputting infrared light forward from the TV 2. Therefore, the provision of the infrared filter 741 allows each of the markers 8L and 8R to be imaged more accurately. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 and generates image data. Hereinafter, an image taken by the imaging element 743 will be referred to as a "taken image". The image data generated by the imaging element 743 is processed by the image processing circuit 744. The image processing circuit 744 calculates the positions of the imaging targets (the markers 8L and 8R) in the taken image. Hereinafter, a method for calculating the positions of the imaging targets will be described with reference to FIG. 8.

Figure 8:
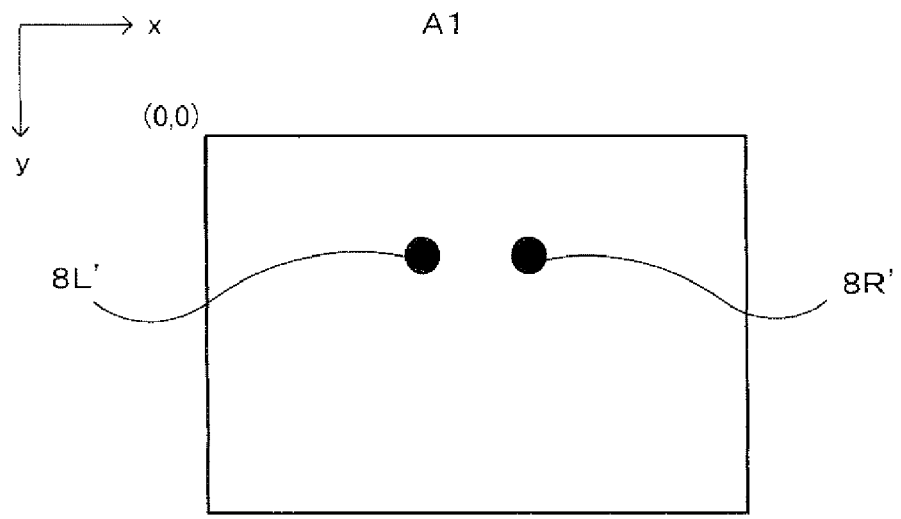
FIG. 8 shows an example of a taken image.

FIG. 8 shows an example of a taken image. In a taken image A1 shown in FIG. 8, an image 8L' of the marker 8L and an image 8R' of the marker 8R are arranged side by side. When the taken image is input, the image processing circuit 744 calculates a coordinate set representing the position of each of areas in the taken image which match a predetermined condition. Here, the predetermined condition is a condition for specifying an image of an imaging target (target image). A specific predetermined condition is that the area has a brightness of a predetermined value or greater (a high luminance area) and has a size within a predetermined size range. The predetermined condition only needs to be a condition for specifying an imaging target, and in another embodiment, may include a condition regarding the color of the image.

For calculating the position of the target image, the image processing circuit 744 specifies high brightness areas described above, from the areas in the taken image, as candidates for the target image. The reason is that a target image appears as a high brightness area in the image data of the taken image. Next, based on the size of each specified high brightness area, the image processing circuit 744 executes determination processing of determining whether or not each of the high brightness areas is a target image. The taken image may include images other than the target images, i.e., images 8L' and 8L' of the two markers 8L and 8R, due to sunlight coming through a window or light of a fluorescent lamp. In this case, the images other than the images 8L' and 8W of the markers 8L and 8R also appear as high brightness areas. The above-mentioned determination processing is executed in order to distinguish the images 8L' and 8R' of the markers 8L and 8R as the target images from the other images, so that the target images are accurately specified. Specifically, it is determined whether or not each specified high brightness area has a size within a predetermined size range. When the high brightness area has a size within the predetermined size range, such an area is determined to represent a target image; whereas when the high brightness area has a size outside the predetermined size range, such an area is determined to represent an image other than a target image.

The image processing circuit 41 calculates the position of a high brightness area which is determined to represent a target image as a result of the determination. Specifically, the image processing circuit 744 calculates the position of the center of gravity of the high brightness area. The position of the center of gravity can be calculated in a scale more detailed than the resolution of the imaging element 743. Here, the resolution of a taken image taken by the imaging element 743 is 126×96, and the position of the center of gravity is calculated at a scale of 1024×768. Namely, the coordinate set of the position of the center of gravity is represented by integers of (0, 0) to (1024, 768). As shown in FIG. 8, positions in the taken image are represented by a coordinate system (xy coordinate system), in which the upper left corner of the taken image is the origin, the downward direction from the origin is a positive y-axis direction, and the rightward direction from the origin is a positive x-axis direction.

As described above, the image processing circuit 744 calculates the coordinate set representing the position of each of areas in the taken image which match the predetermined condition. Hereinafter, a coordinate set calculated by the image processing circuit 744 will be referred to as a "marker coordinate set". The marker coordinate set represents the position of the imaging target in a coordinate system which represents a position on a plane corresponding to the taken image. The image processing circuit 744 outputs the marker coordinate set to the microcomputer 751 of the communication section 75. The data on the marker coordinate set is transmitted to the game apparatus 3 by the microcomputer 751 as operation data. Since the marker coordinate set varies in accordance with the direction (posture) or position of the controller 7 itself, the game apparatus 3 can calculate the direction or position of the controller 7 using this coordinate set. In this embodiment, the processing of calculating the marker coordinate set from the taken image is performed by the image processing circuit 744 and/or the microcomputer 751 of the controller 7. Alternatively, the taken image may be transmitted to the game apparatus 3, and the processing substantially the same as the processing thereafter may be performed by the CPU 10 or the like of the game apparatus 3.

The acceleration sensor 701 included in the controller 7 is preferably a three-axial (x, y and z axes) acceleration sensor. The three-axial acceleration sensor 701 detects a linear acceleration in each of three directions, i.e., an up-down direction, a left-right direction, and a front-rear direction. In other embodiments, two-axial acceleration detection means for detecting a linear acceleration in each of only the up-down and left-right directions (or directions along another pair of axes) may be used depending on the type of control signals used for game processing. For example, such a three-axial or two-axial acceleration sensor 701 may be available from Analog Devices, Inc. or STMicroelectronics N.V. The acceleration sensor 701 may be of a static capacitance system (static capacitance coupling system) based on the technology of MEMS (Micro Electro Mechanical Systems) provided by silicon precision processing. Alternatively, the three-axial or two-axial acceleration sensor 701 may be based on an existing acceleration detection technology (e.g., piezoelectric system or piezoelectric resistance system) or any other appropriate technology developed in the future.

As known to those skilled in the art, the acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of two or three axes thereof. Hence, the acceleration sensor 701 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the controller 7 can be estimated or calculated (determined) by further processing executed by a computer, for example, the processor of the game apparatus 3 (for example, the CPU 30) or the processor of the controller 7 (microcomputer 751). For example, when the computer executes processing with the premise that the controller 7 including the acceleration sensor 701 is in a static state (i.e., when the computer executes processing with the premise that the acceleration detected by the acceleration sensor 701 includes only a gravitational acceleration), if the controller 7 is actually in a static state, it can be found based on the detected acceleration whether or not the controller 7 is inclined with respect to the direction of gravity, or how much the controller 7 is inclined with respect to the direction of gravity. Specifically, when the detection axis of the acceleration sensor 701 is directed vertically downward, it can be found whether or not the controller 7 is inclined with respect to the direction of gravity based on whether or not 1 G (gravitational acceleration) is applied to the controller 7. It can be found how much the controller 7 is inclined in accordance with the magnitude of the gravitational acceleration. In the case of a multi-axial acceleration sensor, it can be found more precisely how much the controller 7 is inclined with respect to the direction of gravity by processing a signal of acceleration in each axial direction. In this case, the processor may calculate data on the inclining angle of the controller 7 based on the output from the acceleration sensor 701. Alternatively, the processor may estimate the approximate inclining angle based on the output from the acceleration sensor 701 without calculating the data on the inclining angle. Thus, the inclination, posture or position of the controller 7 can be determined by using the acceleration sensor 701 in combination with the processor. When there is the premise that the acceleration sensor 701 is in a dynamic state, an acceleration including a gravitational acceleration component and an acceleration component in accordance with the motion of the acceleration sensor 701 is detected. Therefore, the moving direction of the controller 7 or the like can be found by removing the gravitational acceleration component by predetermined processing. Specifically, when the controller 7 including the acceleration sensor 701 is being moved by the user's hand while being dynamically accelerated, the acceleration signal generated by the acceleration sensor 701 is processed. Thus, various motions and/or position of the controller 7 can be calculated. Even with the premise that the acceleration sensor 701 is in a dynamic state, the inclination of the controller 7 with respect to the direction of gravity can be found by removing the acceleration in accordance with the motion of the acceleration sensor 701 by predetermined processing. In other embodiments, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle (or another preferable parameter).

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus 3 to the wireless module 753 via the antenna 754. The sound IC 707 processes sound data or the like transmitted from the game apparatus 3 via the communication section 75. The microcomputer 751 actuates the vibrator 704 in accordance with, for example, the vibration data (e.g., a signal for turning the vibrator 704 on or off) transmitted from the game apparatus 3 via the communication section 75.

Data from the controller 7 including an operation signal (key data) from the operation section 72, acceleration signals in the three axial directions (x-axis, y-axis and z-axis direction acceleration data) from the acceleration sensor 701, and the processing result data from the imaging information calculation section 74 are output to the microcomputer 751. The microcomputer 751 temporarily stores the input data (key data, acceleration data, and the processing result data) on the memory 752 as transmission data which is to be transmitted to the wireless controller module 19. The wireless transmission from the communication section 75 to the wireless controller module 19 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is, for example, 5 ms. At the transmission timing to the wireless controller module 19, the microcomputer 751 outputs the transmission data stored in the memory 752 as a series of operation information to the wireless module 753. Based on the Bluetooth (registered trademark) technology or the like, the wireless module 753 converts a carrier wave of a predetermined frequency with the operation information and radiates the resultant radio wave signal from the antenna 754. Namely, the key data from the operation section 72, the acceleration data from the acceleration sensor 701, and the processing result data from the imaging information calculation section 74 are modulated by the wireless module 753 into a radio wave signal and transmitted from the controller 7. The wireless controller module 19 of the game apparatus 3 receives the radio wave signal, and the game apparatus 3 demodulates or decodes the radio wave signal to obtain the series of operation information (the key data, the acceleration data, and the processing result data). Based on the obtained operation information and the game program, the CPU 30 of the game apparatus 3 performs the game processing. In the case where the communication section 75 is structured using the Bluetooth (registered trademark) technology, the communication section 75 can have a function of receiving transmission data which is wirelessly transmitted from other devices.

Now, with reference to FIG. 9 through FIG. 29, an overview of a game assumed in this embodiment will be described. The game assumed in this embodiment is a so-called RTS (Real-time Strategy) game. In this game, the player issues an instruction to a plurality of ally units to beat the enemy in a real-time situation. In the game assumed in this embodiment, the operation targets (pointing targets) of the player include a player unit representing the player himself/herself and up to four ally units, namely, up to five units in total. This game is played in a stage-clear form.

Figure 9:
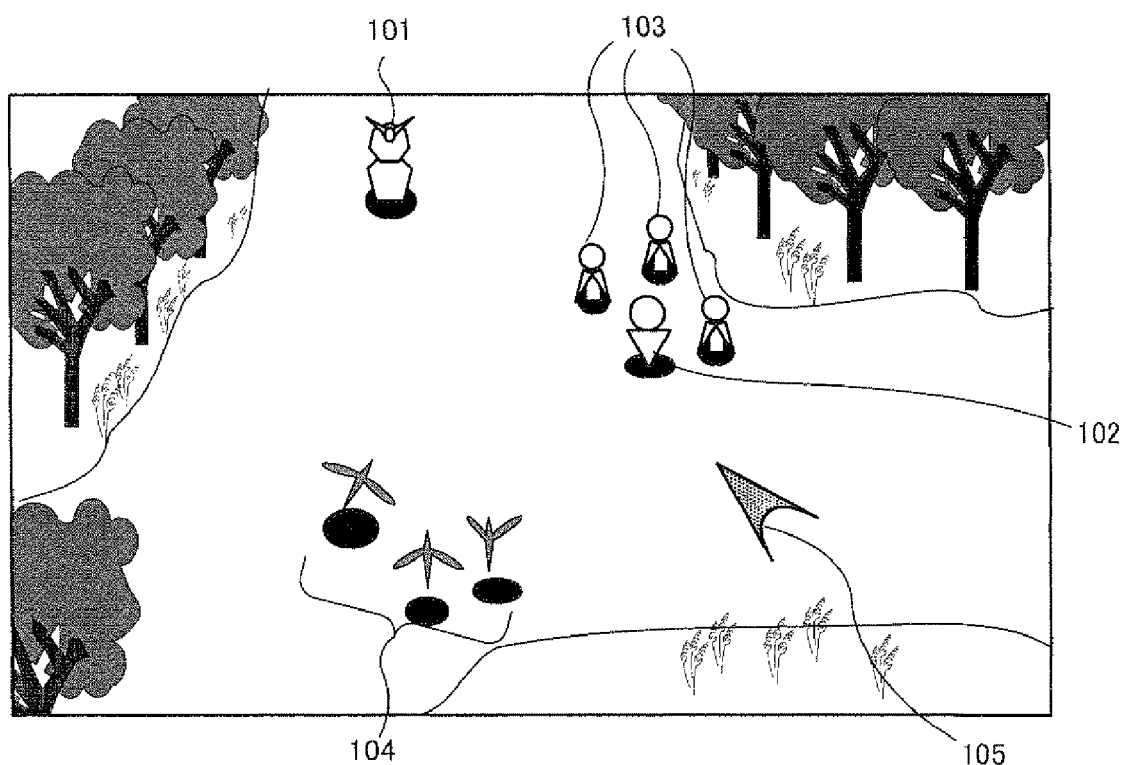
FIG. 9 shows an example of a game screen assumed in this embodiment.

FIG. 9 shows an example of a game screen assumed in this embodiment. FIG. 9 shows an image representing a virtual game space (the space may be three-dimensional or two-dimensional; in this embodiment, this space will be described as a three-dimensional game space). FIG. 9 shows a player unit 101, an ally unit 102, three enemy units 104, and a cursor 105. Around the ally unit 102, three subordinate units 103 are located. In this game, the one ally unit 102 and a plurality of subordinate units 103 will be collectively treated as one "troop". Hereinafter, this troop will be referred to as an "ally troop". The three enemy unit will also be collectively treated as one "troop" and will be referred to as an "enemy troop", hereinafter. In this game, the units in each troop basically move together. Therefore, an instruction to the entire ally troop can be issued by an instruction to the ally unit 102. In other words, the ally troop has the ally unit 102 as a leader.

Figure 10:
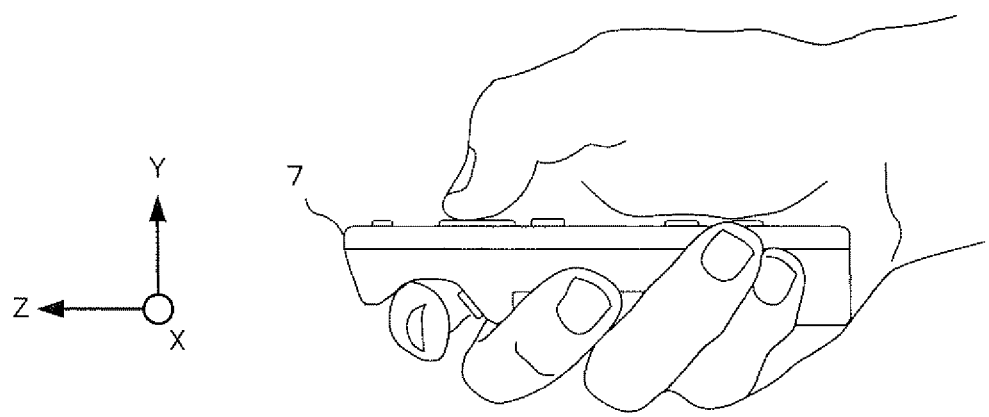
FIG. 10 shows an operation method.

Now, an operation method in this game will be described. Basically in this game, the player points the controller 7 to a predetermined position in the game screen to make various operations. Specifically, as shown in FIG. 10, the player holds the controller 7 in the state where the front surface thereof (the light incidence surface on which the image information calculation section 74 takes images) is directed toward the markers 8L and 8R. In this state, the player changes the inclination of the controller 7 or changes the position on the screen pointed to by the controller 7 (pointed position) to perform game operations.

Figure 11:
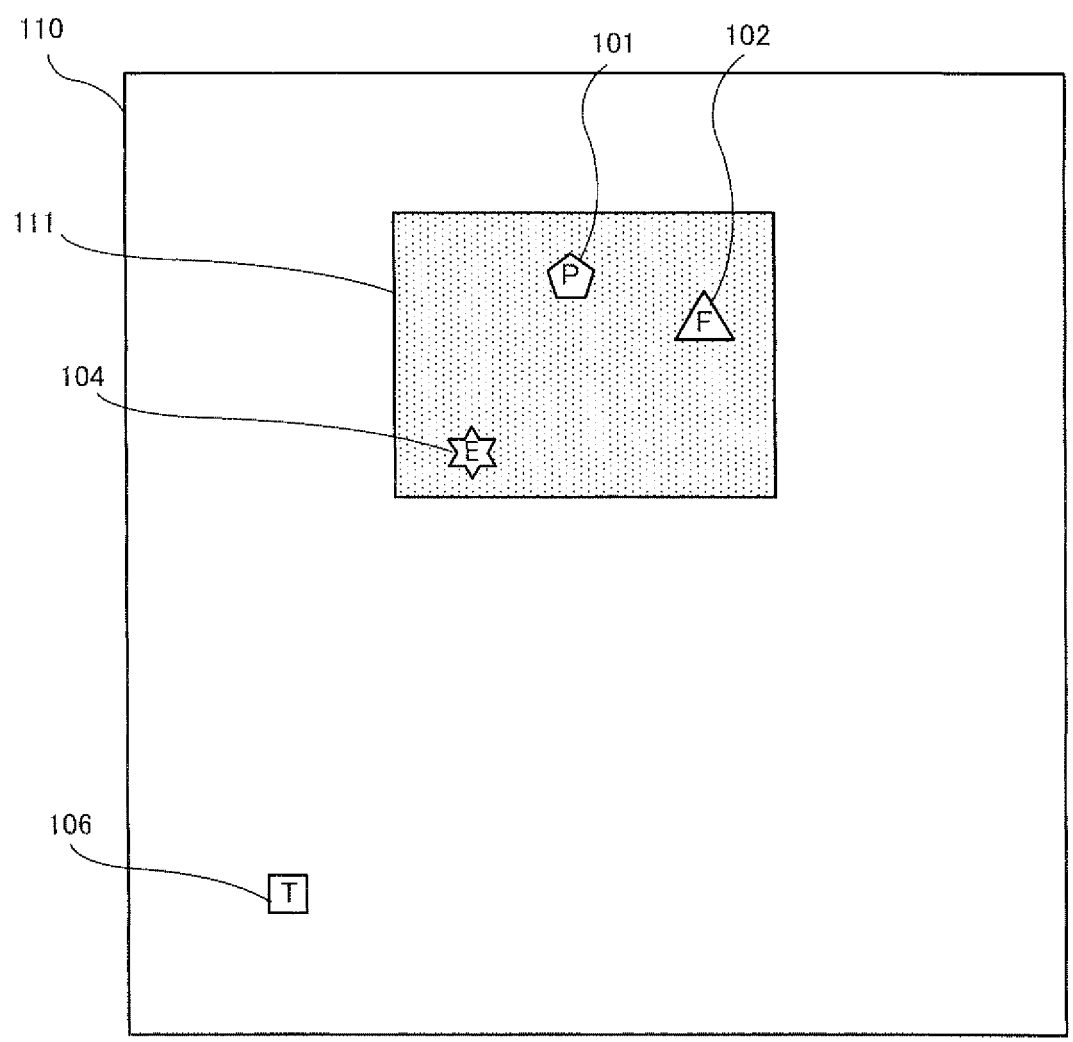
FIG. 11 shows the relationship between the entire virtual game space and the area displayed on the screen.

Now, a more specific operation method, especially a method for issuing an instruction to the units will be described. This description will be made based on the state shown in FIG. 11. FIG. 11 shows the relationship between the entire virtual game space (stage) and the area displayed on the screen. In FIG. 11, an overlook view of the three-dimensional virtual game space is shown with a two-dimensional coordinate system for the convenience of description. In FIG. 11, one player unit 101, one ally unit 102 (ally troop), and one enemy troop (enemy units 104) are present in a top part of a virtual game space 110. In a bottom part of the virtual game space 110, one treasure box 106 is present. A screen display area 111 is a range displayed in the game screen. Here, the screen in FIG. 9 is shown as the game screen. In other words, FIG. 9 shows the game screen of the state of FIG. 11.

In the screen as shown in FIG. 9, the player puts the cursor 105 to the unit to which he/she wishes to issue an instruction and presses the A button 72*d* and the B button 72*i* simultaneously. Thus, the "drag" the unit can be dragged (hereinafter, the operation of pressing the A button 72*d* and the B button 72*i* simultaneously will be referred to as the "drag operation"). The player moves the cursor 105 to a desired position in the drag state (the state where the A button 72*d* and the B button 72*i* are pressed) and cancels the drag state (releases the A button 72*d* and the B button 72*i* which have been pressed). Then, the unit starts a predetermined action in accordance with, for example, the object located at the spot where the buttons are released. Hereinafter, such an action will be referred to as the "strategic action". The strategic action may be, for example, attacking the enemy troop, opening the treasure box, pressing a switch, occupying a fortress, moving to a specified position or the like.

Figure 12:
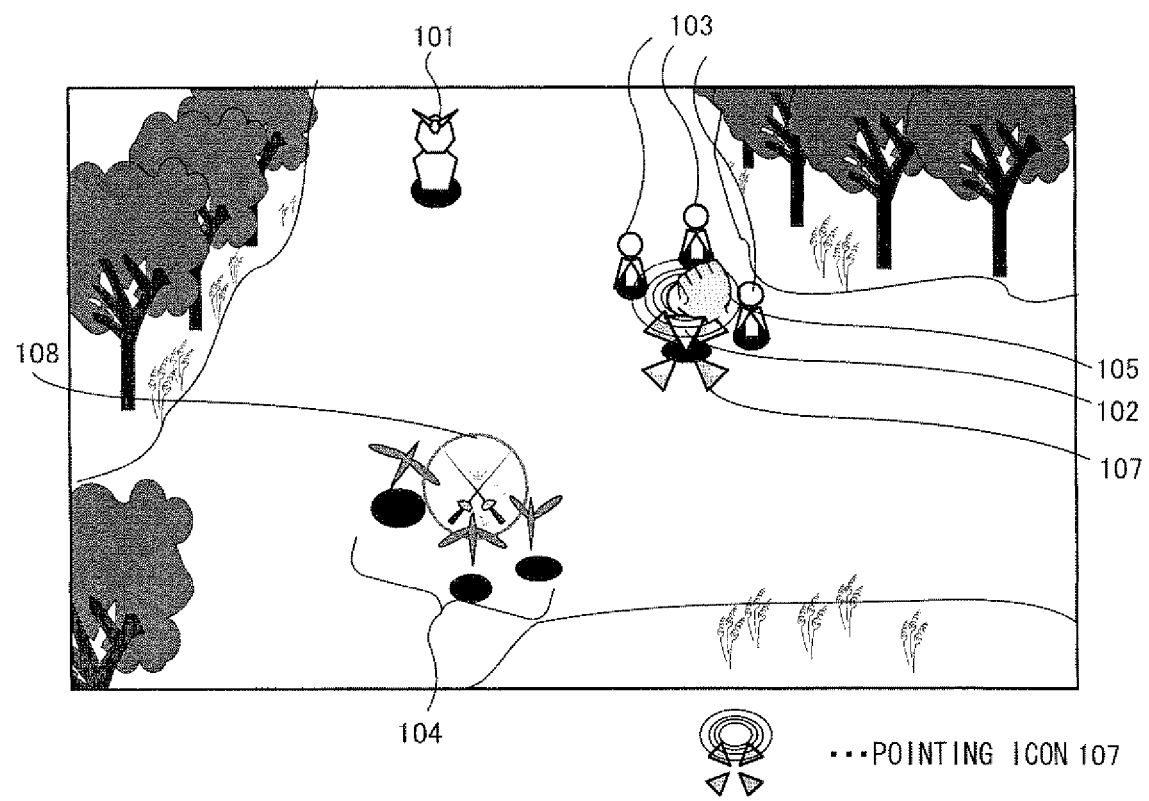
FIG. 12 shows an example of a game screen assumed in this embodiment.

Now, an operation to instruct the ally troop to attack the enemy troop in the state as shown in FIG. 9 will be described. First, the player moves the cursor 105 to point to the ally unit 102. Then, the player performs a drag operation. As a result, as shown in FIG. 12, the pattern of the cursor 105 is changed to represent the drag state. In FIG. 12, an image of a hand holding something is displayed as the cursor 105. In accompaniment with the drag operation, a pointing icon 107 is displayed at the pointed position. In FIG. 12, an information icon 108 is further displayed as overlapping the enemy troop. The information icon 108 indicates what type of strategic action can be taken by the ally unit (or the player unit), which has been dragged, on the unit or the like overlapped by the information icon 108. In the example of FIG. 12, the information icon 108 has a pattern of crossing swords, which indicates that the ally unit 102 (ally troop) can take a "direct action" using weapons on the enemy troop.

In FIG. 12, one enemy troop is shown. In the case where a plurality of enemy troops are shown, an information icon is displayed for each of the enemy troops to indicate that a "direct action" can be taken on the respective enemy troop. Although not shown in FIG. 12, an object of the "treasure box" is displayed on the screen, an information icon is displayed to indicate that the treasure box can be opened. If an object of a "switch" is displayed, an information icon is displayed to indicate that the switch can be turned on.

Then, the player moves the cursor 105 toward the enemy troop while keeping the drag state. In accompaniment with this, the pointing icon 107 also moves. In addition, as shown in FIG. 13, a dashed line locus 109 extending from the ally unit 102 to the pointing icon 107 is displayed on the screen.

Figure 13:
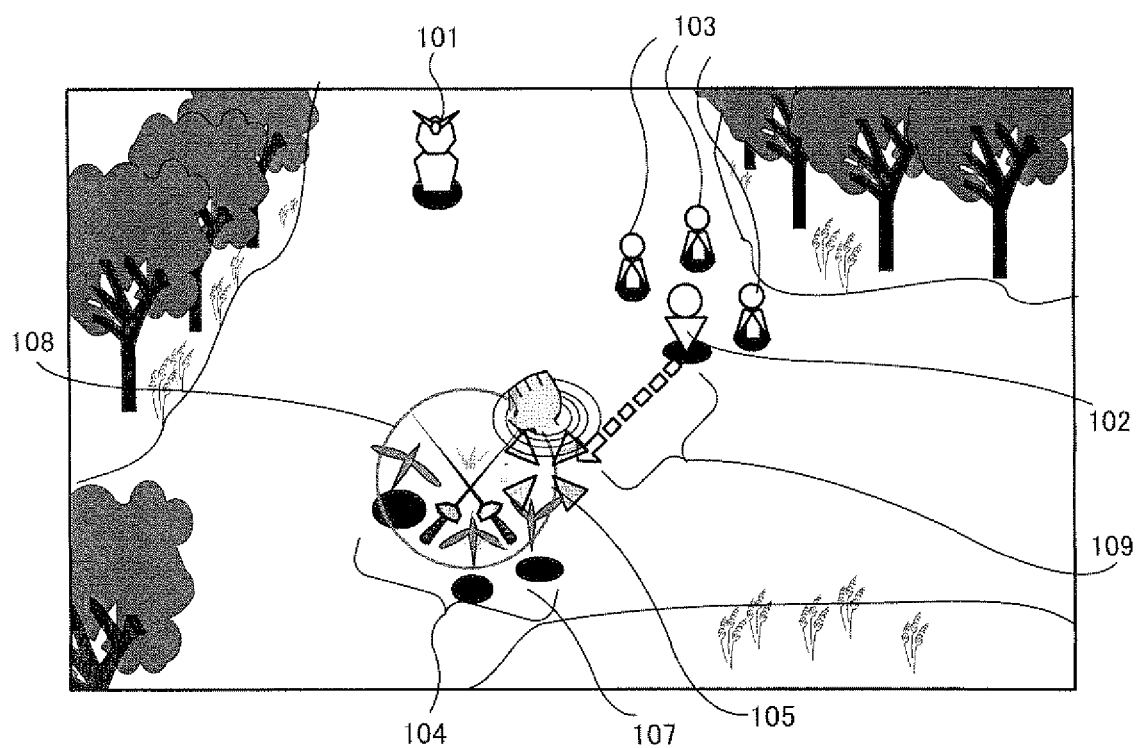
FIG. 13 shows an example of a game screen assumed in this embodiment.
Figure 14:
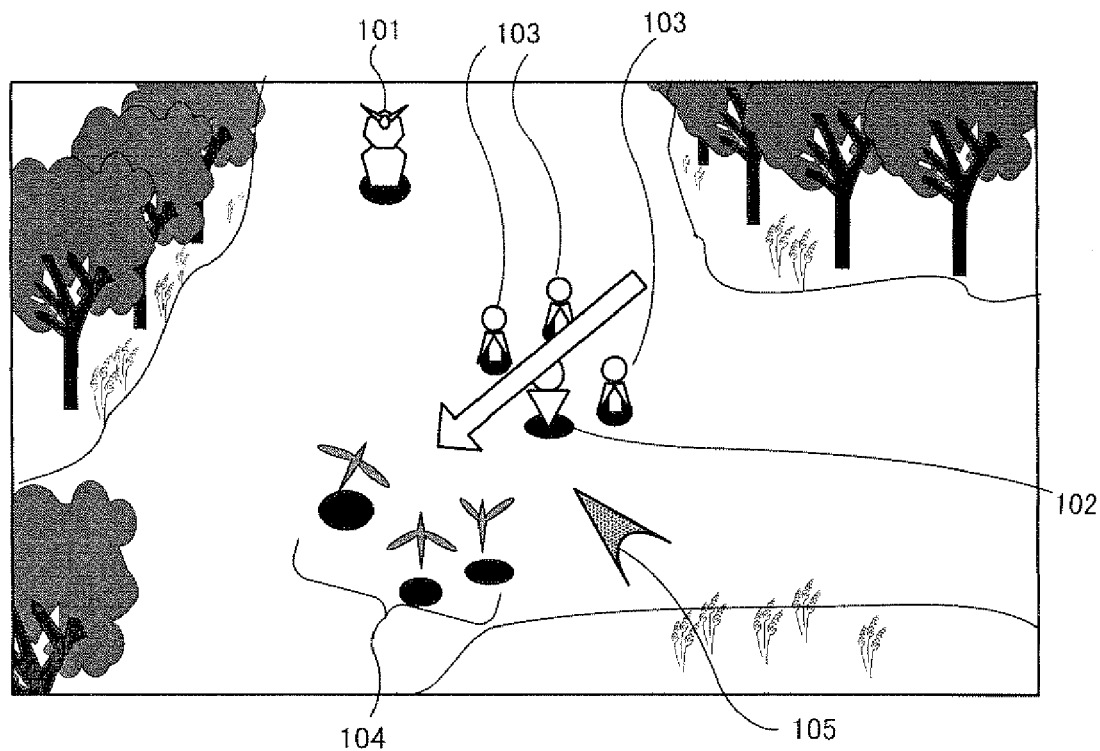
FIG. 14 shows an example of a game screen assumed in this embodiment.

When the cursor 105 is moved to the enemy troop, as shown in FIG. 13, the pointing icon 107 overlaps the information icon 108. At this stage, the information icon 108 is slightly enlarged. When the drag state is cancelled in this state, the ally troop starts a strategic action. Namely, as shown in FIG. 14, the ally troop starts a "direct action" on the enemy troop. This means that the cancellation of the drag state is issuance to the ally unit 102 (ally troop) of an instruction to attack.

Now, an operation to issue an instruction to the player unit 101 will be described. In this game, the player unit 101 is set so as not to take a "direct attack" on the enemy troop. Therefore, even if the above-described operation is made on the player unit 101, the information icon of the "direct attack" is not displayed. Instead, the player unit can attack the enemy troop by a method called "magic attack".

Figure 15:
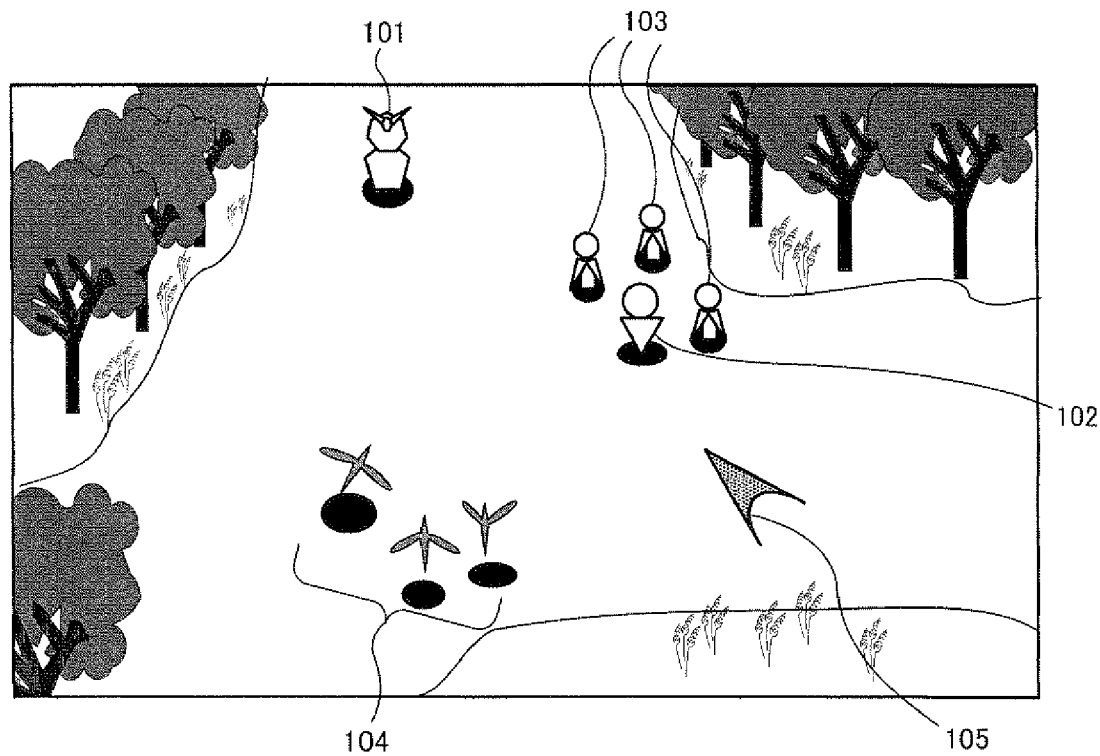
FIG. 15 shows an example of a game screen assumed in this embodiment.
Figure 16:
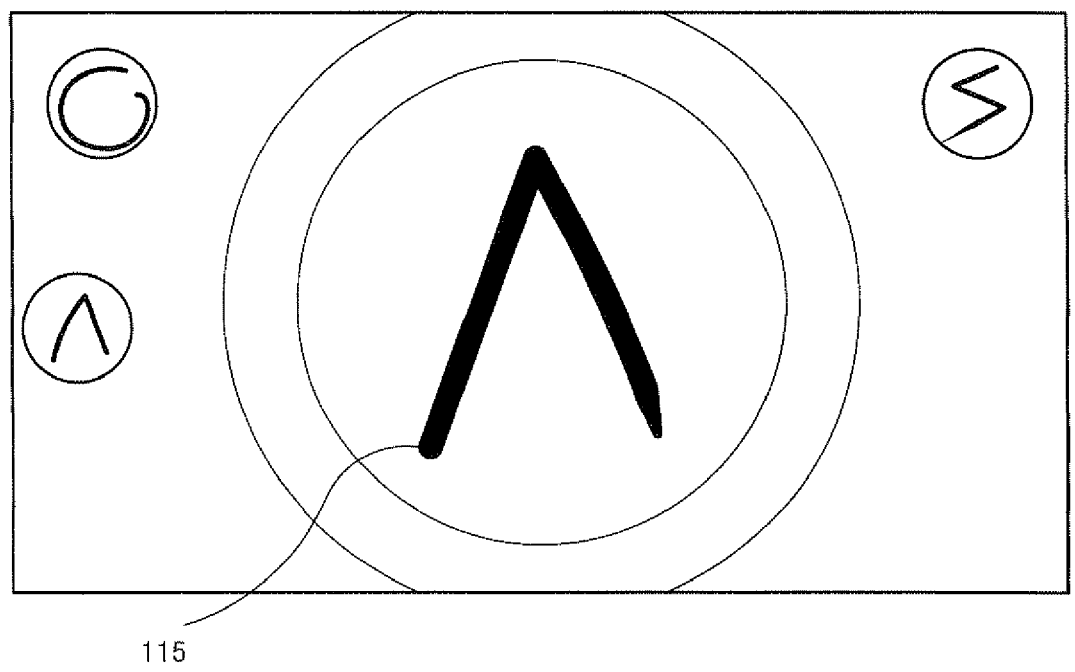
FIG. 16 shows an example of a game screen assumed in this embodiment.
Figure 17:
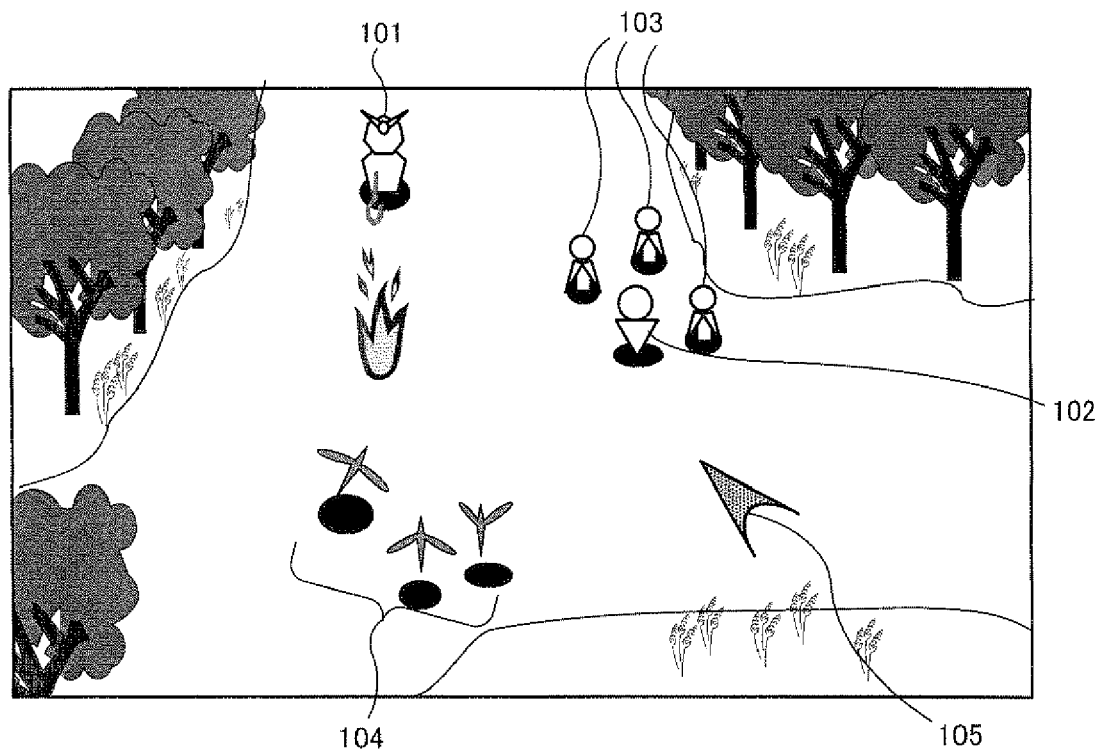
FIG. 17 shows an example of a game screen assumed in this embodiment.

Hereafter, an operation for the "magic attack" will be described. In order to make the "magic attack", the player makes a predetermined operation, for example, presses the button 72*b* in the state where the player unit 101 is displayed in the screen as shown in FIG. 15. Then, regardless of the pointed position, a screen as shown in FIG. 16 is displayed. When the player moves the controller 7 on this screen, the locus of the pointed positions is drawn on the screen as a line 115. The player makes an operation of drawing a predetermined geometrical figure (referred to as a "rune" in this game) with this line. In other words, the player makes an operation of drawing a predetermined geometrical figure with the controller 7. Then, processing of the "magic attack" predefined in accordance with the shape of the geometrical figure is executed. FIG. 17 shows a state where a "fireball", which is one type of the "magic attack", is shot in the direction in which the player unit 101 is directed, in accordance with the geometrical figure drawn in FIG. 16. In this manner, the ally unit (ally troop) can make a "direct attack" on the enemy troop, whereas the player unit 101 cannot make a "direct attack" but can make a "magic attack" instead in this game.

Now, an operation performed when neither the player unit 101 nor the ally unit 102 is displayed in the screen will be described. For example, it is assumed that as shown in FIG. 18, the player scrolls the screen to the position of the treasure box 106 located in the bottom part of the virtual game space 110, then finds the presence of the treasure box 106 and attempts to cause the player unit 101 to acquire the treasure box 106. The operation in this case will be described.

First, the player makes an operation to scroll the screen. In this game, when the cross key 72*a* is pressed, the screen is scrolled in the direction of the pressed part of the key. When the screen is slightly scrolled down from the state in FIG. 11 to the state in FIG. 19, the screen appears as shown in FIG. 20. FIG. 20 does not display the player unit 101 or the ally unit 102, but displays unit icons 131 and 132 instead. A unit icon is an icon corresponding to the player unit 101 or the ally unit 102 located outside the screen. In FIG. 20, the unit icon 131 corresponds to the player unit 101, and the unit icon 132 corresponds to the ally unit 102. Namely, in this game, when the player unit 101 or the ally unit 102 is not displayed in the screen, the corresponding unit icon is displayed instead. FIG. 20 shows only two unit icons for the simplification of the description. However, the player can manipulate up to four ally units in this game, and so five unit icons in total can be displayed at the same time. In this game, the display positions of the unit icons are also adjusted so that the unit icons do not overlap each other (this will be described in detail later).

Figure 20:
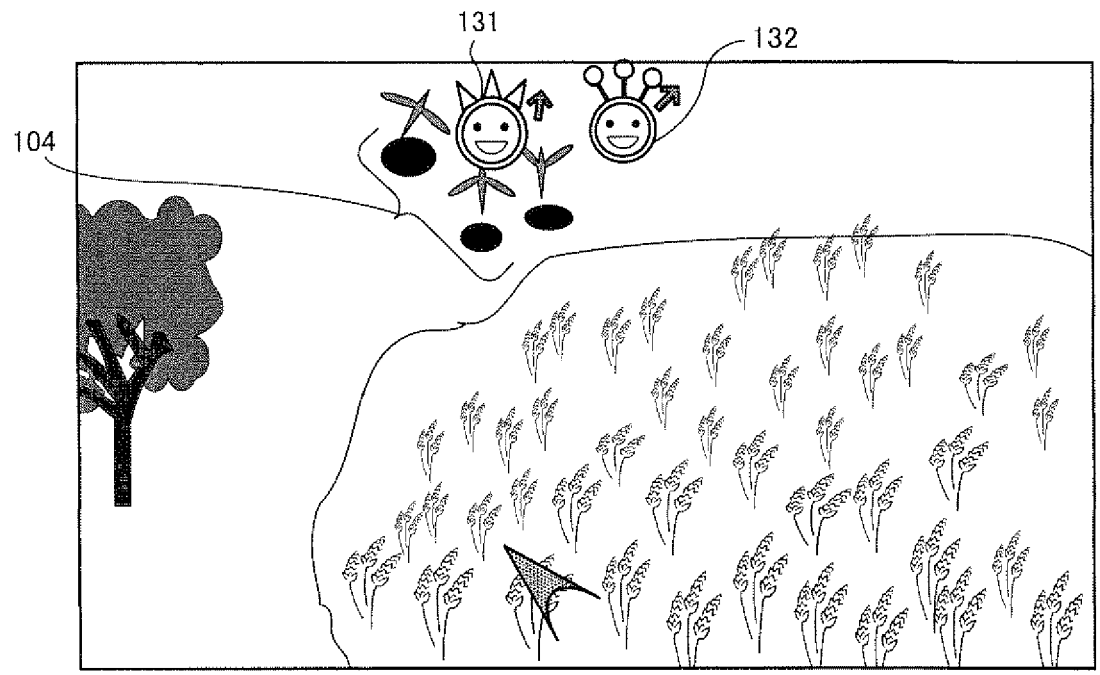
FIG. 20 shows an example of a game screen assumed in this embodiment.
Figure 21:
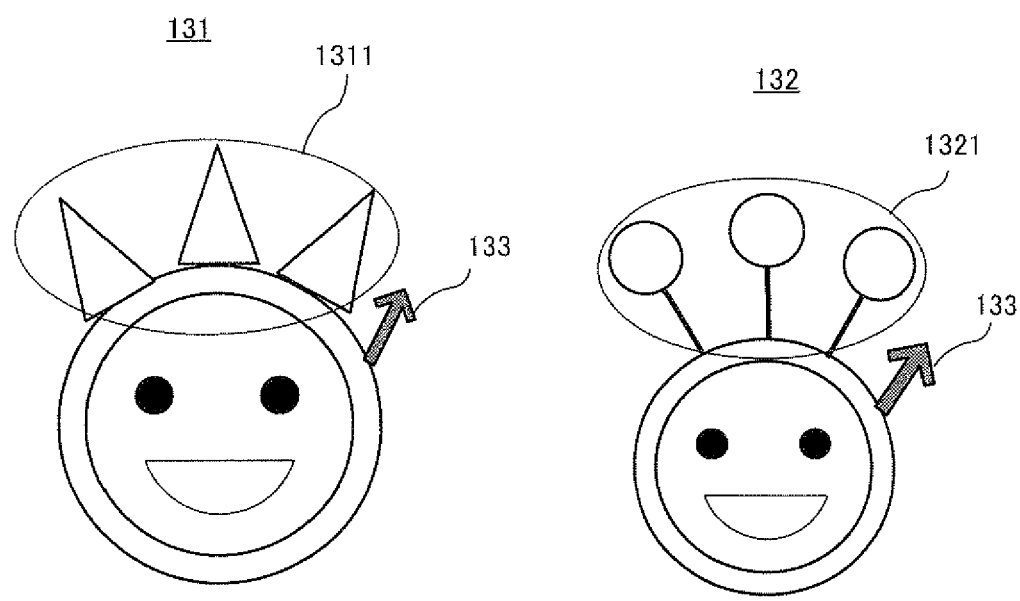
FIG. 21 is an enlarged view of unit icons 131 and 132 shown in FIG. 20.

Here, a supplemental description on the unit icon will be given. FIG. 21 is an enlarged view of the unit icons 131 and 132 shown in FIG. 20. The unit icons 131 and 132 are basically circular, and a pattern mimicking a face is drawn in each circle. In this game, an HP (Hit Point) state of the player unit or the ally unit is represented by the expression of the face. Specifically, when the HP is sufficient, such a state is represented by a smiling face as shown in FIG. 21. When the HP is insufficient, such a state is represented by a moaning look on the face. The unit icon 131 corresponding to the player unit 101 has an identification mark 1311 to be distinguishable from the unit icon corresponding to the ally unit 102. The unit icon 132 corresponding to the ally unit 102 has bars 1321 at the top which represent the number of the subordinate units 103. The number of the bars 1321 increases or decreases in accordance with the number of the subordinate units 103. Both of the icons have an arrow 133 which represents the direction toward the respective unit.

Figure 19:
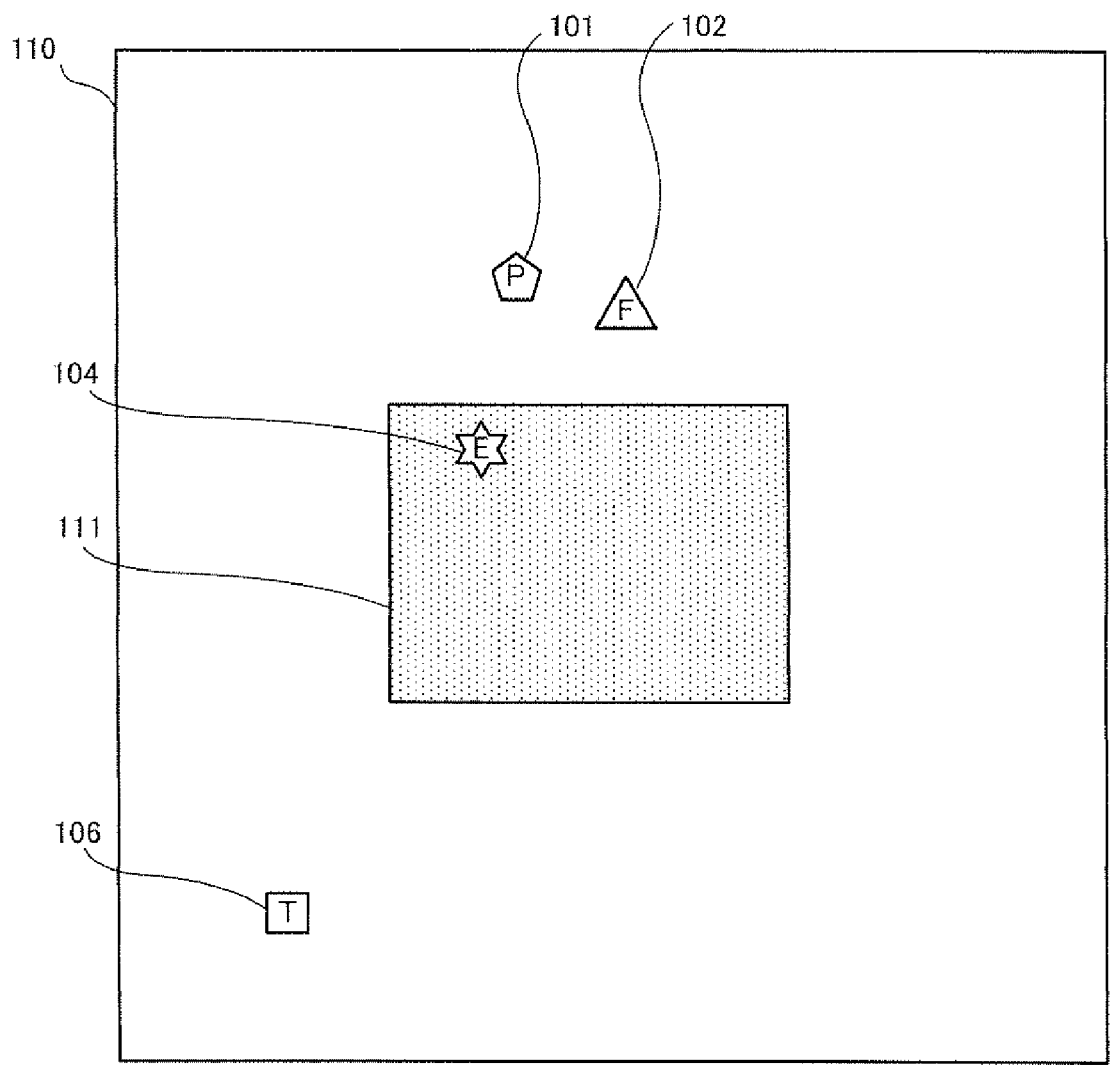
FIG. 19 shows the relationship between the entire virtual game space and the area displayed on the screen.
Figure 23:
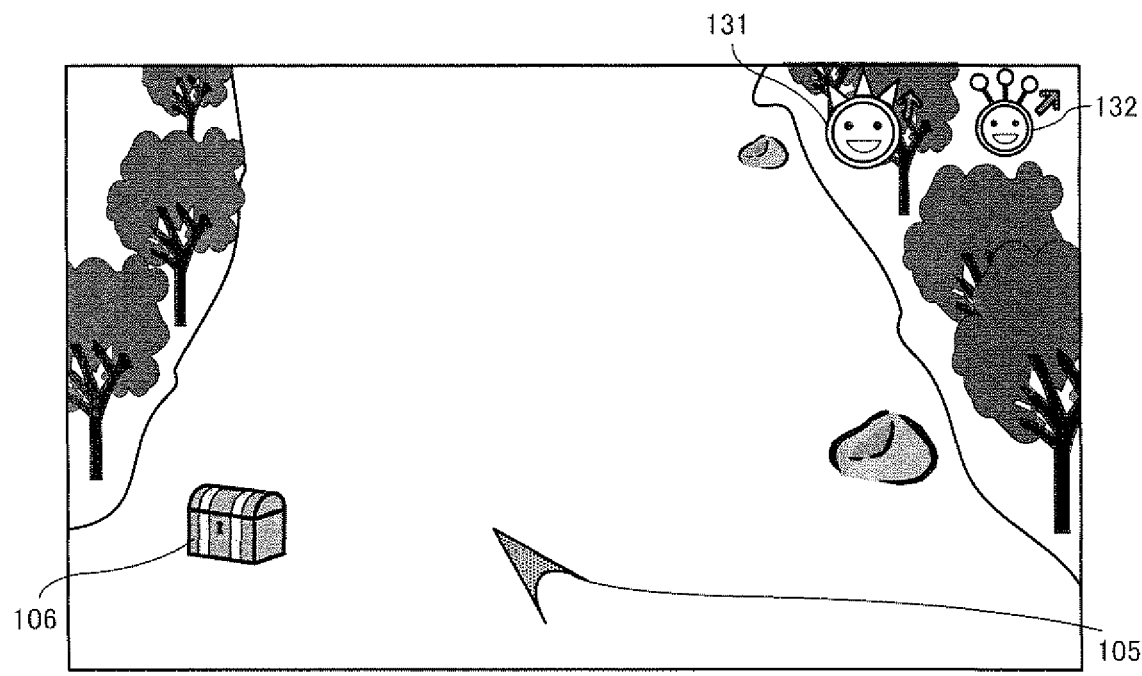
FIG. 23 shows an example of a game screen assumed in this embodiment.
Figure 24:
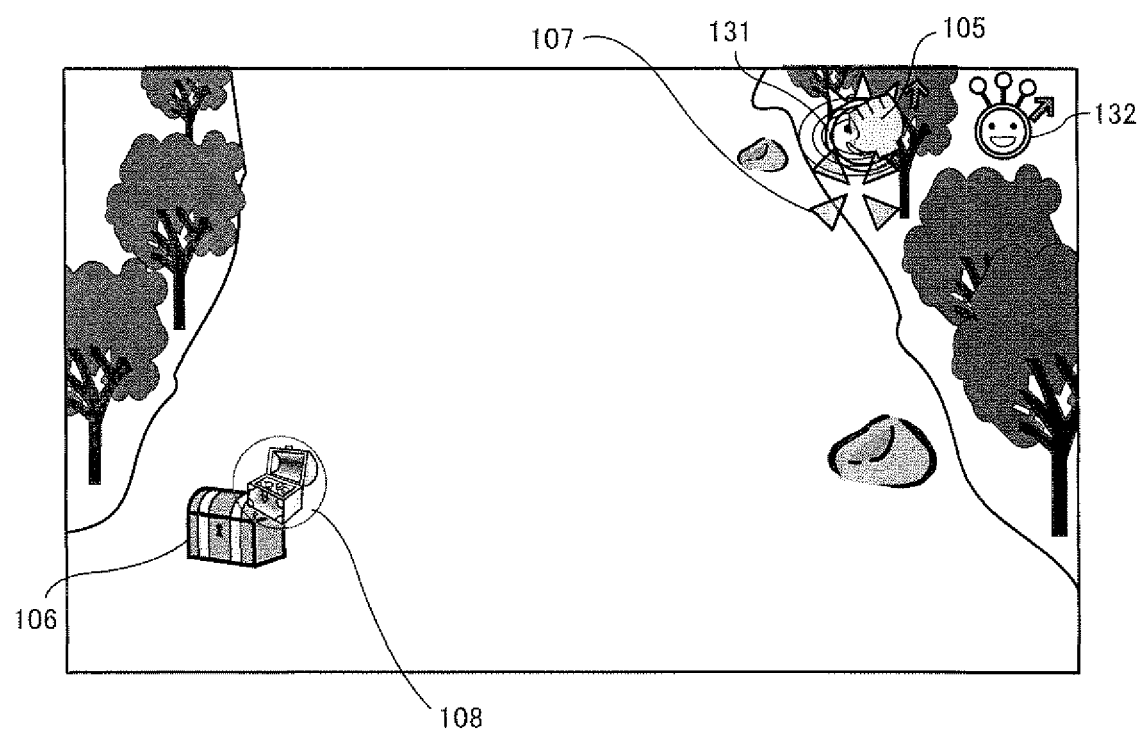
FIG. 24 shows an example of a game screen assumed in this embodiment.
Figure 25:
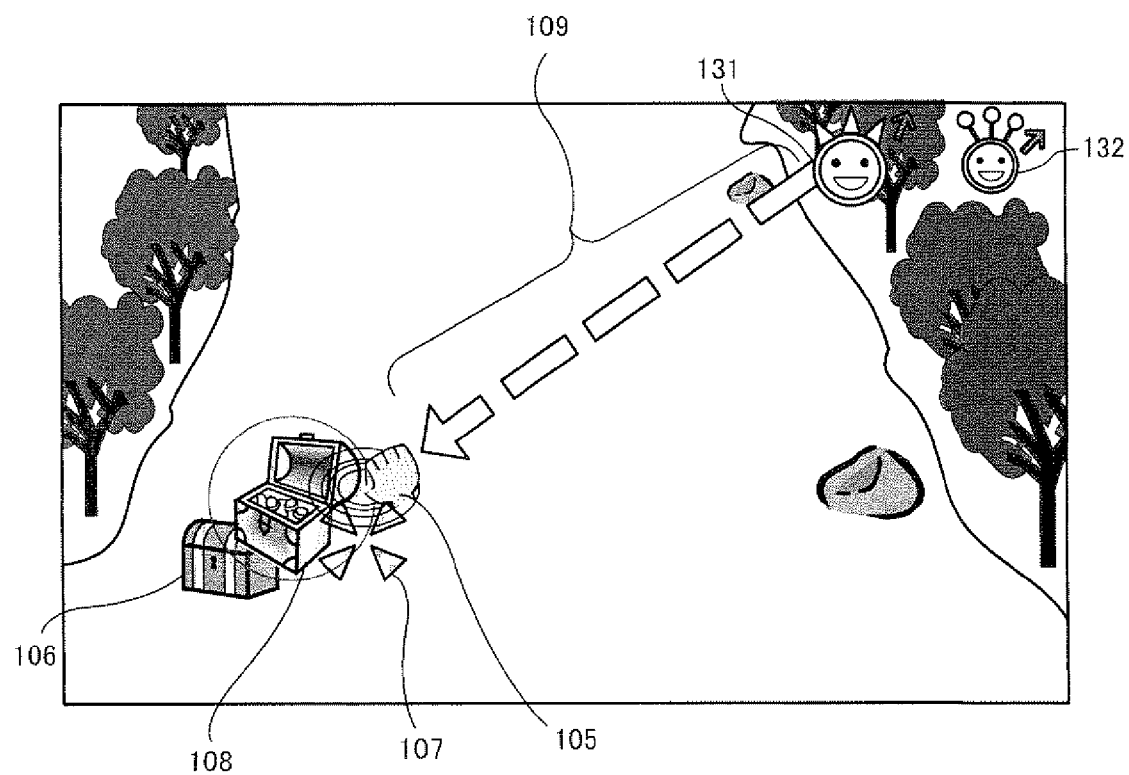
FIG. 25 shows an example of a game screen assumed in this embodiment.
Figure 26:
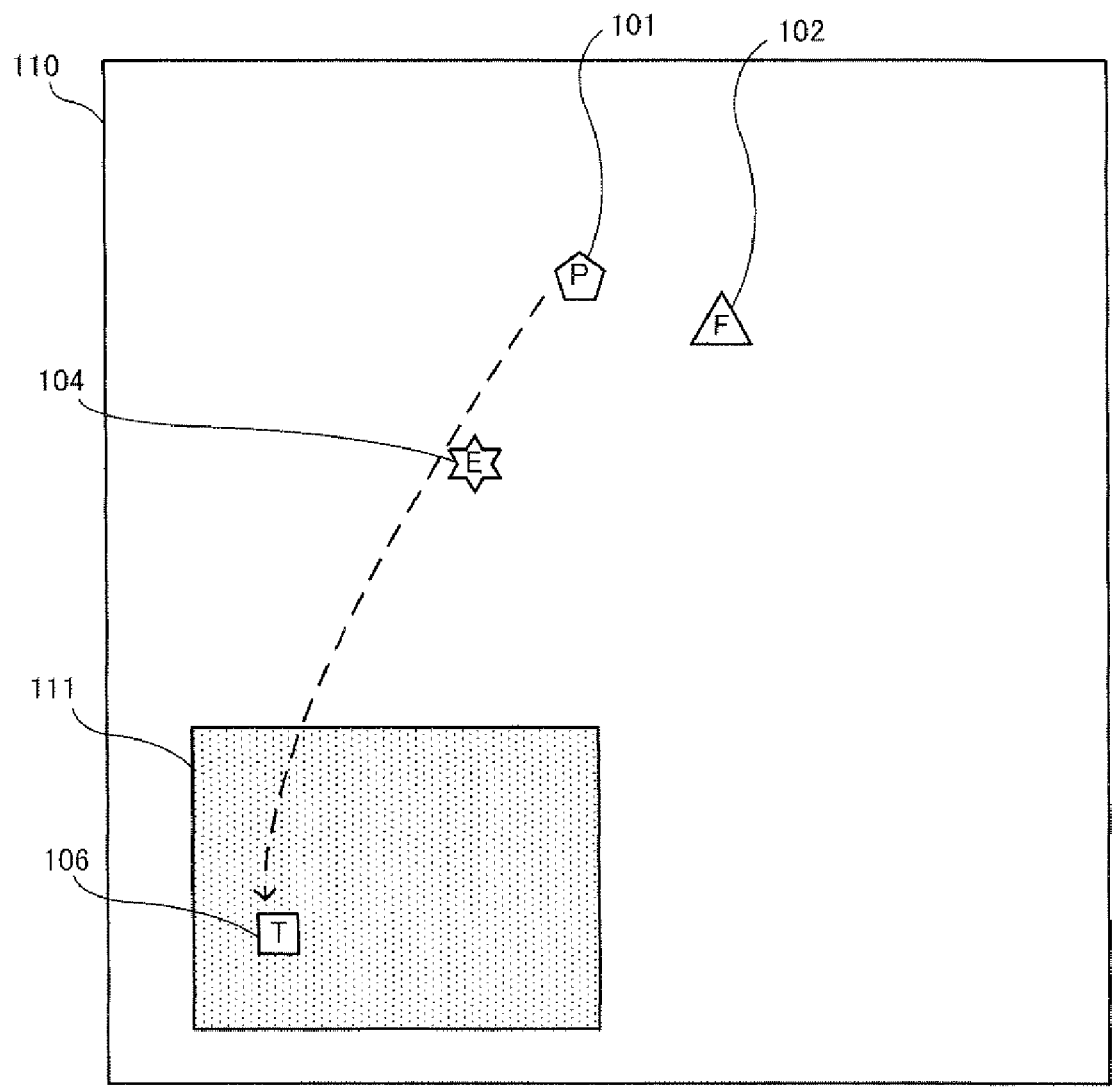
FIG. 26 shows the relationship between the entire virtual game space and the area displayed on the screen.
Figure 27:
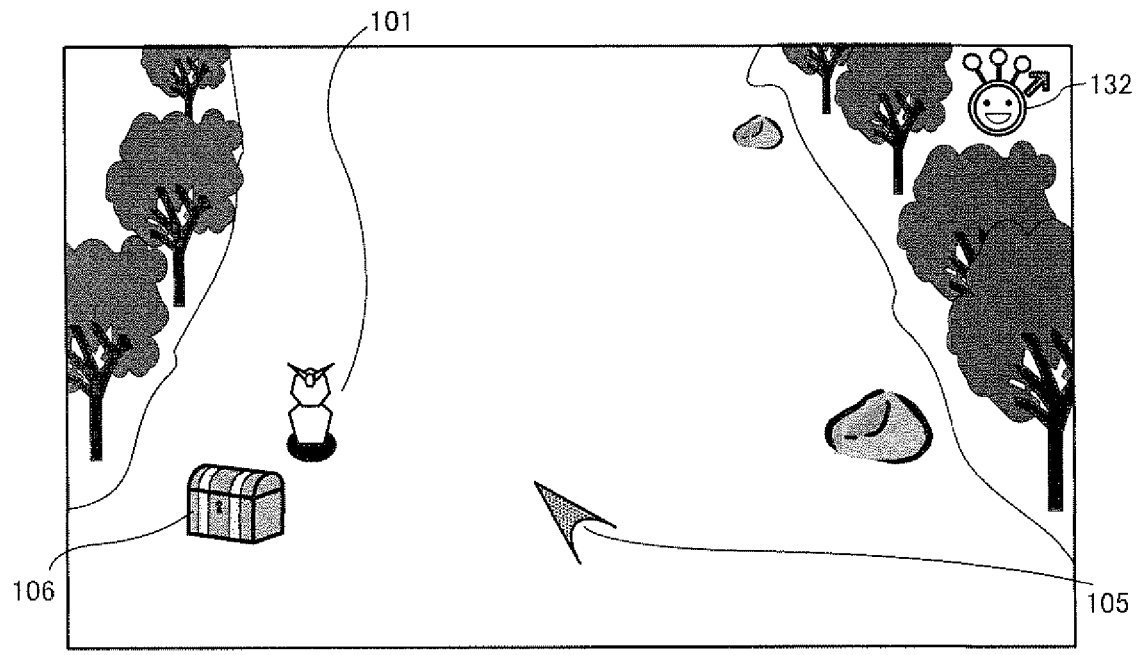
FIG. 27 shows an example of a game screen assumed in this embodiment.

Now, when the player further scrolls down the screen from the state in FIG. 19 to the state in FIG. 22, the treasure box 106 appears in the screen as shown in FIG. 23. In order to make an operation to instruct the player unit to acquire the treasure box 106 in this state, the player first drags the unit icon 131 corresponding to the player unit 101. As a result, as shown in FIG. 24, the pointing icon 107 is displayed. The information icon 108 (having a pattern indicating that the treasure box can be opened) is also displayed as overlapping the treasure box 106. As shown in FIG. 25, the player moves the pointing icon 107 to the position of the treasure box 106. At this stage also, the dashed line locus 109 is displayed as described above. When the pointing icon 107 overlaps the information icon 108, the information icon 108 is slightly enlarged. When the player cancels the drag state, this means that an instruction to acquire the treasure box 106 is issued to the player unit 101. As shown in FIG. 26, the player unit 101 starts a strategic action to acquire the treasure box 106 (starts moving toward the treasure box 106). Namely, when the player wishes to acquire the treasure box 106 in the state shown in FIG. 23, the player can select the player unit 101 as a target to which an instruction is to be issued, by dragging the unit icon 131, without scrolling the screen to display the player unit 101. Then, the player can issue an instruction to the player unit 101 to acquire the treasure box 106 by moving the pointing icon 107 to the treasure box 106 as the target of the strategic action and canceling the drag state. As a result, as shown in FIG. 27, the player unit 101 moves to be displayed in the screen (at this stage, the unit icon 131 is not displayed in the screen) and makes a motion to acquire the treasure box 106.

In FIG. 23, the treasure box 106 is displayed as an example. It is now assumed that when the enemy troop is displayed instead of the treasure box 106, the player wishes to cause the ally unit 102 to take a "direct action". In this case, the player first drags the unit icon 132 corresponding to the ally unit. After moving the pointing icon 107 displayed in accompaniment with the drag operation toward the enemy troop, the player cancels the drag state as described above. This means that an instruction to attack the enemy troop is issued to the ally unit 102 (ally troop). In this case also, the instruction to attack can be issued without scrolling the screen to display the ally unit 102.

Figure 28:
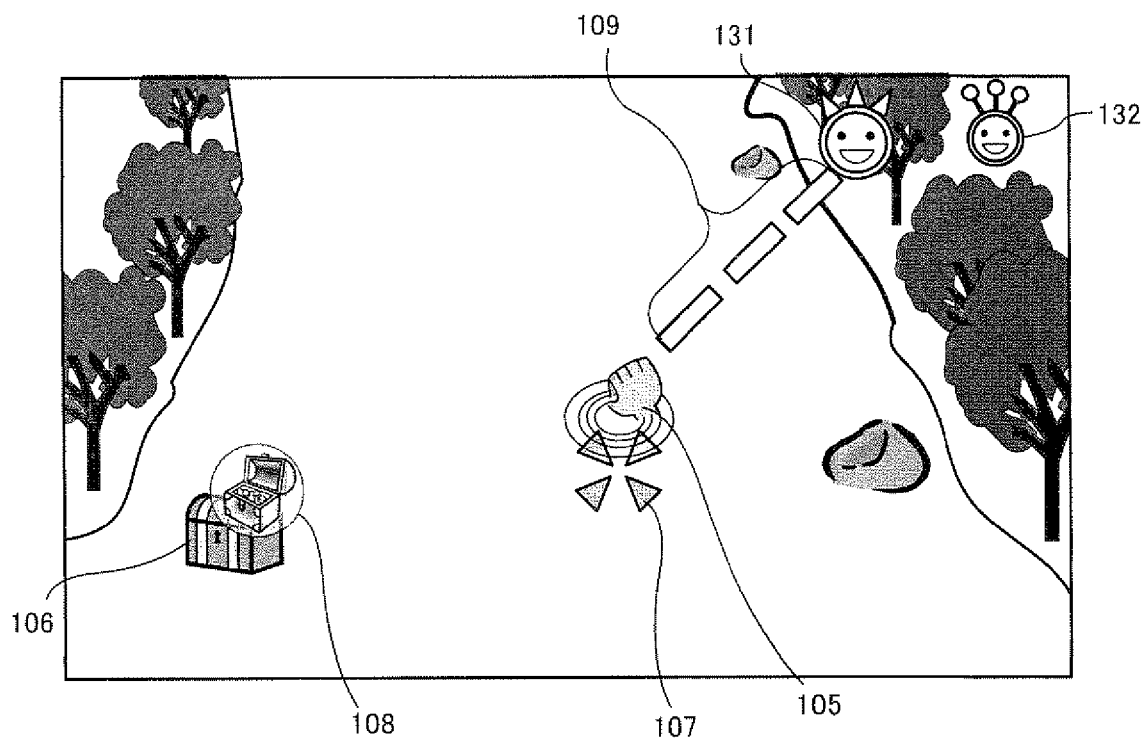
FIG. 28 shows an example of a game screen assumed in this embodiment.
Figure 29:
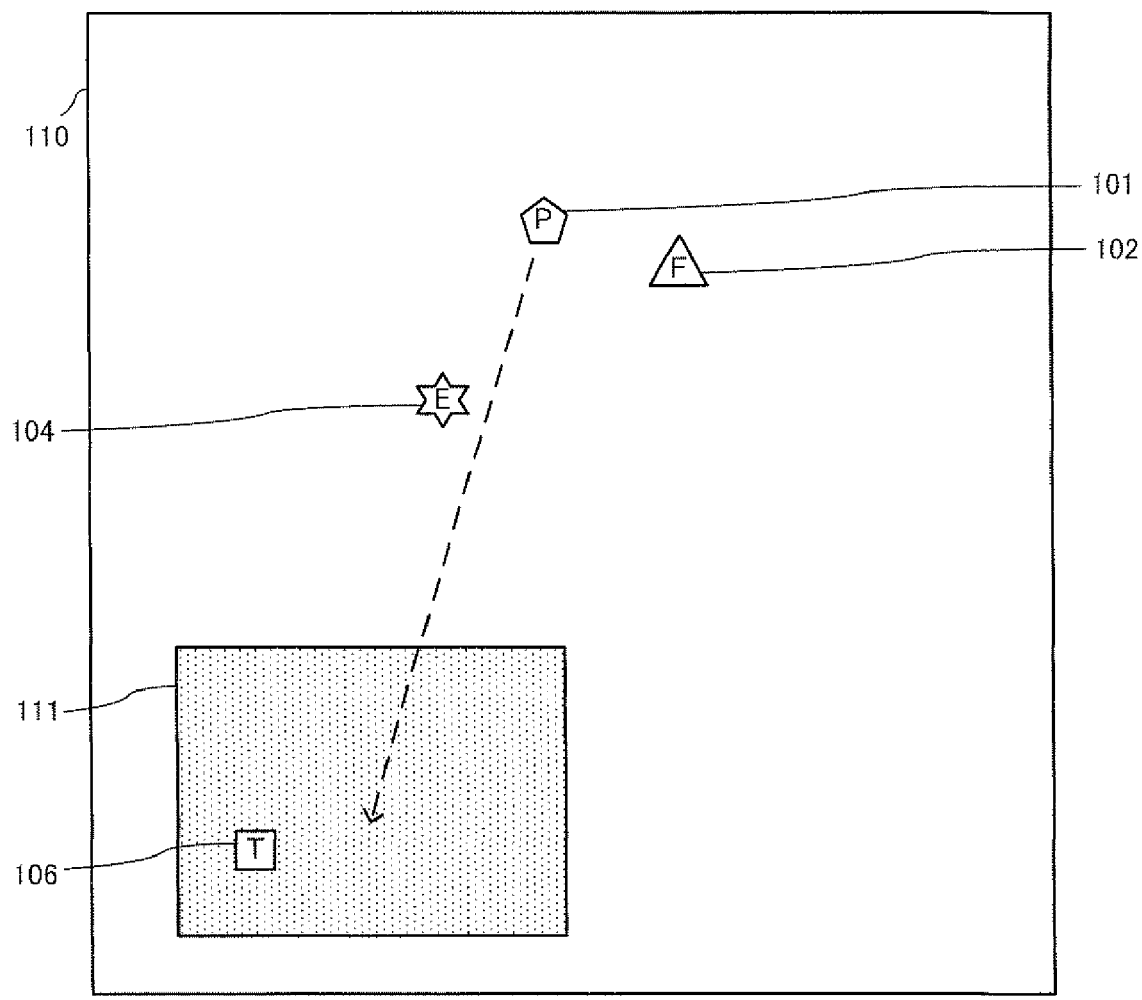
FIG. 29 shows the relationship between the entire virtual game space and the area displayed on the screen.

After performing the above-described drag operation on the player unit 101, the ally unit 102, or the unit icon 131 or 132, the player may cancel the drag state at a spot where the enemy troop, the treasure box or the like is not displayed as shown in FIG. 28. By this cancellation, the player can issue an instruction to move to the spot. In this case, unless the spot at which the drag state was cancelled is set as an inaccessible spot, the cancellation of the drag state means issuance of an instruction to "move" to that spot. As shown in FIG. 29, the unit thus instructed starts moving toward the spot at which the drag state was cancelled. In the case where the drag state is cancelled at an inaccessible spot, it is interpreted that no instruction is issued.

As described above, in this embodiment, even when the player unit 101 or the ally unit 102 is not displayed in the game screen, a unit icon can be dragged to select a unit corresponding to the unit icon as an instruction target. By moving the pointing icon 107 and canceling the drag state, an instruction can be issued to the player unit 101 or the ally unit 102 to take a strategic action in accordance with the unit or object located at the position where the drag state is canceled. Even for issuing an instruction to a unit which is not displayed in the screen, it is not necessary to scroll or switch the screen to display the unit to which the instruction is to be issued each time. The instruction can be issued quickly with a simple operation. In addition, the state of stamina of the unit corresponding to the unit icon, the number of subordinate units, or the like is displayed, so that the player can intuitively perceive the states of the player unit 101 and the ally unit 102 which are not displayed in the screen.

Figure 30:
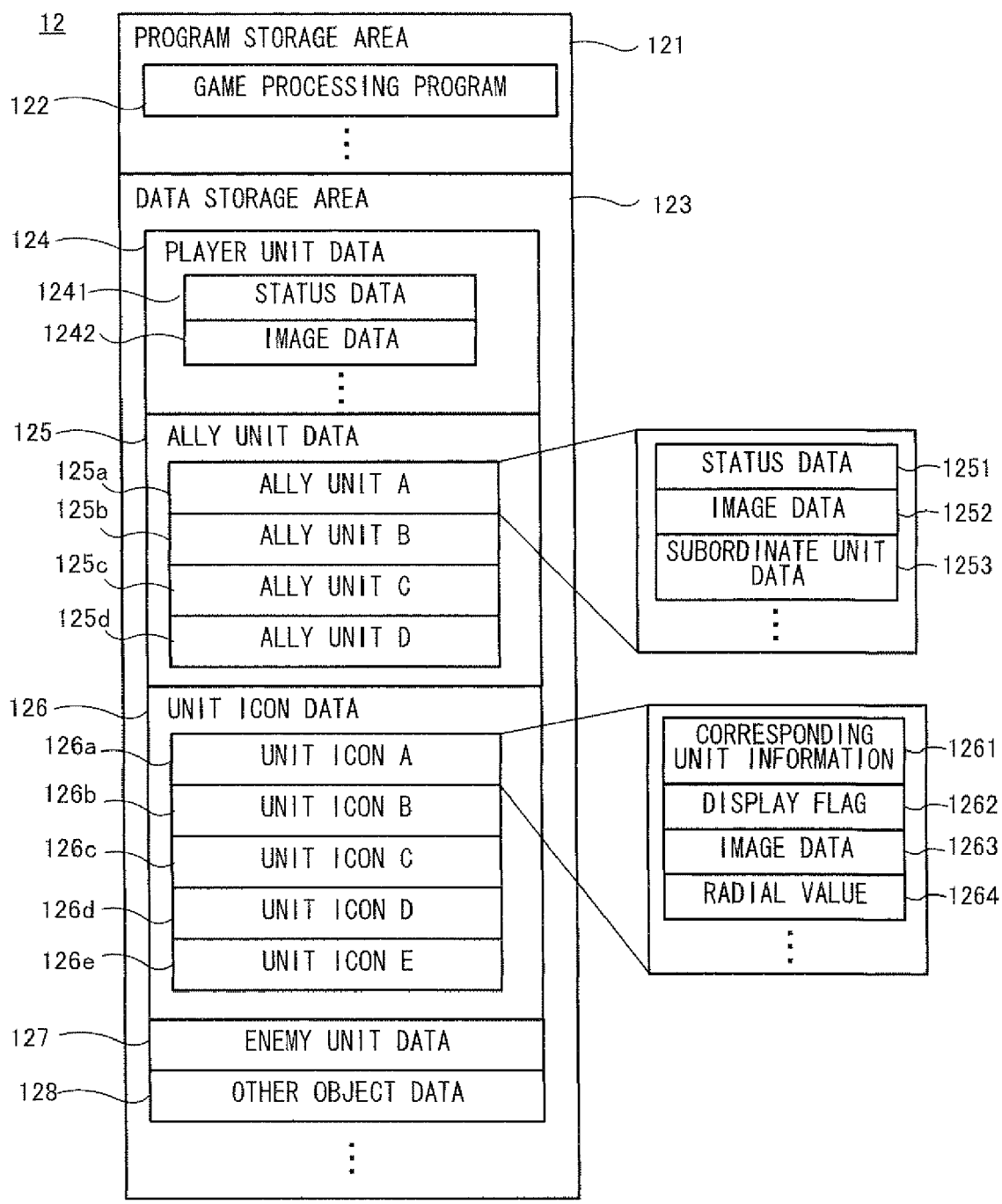
FIG. 30 shows a memory map of an external main memory 12 shown in FIG. 3.

Now, various types of data used in this embodiment will be described. FIG. 30 shows a memory map of the external main memory 12 shown in FIG. 3 (alternatively, the internal main memory 11e or both of the internal main memory 11e and the external main memory 12 may be used). As shown in FIG. 30, the external main memory 12 includes a program storage area 121 and a data storage area 123. Data in the program storage area 121 and the data storage area 123 is stored on the external main memory 12 before the game processing is executed, as a result of being copied from the disc 4 on which the data was first pre-stored.

The program storage area 121 stores a game program to be executed by the CPU 10. The game program includes a game processing program 122 or the like. The game processing program 122 is a program corresponding to the processing shown in FIG. 31 described later.

Data stored in the data storage area 123 includes player unit data 124, ally unit data 125, unit icon data 126, enemy unit data 127, other object data 128 and other data as well as various types of flags used by the game processing program 122.

The player unit data 124 is on the player unit 101, and includes status data 1241, image data 1242 and the like. The status data 1241 includes various parameters representing the status of the player unit 101 including a parameter representing the HP of the player unit 101 and the like. The image data 1242 is on images of the player unit 101 displayed on the game screen.

The ally unit data 125 is on the ally unit. In this embodiment, there can be up to four ally units. Therefore, ally unit data 125a through 125d corresponding to four units is stored. Each piece of ally unit data 125 includes status data 1251, image data 1252, subordinate unit data 1253 and the like. The status data 1251 includes various parameters representing the status of the ally unit 102 including a parameter representing the HP of the ally unit 102 and the like. The image data 1252 is on images of the ally unit 102 displayed on the game screen. The subordinate unit data 1253 is on the subordinate units 103 associated with the ally unit 102 as belonging to the same troop. The subordinate unit data 1253 includes the number of the subordinate units 103, the status data, image data and the like of each subordinate unit.

The unit icon data 126 is on the unit icon 132 or 132 shown in FIG. 21 or the like. In this game, the player can have five operation targets in total, i.e., one player unit and four ally units. Therefore, unit icon data 126a through 126e corresponding to five units (unit icons A through E) is stored.

Each piece of unit icon data 126 includes corresponding unit information 1261, a display flag 1262, image data 1263, a radial value 1264 and the like. The corresponding unit information 1261 represents the player unit or ally unit associated with the respective unit icon. In this embodiment, it is assumed that the unit icon A is pre-associated with the player unit 101, and the unit icons B through E are pre-associated with the ally units A through D. (Namely, the unit icon A corresponds to the unit icon 131 in FIG. 21, and the unit icons B through E correspond to the unit icon 132 in FIG. 21.)

The display flag 1262 represents whether or not the respective unit icon is to be displayed on the screen. When the flag is on, such a flag shows that the unit icon is to be displayed on the screen. When the flag is off, such a flag shows that the unit icon is not to be displayed on the screen. The image data 1263 is on images of the unit icon displayed on the screen, and includes, for example, images mimicking the facial expressions as described above with reference to FIG. 21. The radial value 1264 is a parameter representing the size of the unit icon, which is used in icon alignment processing as described later. As described above, the unit icons in this embodiment are basically circular, and the radius of the circle is stored as the radial value 1264.

The enemy unit data 127 is on the enemy unit 104, and includes status data representing the HP or the like, image data and the like.

The other object data 128 is on objects other than the above-described units, and includes, for example, data on the treasure box 106.

On the external main memory 12, data on the virtual game space (stage data, topography data, etc.), audio data and other data necessary for the game processing is stored as well as the data included in the information shown in FIG. 30.

Figure 31:
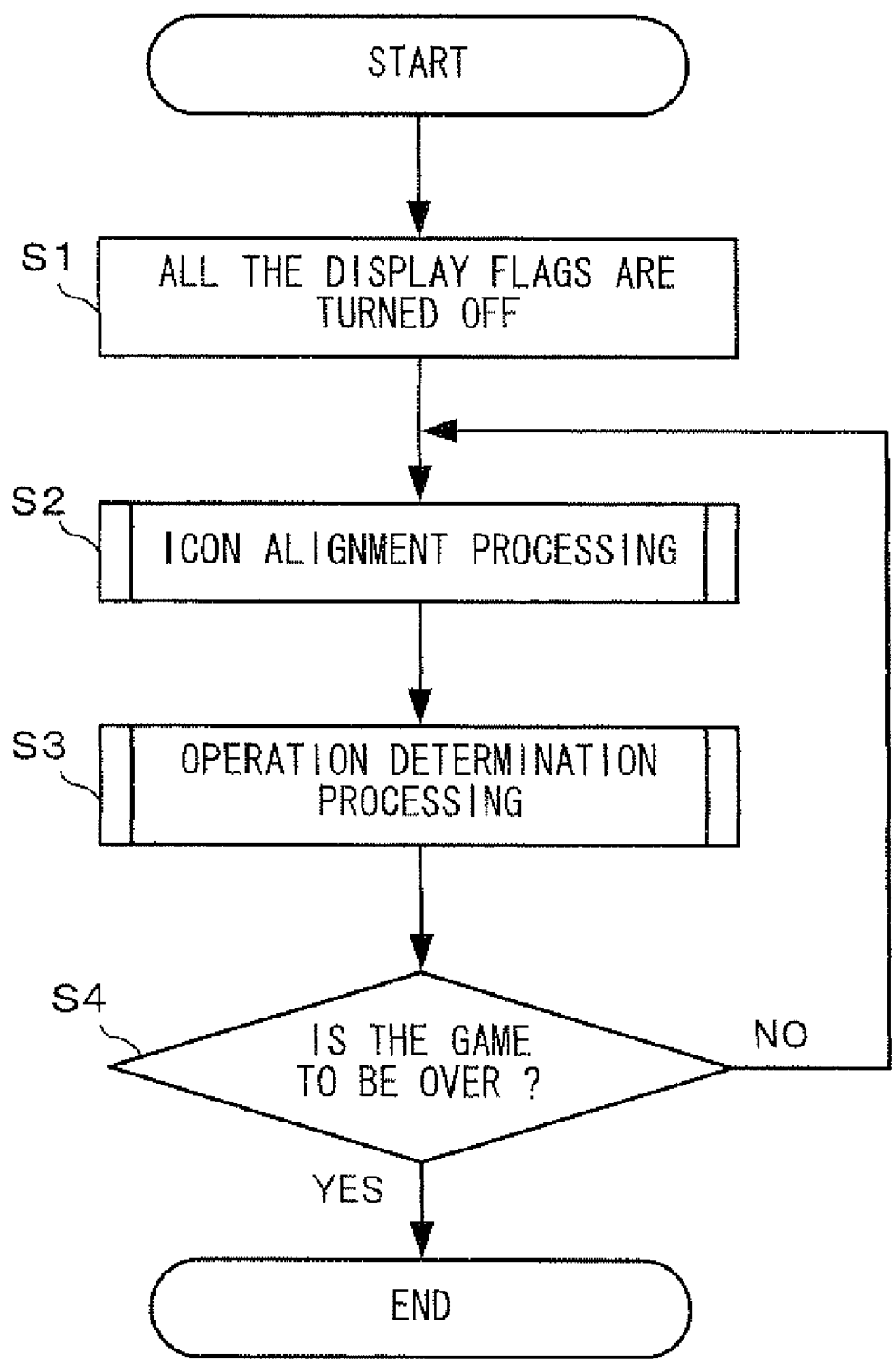
FIG. 31 is a flowchart showing game processing according to an embodiment.

Now, with reference to FIG. 31 through FIG. 41, game processing executed by the game apparatus 3 will be described. When the power of the game apparatus 3 is turned on, the CPU 10 of the game apparatus 3 executes a starting program stored on the ROM/RTC 13 to initialize various elements including the external main memory 12. The game program stored on the optical disc 4 is read onto the external main memory 12, and the CPU 10 starts the execution of the game program. The flowchart in FIG. 31 shows the game processing of operating the units described above. The game processing other than the game processing for issuing an instruction is not directly relevant and will not be described in this embodiment. The processing loop of steps S2 through S4 shown in FIG. 31 is performed repeatedly for each frame.

As shown in FIG. 31, the CPU 10 first sets the display flags 1262 for all the unit icons to be off (step S1).

Figure 32:
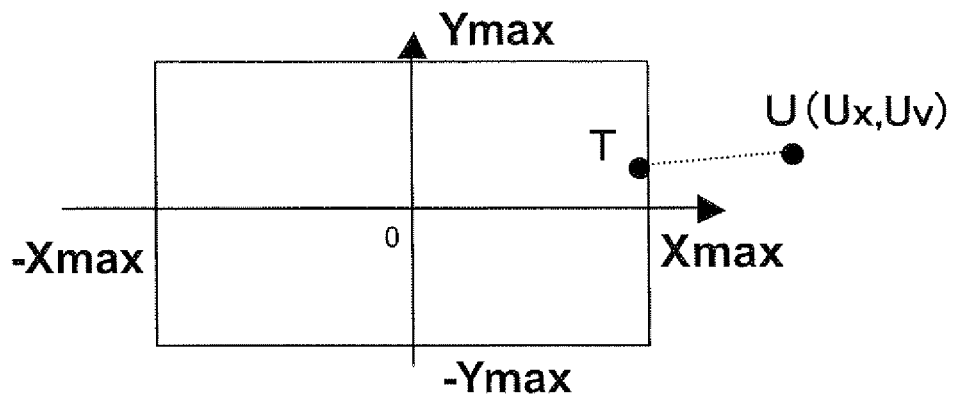
FIG. 32 shows an overview of icon alignment processing.
Figure 33:
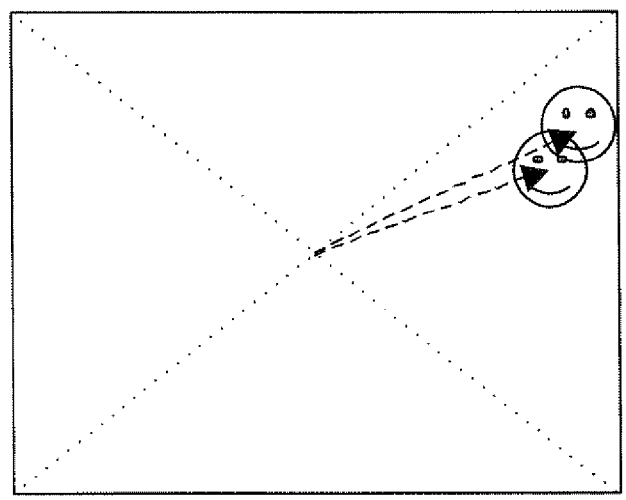
FIG. 33 shows an overview of the icon alignment processing.
Figure 34:
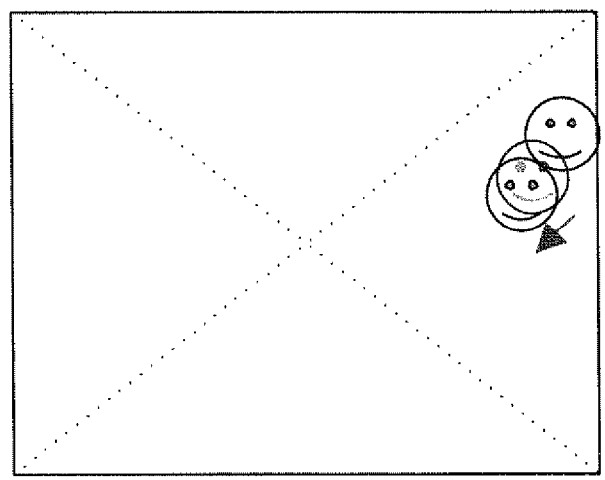
FIG. 34 shows an overview of the icon alignment processing.

Next, the CPU 10 executes icon alignment processing (step S2). By this processing, processing of calculating the position at which unit icons corresponding to the units which are not displayed in the screen are to be displayed, and processing of adjusting the display positions thereof so that the unit icons do not overlap each other (namely, processing of aligning the unit icons) are executed. With reference to FIG. 32 through FIG. 34, an overview of this processing will be described. First, with respect to a unit U located outside the screen, a point in the screen closest to the unit U is calculated as a target point T. Then, the corresponding unit icon is located at the point T. This is performed for each unit. It is determined whether or not the unit icons displayed at the points T collide against each other (FIG. 33). When the unit icons collide against each other, the display position of the icon closer to the center of the screen is adjusted to be still closer to the center of the screen (FIG. 34).

Figure 35:
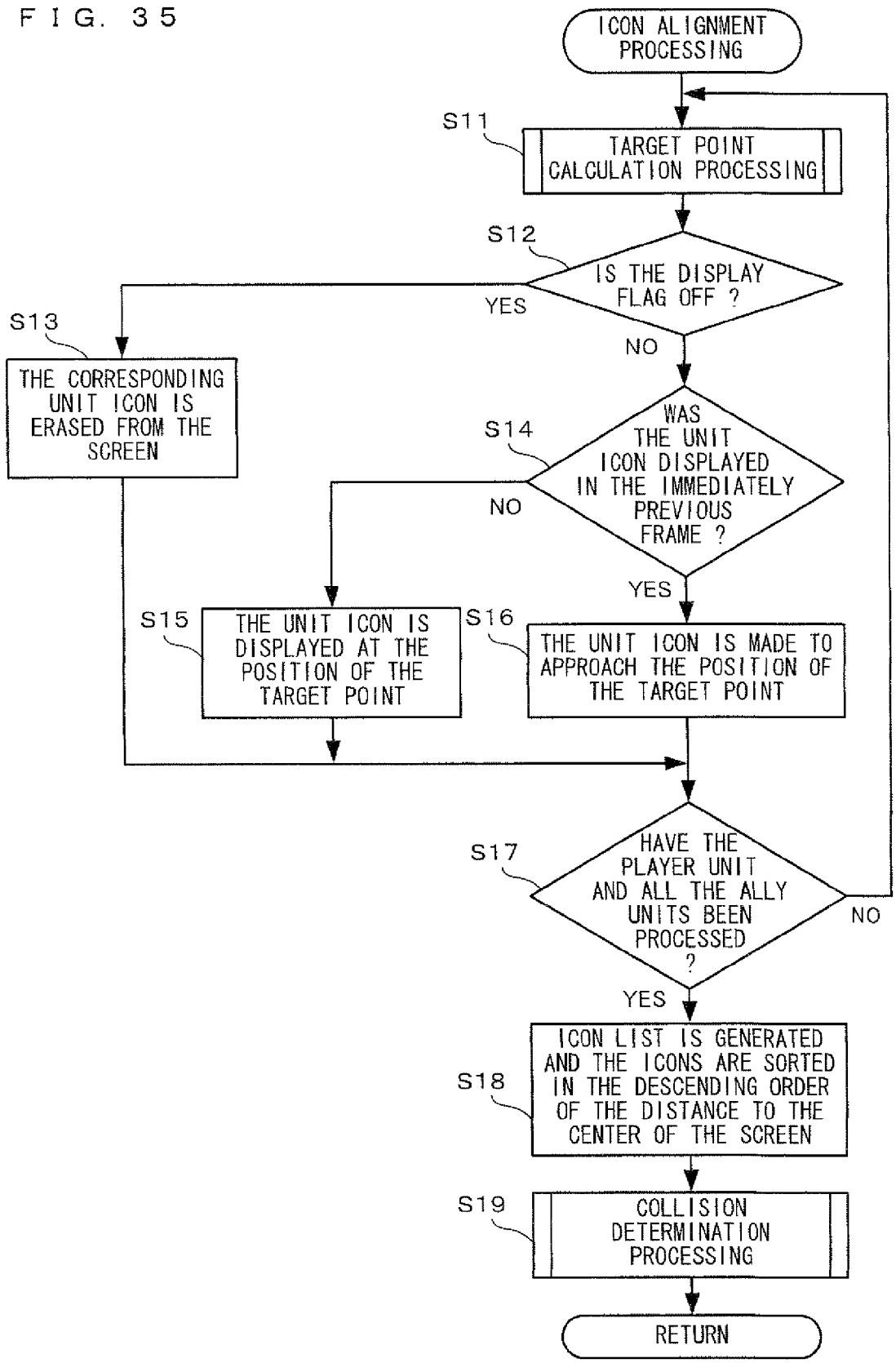
FIG. 35 is a flowchart showing details of the icon alignment processing in step S2 of FIG. 31.
Figure 36:
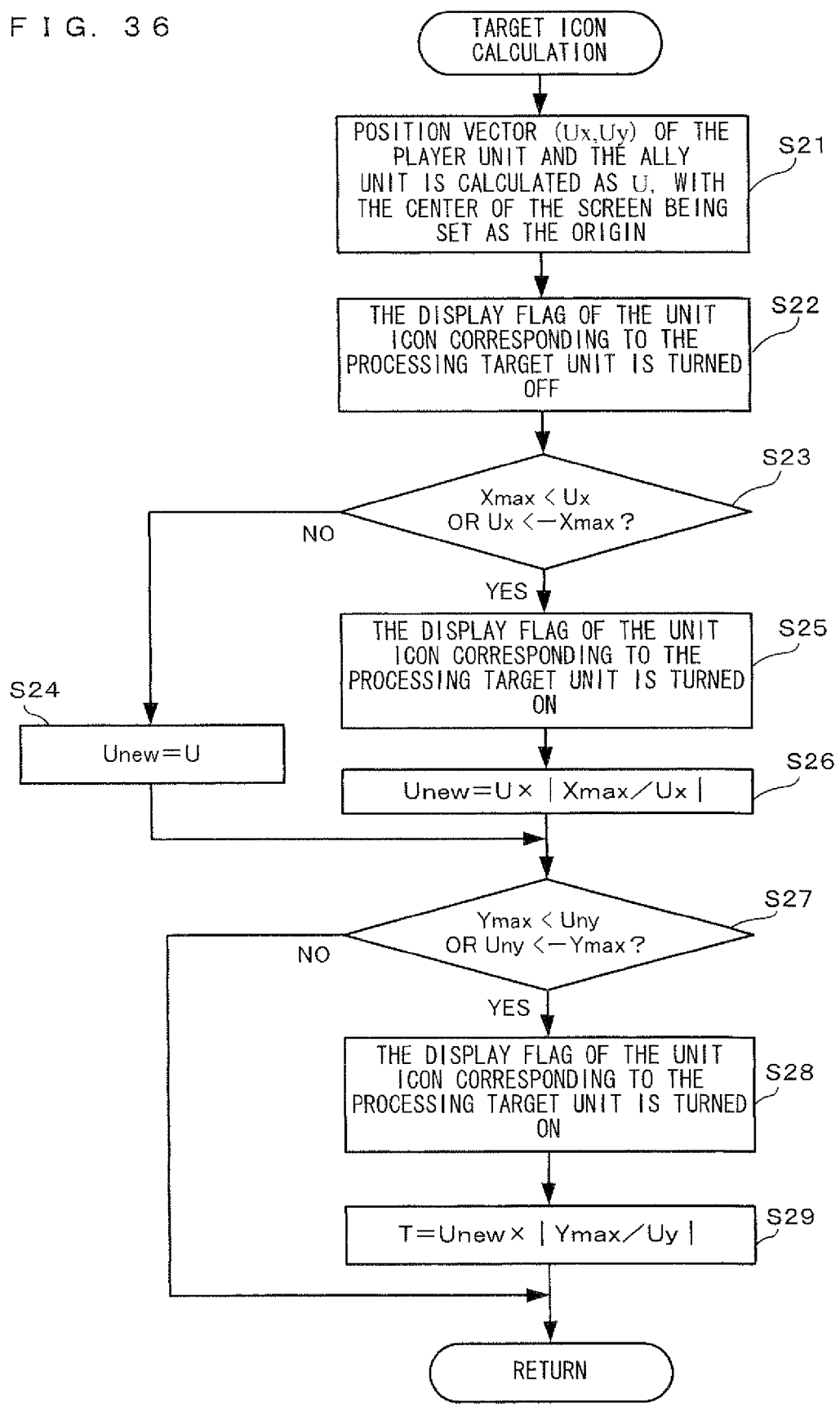
FIG. 36 is a flowchart showing details of target point calculation processing in step S11 of FIG. 35.

FIG. 35 is a flowchart showing details of the alignment processing in step S2. As shown in FIG. 35, the CPU 10 first selects one unit as the processing target unit from the player unit and the ally units (here, the CPU 10 first selects the player unit), and executes target point calculation processing on the unit (step S11). By this processing, the above-described processing of calculating the target point T is executed. FIG. 36 is a flowchart showing details of the target point calculation processing in step S11. As shown in FIG. 36, the CPU 10 first calculates a two-dimensional vector (Ux, Uy) of the player unit 101 or each ally unit, which is the processing target unit, as U, where the center of the screen is set as the origin (step S21). The processing in step S21 will be described more specifically. The CPU 10 first obtains the position of the player unit or each ally unit in the virtual game space, and converts the position from the three-dimensional coordinate system to the two-dimensional coordinate system. The two-dimensional coordinate system is set as a coordinate system, the origin (0, 0) of which is the center of the screen. Hereinafter, the post-conversion coordinate set will be represented as (Ux, Uy). The CPU 10 calculates a vector from the origin (0, 0) at the center of the screen to (Ux, Uy) as a two-dimensional vector U.

Next, the CPU 10 sets the display flag 1262 of the unit icon corresponding to the processing target unit to be off (step S22).

Next, the CPU 10 determines whether or not the processing target unit is outside the displayed screen area regarding an X-axis direction (step S23). Specifically, the CPU 10 determines whether or not Ux is larger than Xmax (see FIG. 32), which is a value representing the right end border of the screen, or whether or not Ux is smaller than −Xmax, which is a value representing the left end border of the screen (for example, where the screen resolution is VGA (640×480), Xmax is "320" and −Xmax is "−319"). When the value of Ux is determined to be larger than −Xmax and smaller than Xmax (NO in step S23), a positional vector U is set as a value of a variable Unew (step S24). The variable Unew is represented by (Unx, Uny). By contrast, when the value of Ux is determined to be larger than Xmax or smaller than −Xmax (YES in step S23), this means that the processing target unit is outside the screen. Therefore, the CPU 10 sets the display flag 1262 of the unit icon corresponding to the processing target unit to be on in order to display the unit icon in the screen (step S25). Next, the CPU 10 calculates the value of the variable Unew by the following expression (step S26).

$$U\text{new} = Ux \mid X\text{max}/Ux \mid$$

Next, the CPU 10 determines whether or not the processing target unit is outside the displayed screen area regarding a Y-axis direction (step S27). Specifically, the CPU 10 determines whether or not Uny is larger than Ymax (see FIG. 32), which is a value representing the top end border of the screen, or whether or not Uny is smaller than −Ymax, which is a value representing the bottom end border of the screen (for example, where the screen resolution is VGA (640×480), Ymax is "240" and −Ymax is "−239"). When the value of Uny is determined to be larger than −Ymax and smaller than Ymax (NO in step S27), the target point calculation processing is terminated.

By contrast, when the value of Uny is determined to be larger than Ymax or smaller than −Ymax (YES in step S27), this means that the processing target unit is outside the screen. Therefore, as in step S25, the CPU 10 sets the display flag 1262 of the unit icon corresponding to the processing target unit to be on (step S28). Next, the CPU 10 calculates the value of the target point T by the following expression in order to determine the display position of the unit icon (step S29).

$$T = U\text{new} \times \mid Y\text{max}/Uy \mid$$

Thus, the target point calculation processing is terminated.

Returning to FIG. 35, the CPU 10 determines whether or not the display flag 1262 of the unit icon corresponding to the processing target unit is set to be off as a result of the processing in step S11 (step S12). When the display flag 1262 is determined to off (YES in step S12), the CPU 10 erases the corresponding unit icon, if displayed, from the screen (step S13), and advances to processing of step S18 described later.

By contrast, the display flag is determined not to be off, i.e., the display flag is determined to be on (NO in step S12), the CPU 10 determines whether or not the unit icon corresponding to the processing target unit was displayed in the immediately previous frame (step S14). When the unit icon is determined not to have been displayed (NO in step S14), it is considered that the player unit disappeared from the screen immediately before as a result of, for example, the screen being scrolled. In this case, the CPU 10 generates a unit icon based on the status data 1241 or 1251 (the remaining amount of HP or the like) of the unit at that point, and displays the unit icon at the position of the target point T (step S15). At this stage, the CPU 10 displays the unit icon such that the central point thereof is shifted from the target point T by a predetermined distance, in order to allow the entire unit icon to be displayed in the screen. The CPU 10 advances to processing of step S17 described later.

By contrast, when the unit icon is determined to have already been displayed in the immediately previous frame (YES in step S14), the CPU 10 executes the processing of making the display position of the unit icon corresponding to the processing target unit approach the target point T calculated above (step S16). Namely, the CPU 10 executes the processing of moving the central point of the unit icon toward the target point T calculated above by a predetermined distance. As a result of such processing being repeated frame by frame, the unit icon is displayed in the screen as moving to a position close to the corresponding unit whenever necessary. At this stage, particulars of the image of the unit icon are updated in accordance with the status data or the subordinate unit data of the corresponding unit. For example, when the remaining amount of HP is lower than a predetermined value, the image of the unit icon is updated so as to have a look of pain on the face. The image of the ally unit is updated by increasing or decreasing the number of the bars 1321 in accordance with the number of the subordinate units (see FIG. 21).

Next, the CPU 10 determines whether or not the processing in steps S11 through S16 has been executed on the player unit and all the ally units (step S17). When it is determined that there is still a unit(s) unprocessed (NO in step S17), the CPU 10 sets the unprocessed unit as the processing target unit and returns to step S11 to repeat the processing. (Here, the units are processed in the order of the player unit and then the ally units A through D.)

When it is determined that all the units have been processed (YES in step S17), the CPU 10 executes processing of generating an icon list (step S18). The processing in step S18 will be described more specifically with reference to FIG. 37. The CPU 10 first generates an icon list 201 shown in FIG. 37 regarding the unit icons currently displayed in the external main memory 12 (in FIG. 37, it is assumed that all the unit icons are displayed). The icon list 201 shows a distance of each of the unit icons A through E to the center of the screen. Next, the CPU 10 sorts the unit icons in the icon list 201 in the descending order of the distance to the center of the screen to generate a list 202. The post-sorting list 202 is used in collision determination processing described now.

The CPU 10 executes the collision determination processing (step S19). By this processing, the CPU 10 executes processing of adjusting the display positions of a plurality of unit icons on the screen so that the unit icons do not overlap each other. More specifically, the CPU 10 makes a collision determination on each unit icon from the top of the list 202 with respect to each of all the unit icons listed above the each unit icon (determination on whether or not the icons having a circular shape cross each other; see FIG. 33). When the unit icons cross each other, said each unit icon is moved toward the center of the screen by the distance by which the icons cross (see FIG. 34). In this game, as described above, the operation of dragging the unit icon can be performed. However, where the unit icons are displayed as overlapping each other, the operability of dragging is significantly declined (the unit icon which the player wishes to drag cannot be dragged). Therefore, the unit icons are adjusted so as not to overlap each other in order to improve the operability.

Figure 38:
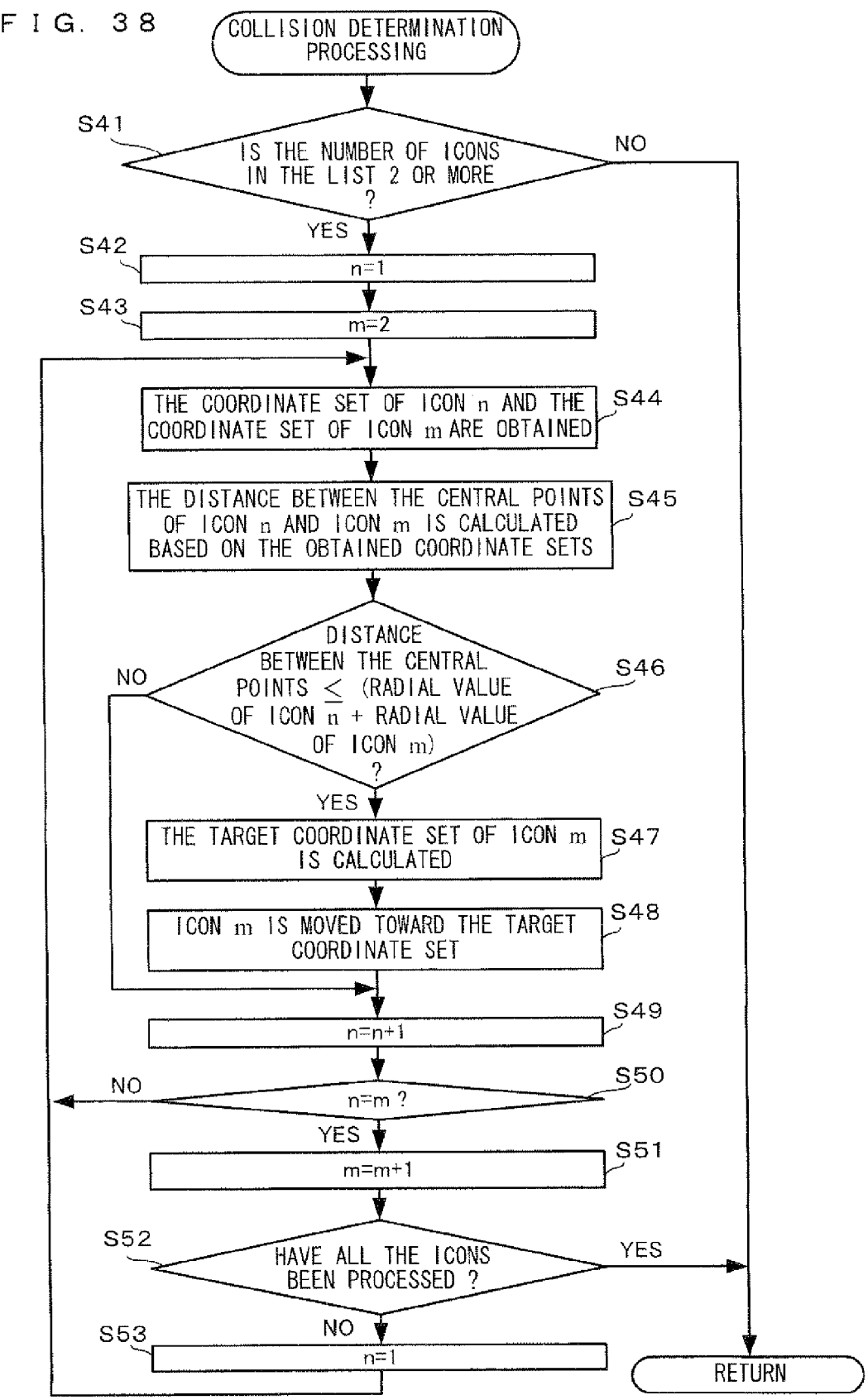
FIG. 38 is a flowchart showing details of collision determination processing in step S19 of FIG. 35.

FIG. 38 is a flowchart showing details of the collision determination processing in step 19. As shown in FIG. 38, the CPU 10 refers to the list 202 and determines whether or not the number of the unit icons registered in the list 202 (i.e., the number of unit icons displayed) is 2 or greater (step S41).

When the number of the unit icons is determined not to be 2 or greater (NO in step S41), the CPU 10 terminates the collision determination processing. The reason is that only one unit icon is displayed and so adjustment on the display position is not necessary. By contrast, when the number of the unit icons is determined to be 2 or greater (YES in step S41), the CPU 10 sets variable n to "1" (step S42) and sets variable m to "2" (step S43). These values are used to indicate at which position in the list each unit icon is registered. Hereinafter, the n'th unit icon from the top in the list 202 will be referred to as the "icon n" and the m'th unit icon from the top in the list 202 will be referred to as the "icon m".

Next, the CPU 10 obtains coordinate sets on the screen of the central point of the icon n and the central point of the icon m (the coordinate sets in the two-dimensional coordinate system) (step S44).

Next, based on the coordinate sets obtained in step S44, the CPU 10 calculates the distance between the central points of the icon n and the icon m (the number of pixels in the distance in a straight line) (step S45). Next, the CPU 10 calculates a total value of the radial value 1264 of the icon n and the radial value 1264 of the icon m (hereinafter, the total value will be referred to as the "total radial value"). The CPU 10 determines whether or not the distance between the central points calculated above is equal to or smaller than the total radial value (step S46). When it is determined that the distance between the central points is not equal to or smaller than the total radial value (NO in step S46), the CPU 10 advances to processing of step S49 described later.

By contrast, when it is determined that the distance between the central points is equal to or smaller than the total radial value (YES in step S46), this means that the icon n and the icon m overlap each other at least partially at the display positions thereof. Therefore, the CPU 10 executes processing of adjusting the display position of the icon m, which is located closer to the center of the screen. Specifically, the CPU 10 first calculates the target coordinate set for the icon m (step S47). The processing in step S47 will be described more specifically. The CPU 10 first calculates a vector from the icon n to the icon m. Then, the CPU 10 normalizes the calculated vector (makes the length 1). Hereinafter, the normalized vector will be referred to as the "vector V". The CPU 10 calculates the target coordinate set for the icon m using the following expression.

Target coordinate set=(vector $V$×total radial value)+central coordinate set of icon $n$ After calculating the target coordinate set for the icon m, the CPU 10 moves the central point of the icon m toward the target coordinate set by a predetermined distance (step S48).

Next, the CPU 10 adds 1 to the variable n (step S49). Then, the CPU 10 determines whether or not the variable n is equal to the variable m (step S50). When the variable n is determined not to be equal to the variable m (NO in step S50), the CPU 10 returns to step S44 to repeat the processing. By contrast, when the variable n is determined to be equal to the variable m (YES in step S50), the CPU 10 adds 1 to the variable m (step S51).

Next, the CPU 10 determines whether or not all the icons in the list 202 have been processed (step S52). When it is determined that there is still an icon(s) unprocessed (NO in step S52), the CPU 10 adds "1" to the variable n (step S53) and returns to step S44 to repeat the processing. By contrast, when it is determined that all the icons have been processed (YES in step S52), the CPU 10 terminates the collision determination processing.

Returning to FIG. 35, when the collision determination processing in step S19 is terminated, the icon alignment processing is terminated.

Returning to FIG. 31, after the icon alignment processing in step S2, the CPU 10 executes operation determination processing (step S3).

Figure 39:
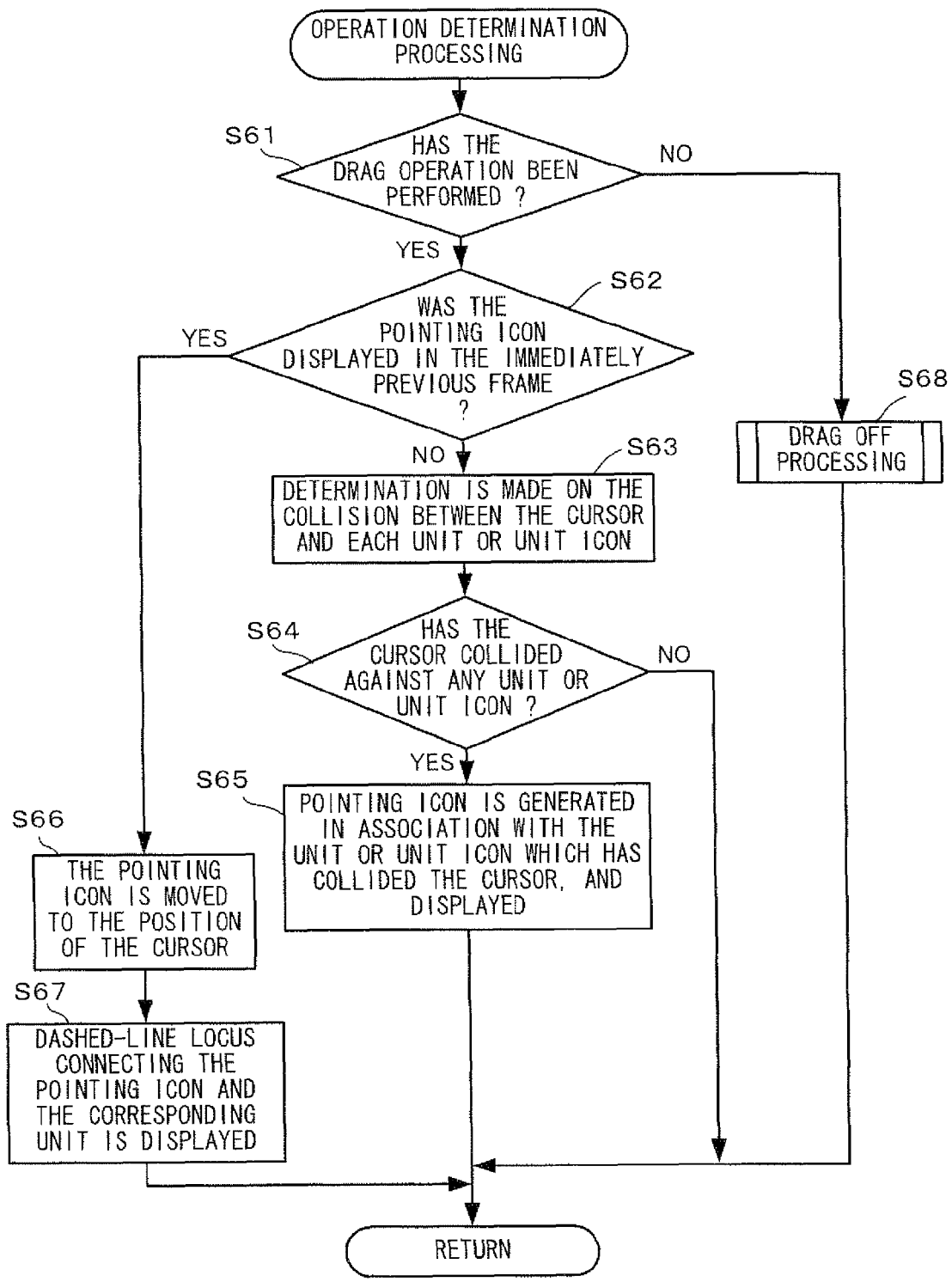
FIG. 39 is a flowchart showing details of operation determination processing in step S3 of FIG. 31.

FIG. 39 is a flowchart showing details of the operation determination processing in step S3. As shown in FIG. 39, the CPU 10 first determines whether or not the drag operation has been performed by the player based on the operation data obtained from the controller 7 (step S61). When the drag operation is determined not to have been performed (No in step S61), the CPU 10 execute drag off processing described later (step S68).

By contrast, when the drag operation is determined to have been performed (YES in step S61), the CPU 10 determines whether or not the pointing icon 107 was displayed on the screen in the immediately previous frame (in the immediately previous loop) (step S62). This determination may be made by, for example, using a flag (not shown) representing the display state of the pointing icon one frame before.

When the pointing icon 107 is determined not to have been displayed (NO in step S62), it is considered that the drag operation has just been performed. Therefore, the CPU 10 makes a collision determination on the cursor 105 against each of the player unit 101, the ally units 102, and the unit icons 131 and 132 corresponding thereto (step S63). In other words, it is determined whether or not the drag operation was performed in the state where any of the player unit 101, the ally units 102, and the unit icons 131 and 132 is pointed to by the controller 7.

The cursor 105 is displayed on a pointed coordinate set pointed to by the controller 7. An example of a method for calculating the pointed coordinate set will be described. Operation data obtained from the controller 7 includes data representing the marker coordinate sets. The data represents two marker coordinate sets (see FIG. 8) corresponding to the marker 8L and the marker 8R. Therefore, the CPU 10 first calculates the middle point between the two marker coordinate sets. The position of the middle point is represented by the xy coordinate system for representing a position on the plane corresponding to the taken image. Next, the CPU 10 converts the coordinate set representing the position of the middle point into a coordinate set of the coordinate system for representing a position on the screen of the TV 2 (x'y' coordinate system). This conversion can be performed using a function of converting a coordinate set of a middle point calculated from a taken image into a coordinate set on the screen of the actual position pointed to by the controller 7 when the taken image is taken. In this case, the position pointed to by the controller 7 and the positions of the marker coordinate sets in the taken image move in opposite directions to each other. Therefore, the conversion is performed such that top and bottom are inverted and right and left are inverted. A value represented by the x'y' coordinate value calculated in this manner is the pointed coordinate set of the controller 7, and the cursor 105 is displayed at this coordinate set.

When it is determined in step S63 that the cursor 105 has not collided against any unit or unit icon (NO in step S64), the CPU 10 terminates the operation determination processing. By contrast, when it is determined in step S63 that the cursor 105 has collided against any unit or unit icon (YES in step S64), the CPU 10 generates a pointing icon 107 in association with the unit or unit icon that the cursor 105 has collided against and displays the pointing icon 107 as overlapping such a unit or unit icon (step S65). The CPU 10 also generates and displays an information icon 108 as described above. Specifically, the CPU 10 determines whether or not a unit or object which can be a target of the strategic action (the enemy unit 104 or the treasure box 106) is present in the screen. When such a unit or object is present, the CPU 10 generates an information icon representing the strategic action which can be taken on the unit or object. The CPU 10 displays the information icon 108 as overlapping the unit or object corresponding thereto. Then, the CPU 10 terminates the operation determination processing.

By contrast, when it is determined in step S62 that the pointing icon was displayed in the immediately previous frame (YES in step S62), this means that the drag state is continued. Therefore, the CPU 10 moves the pointing icon 107 to the display position of the cursor 105 (step S66). When the pointing icon 107 collides against any information icon 108 displayed in the screen during this process, the CPU 10 displays the information icon 108 as being enlarged by a predetermined magnitude.

Next, the CPU 10 generates and displays a dashed line locus 109 connecting the pointing icon 107 and the unit (see FIG. 13) (step S67). As shown in FIG. 40, each dashed line part and the gap between the dashed line parts of the dashed line locus 109 are extended in length in accordance with the distance from the corresponding unit. Namely, the display particulars are changed in accordance with the distance between the pointing icon 107 and the unit. Owing to this, the player can intuitively perceive how far the unit to which he/she is about to issue an instruction is located, in the virtual space, from the current display position. After the dashed line locus 109 is displayed, the CPU 10 terminates the operation determination processing.

Figure 41:
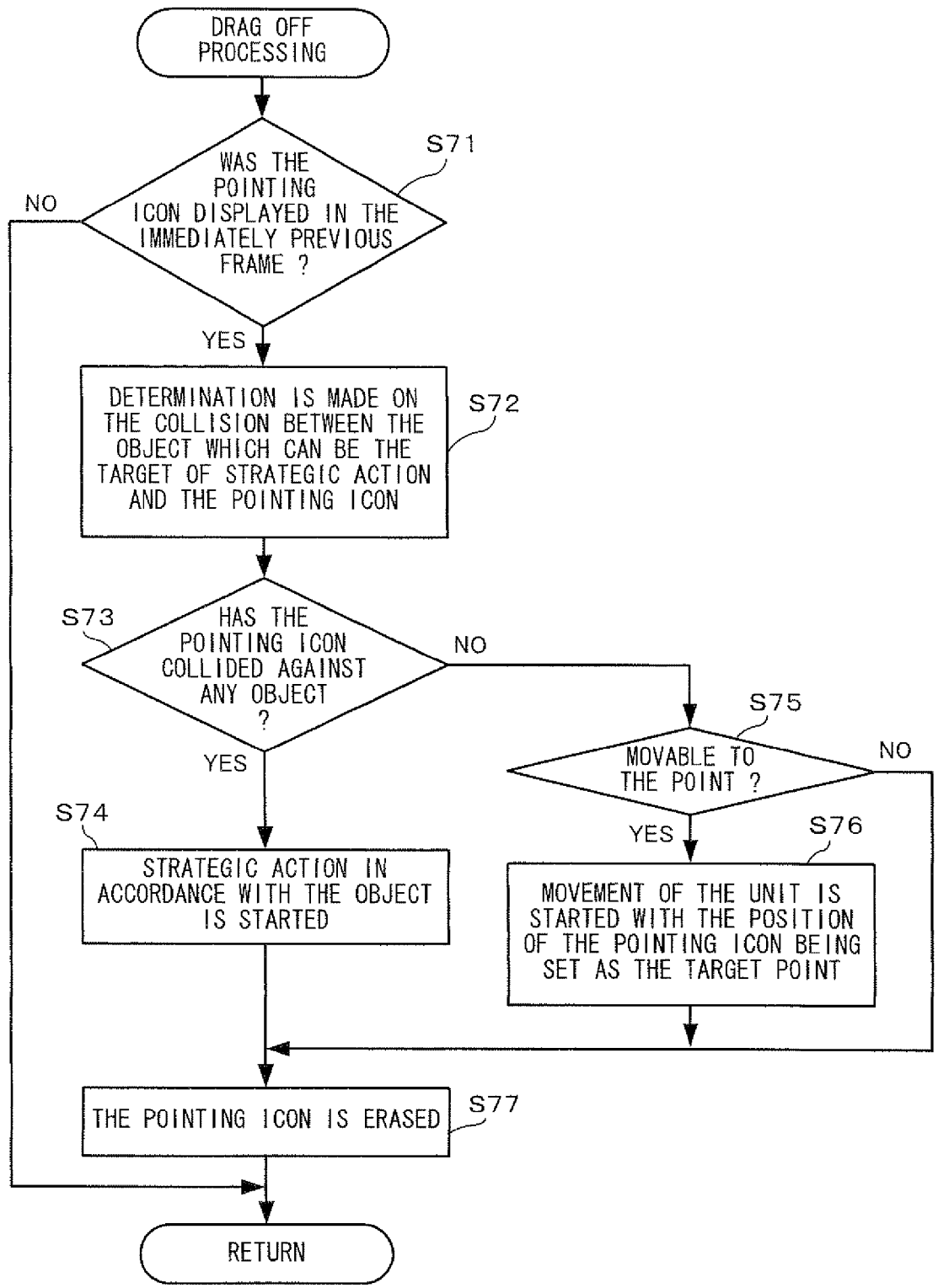
FIG. 41 is a flowchart showing details of drag off processing in step S68 of FIG. 39.

Next, an operation performed when it is determined in step S61 that no drag operation has been performed (NO in step S61) will be described. FIG. 41 is a flowchart showing details of the drag off processing in step S68. As shown in FIG. 41, the CPU 10 first determines whether or not the pointing icon 107 was displayed on the screen in the immediately previous frame (step S71). When it is determined that the pointing icon 107 was not displayed on the screen in the immediately previous frame (NO in step S71), the CPU 10 terminates the drag off processing.

By contrast, when it is determined that the pointing icon 107 was displayed on the screen in the immediately previous frame (corresponding to the state immediately after the drag state is canceled) (YES in step S71), the CPU 10 makes a collision determination on the pointing icon 107 against a unit or object which can be a target of the strategic action (the enemy troop, the treasure box 106, etc.) (step S72). The CPU 10 determines whether or not any unit or object has collided against the pointing icon 107 as a result of the processing in step S72 (step S73). When it is determined that any unit or object has collided the pointing icon 107 (YES in step S73), the CPU 10 specifies the unit or object which has collided against the pointing icon 107 as a target of the strategic action. Then, the CPU 10 causes the player unit 101 or the ally unit 102 (ally troop) associated with the pointing icon 107 to start a strategic action in accordance with the player unit or object which has collided against the pointing icon 107 (step S74). For example, in the case where the pointing icon 107 has collided against the enemy troop, the CPU 10 sets the enemy troop as the target of the attack and causes the player unit 101 or the ally unit 102 to start attack processing. In the case where the pointing icon 107 has collided against the treasure box 106, the CPU 10 causes the player unit 101 or the ally unit 102 to start processing of obtaining the treasure box.

Next, the CPU 10 erases the pointing icon 107 from the screen (step S77). Then, the CPU 10 terminates the drag off processing.

By contrast, when it is determined in step S73 that any unit or object has not collided against the pointing icon 107 (NO in step S73), the CPU 10 determines whether or not the spot in the virtual game space corresponding to the position of the pointing icon 107 is a topographical area or site which is set as accessible by the player unit 101 or the ally unit 102 (step S75). When the spot is determined to be accessible (YES in step S75), the CPU 10 sets the spot as the target spot and moves the player unit 101 or the ally unit 102 associated with the pointing icon 107 to this spot (step S76). Then, the CPU 10 executes the processing in step S77. By contrast, when the spot is determined to be inaccessible (NO in step S75), the CPU 10 advances to step S77 without executing the processing of step S76, and executes the processing of erasing the pointing icon 107. Thus, the drag off processing is terminated. Returning to FIG. 39, after the drag off processing is terminated, the operation determination processing is terminated.

Returning to FIG. 31, when the operation determination processing in step S3 is terminated, the CPU 10 determines in step S4 whether or not the game is to be over. When YES, the CPU 10 terminates the game; and when NO, the CPU 10 returns to step S2 to repeat the game processing. The description of the game processing according to this embodiment is now finished.

As described above, in this embodiment, even where the ally unit or the like is not displayed in the screen, the player can quickly issue an instruction to the ally unit 102 or the like using the unit icon. Owing to this, the operability can be further improved in a game or the like in which real time operations can be enjoyed, and so the game can be made more entertaining.

In this embodiment, the display position of a unit icon on the screen is appropriately changed in accordance with the position of the corresponding unit. Therefore, the player can intuitively perceive the direction toward the unit which is located outside the screen. In addition, a plurality of unit icons are adjusted so as not to overlap each other on the screen. Therefore, the reduction of the operability can be avoided. A unit icon has an image representing the state of HP of the corresponding unit, or an image representing the number of subordinate units where the unit icon corresponds to an ally unit. Owing to this, the player can intuitively perceive the state or the like of the unit which is located outside the screen.

Figure 42:
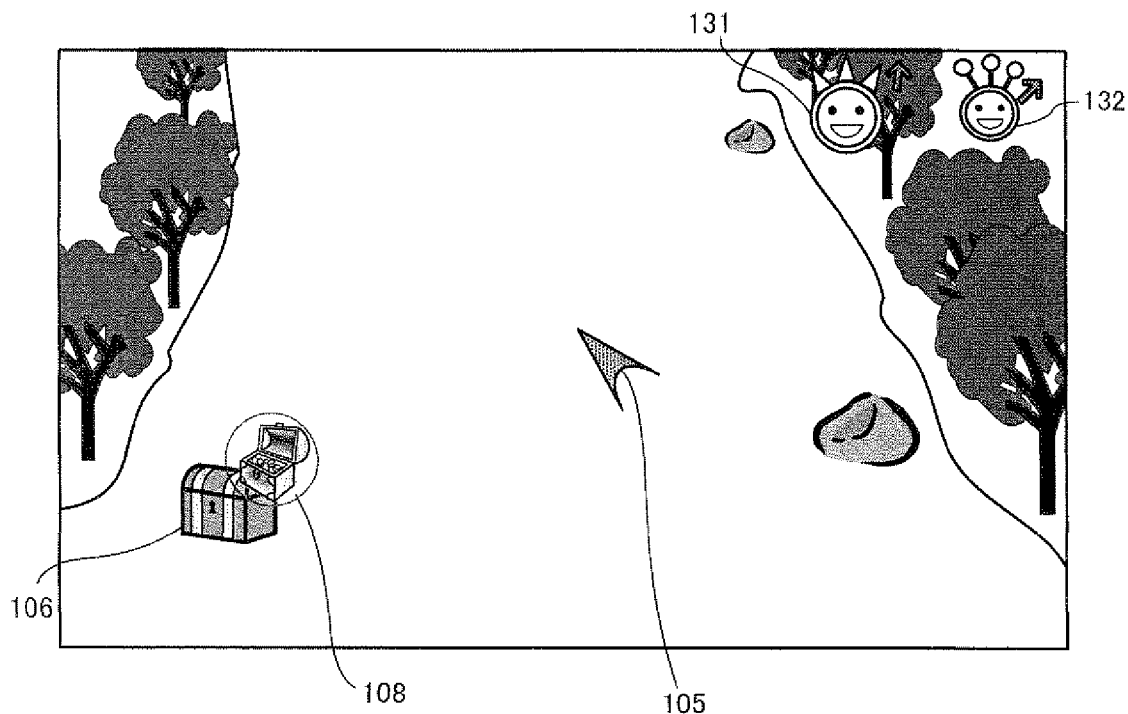
FIG. 42 shows an example of a game screen assumed in this embodiment.
Figure 43:
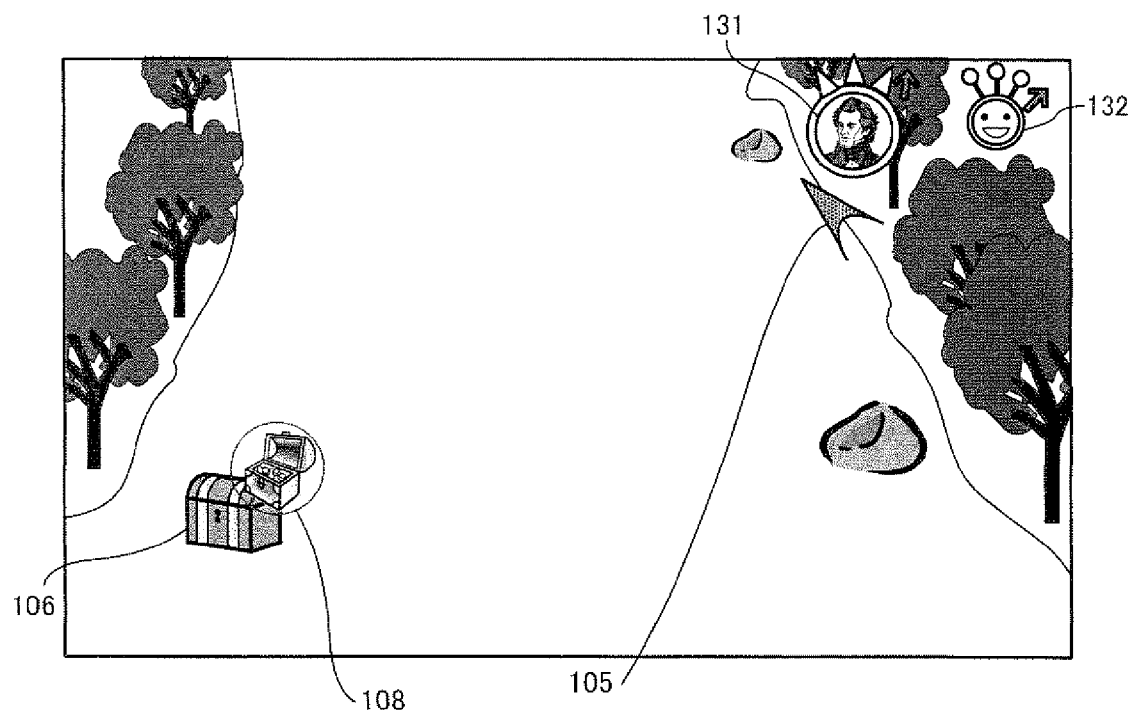
FIG. 43 shows an example of a game screen assumed in this embodiment.

In the above embodiment, the unit icons 131 and 132 are displayed in accordance with the status data such as the remaining amount of HP or the like. Alternatively, a facial image of the unit corresponding to the unit icon may be appropriately displayed. For example, it is assumed that as shown in FIG. 42, the unit icon 131 is displayed on the screen. When the cursor 105 reaches a position within a predetermined distance from the unit icon 131, as shown in FIG. 43, the unit icon 131 may be displayed by a facial image representing the character of the unit corresponding to the unit icon 131 (here, the player unit 101). At this stage, the unit icon 131 may be slightly enlarged. Owing to this, where a plurality of unit icons are displayed, the player is likely to intuitively perceive which unit icon corresponds to which unit.

Figure 44:
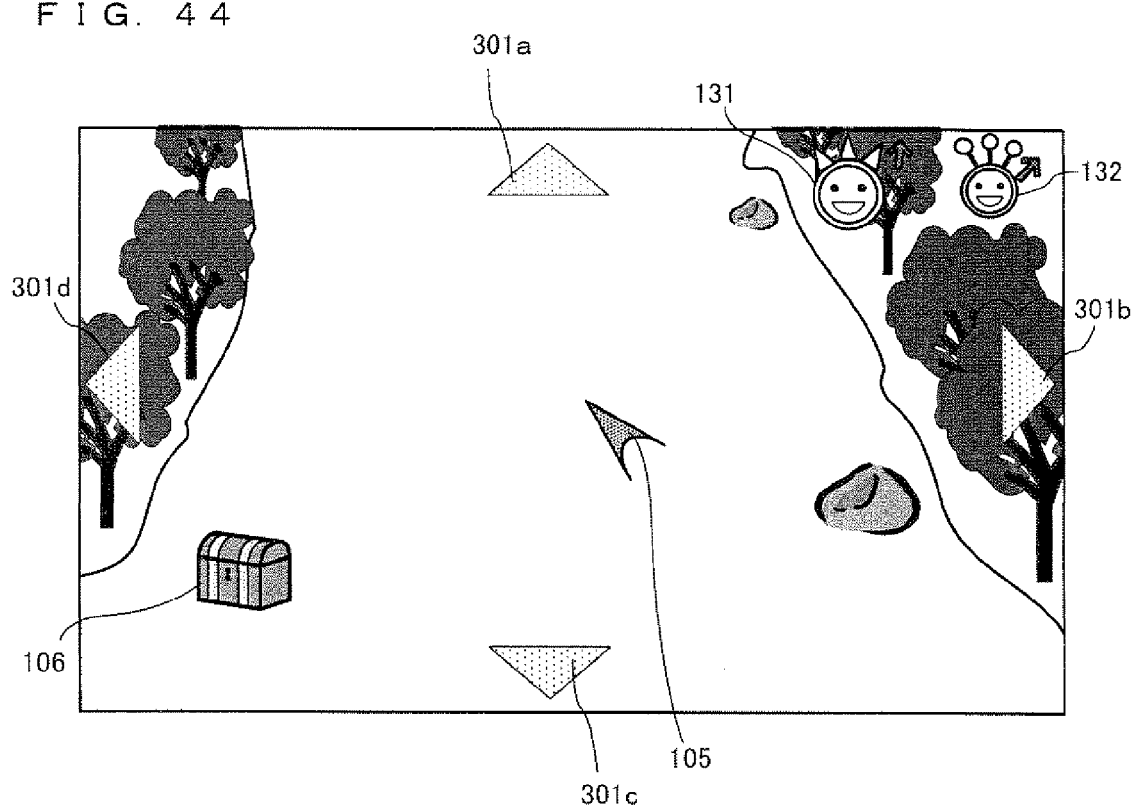
FIG. 44 shows an example of a game screen assumed in this embodiment.
Figure 45:
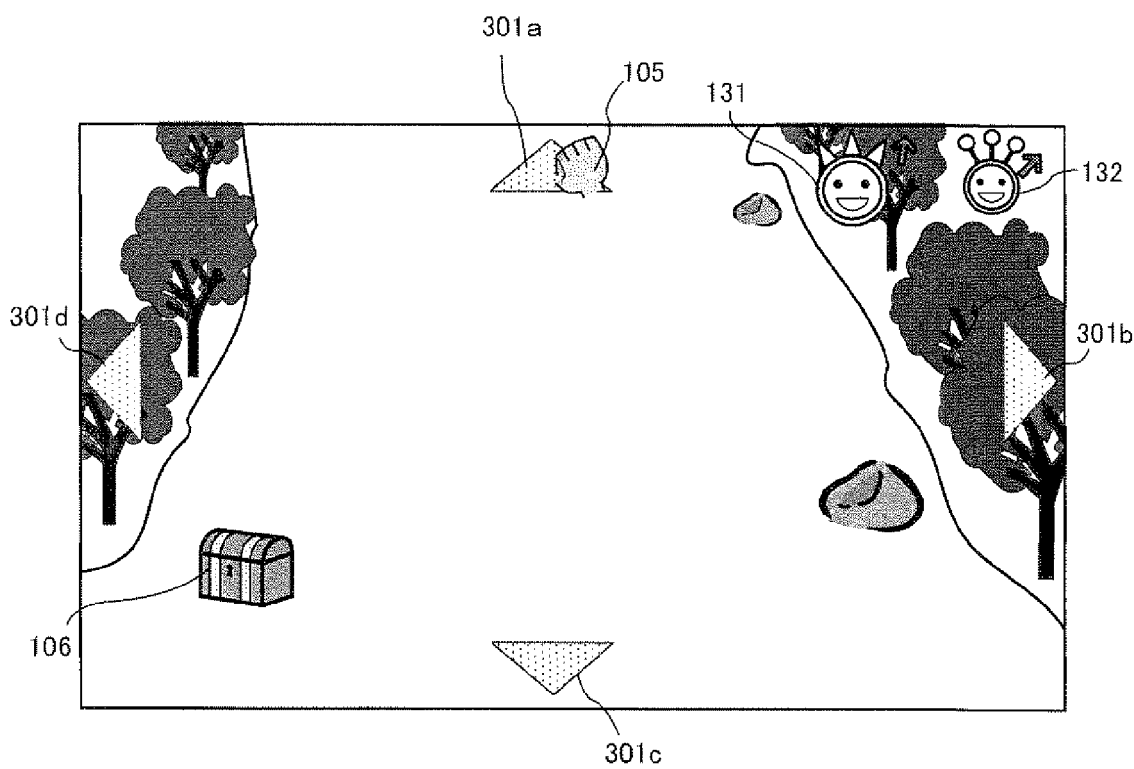
FIG. 45 shows an example of a game screen assumed in this embodiment.

In the above embodiment, the screen is scrolled using the cross key 72a. In certain example embodiments the screen may be scrolled using an analog stick. For example, a device including a predetermined analog stick may be connected to the connector 73 of the controller 7 and the operation data of the analog stick may be transmitted to the game apparatus 3, so that the screen is scrolled in accordance with the operation on the analog stick. Alternatively, as shown in FIG. 44, icons 301a through 301d for scrolling the screen may be displayed at top, bottom, right and left ends of the game screen, so that when one of the icons is dragged as shown in FIG. 45, the screen is scrolled in the direction in accordance with the dragged icon. In the example of FIG. 45, the screen is scrolled up. Still alternatively, the screen may be scrolled when the cursor 105 reaches a position within a predetermined range from the end of the screen (such a range is, for example, an area which is approximately as large as the area where each of the icons 301a through 301d is displayed in FIG. 44), without the icons 301a through 301d being displayed. Owing to this, the operability of scrolling the screen can be improved.

In this embodiment, a game apparatus using a pointing device realized by the markers 8R and 8L and the controller 7 including the imaging information calculation section 74 is described as an example. The present invention is not limited to this. In certain example embodiments, for example, a mobile terminal or a mobile game apparatus including one or two display devices and a touch panel on the screen of each display device. Namely, the touch panel may be used as a device for detecting the position on the operation area pointed to by the player. The pointing device may be of any type by which the player can indicate a position in a prescribed range. For example, the pointing device may use a mouse which can indicate any position on the screen or a tablet which indicates any position on the operation screen without any display screen.

While certain example embodiments have been described in detail, the foregoing description is in all aspects illustrative and not restrictive. It is understood that numerous other modifications and variations can be devised without departing from the scope of the invention.

What is claimed is:

1. A non-transitory computer-readable storage medium having stored thereon an information processing program to be executed by a computer of an information processing apparatus configured to output, to a screen at an interval of a unit time, a virtual space that includes at least one instruction target object which performs a predetermined motion based on an operation indicated by a player, the information processing program comprising instructions that are configured to:

detect, at an interval of the unit time, when the instruction target object is located outside a predetermined area of the virtual space;
   display, to the screen, a substitute icon that is associated with the instruction target object when the instruction target object is detected outside the predetermined area obtain operation data from an operation device at an interval of the unit time;
calculate a pointed position on the screen pointed to by the operation device based on the operation data;
a first operation performed on the substitute icon based on the operation data;
detect a second operation after detection of the first operation based on the operation data; and
cause the instruction target object associated with the substitute icon to perform a predetermined motion based on the pointed position when the second operation is detected.

2. The medium of claim 1, wherein an area displayed in the screen is set as the predetermined area.

3. The medium of claim 1, wherein the instruction target object associated with the substitute icon is moved to a new position in the virtual space based on the pointed position.

4. The medium of claim 1, wherein the predetermined motion is performed on an object located at a position in the virtual space corresponding to the pointed position.

5. The medium of claim 1, wherein the substitute icon is displayed at a position in the screen closest to the instruction target object associated with the substitute icon.

6. The medium of claim 5, wherein a plurality of the substitute icons are displayed so that the plurality of substitute icons do not cross each other.

7. The medium of claim 1, wherein the instructions are further configured to generate a line connecting the instruction target object associated with the substituted icon processed by the first operation and a position in the virtual space corresponding to the pointed position; and
display the line on the screen, after the first operation is detected and before the second operation is detected.

8. The medium of claim 7, wherein the instructions are further configured to display information regarding a distance between the substituted icon or the instruction target object associated with the substituted icon and the position in the virtual space corresponding to the pointed position.

9. The medium of claim 1, wherein:
the operation device includes at least one key;
the first operation is associated with predetermined key among the at least one key being pressed in the state where the substitute icon and the pointed position overlap each other; and
the second operation includes cancellation of pressing the predetermined key.

10. The medium of claim 1, wherein:
the operation device includes an imager for imaging an imaging target;
the operation data includes at least any of data on a taken image imaged by the imager, data representing two predetermined positions of the imaging target in the taken image, and/or data representing a position of the imaging target in the taken image; and
the pointed position is calculated from any of the data on the taken image imaged by the imager, the data representing two predetermined positions of the imaging target in the taken image, and/or the data representing the position of the imaging target in the taken image.

11. The medium of claim 1, wherein:
the operation device includes an analog stick, which is an analog system direction pointing device; and
the instructions are further configured to scroll the screen in accordance with a direction pointed by the analog stick.

12. The medium of claim 1, wherein the instructions are further configured to:

determine whether or not the pointed position overlaps a predetermined area including any of top, bottom, right, and left ends of the screen; and
when the pointed position overlaps, scroll the screen in accordance with the direction represented by the end included in the overlapping predetermined area.

13. The medium of claim 1, wherein the instructions are further configured to display, as attached to the substitute icon, information based on a parameter representing a state of the instruction target object associated with the substitute icon.

14. The medium of claim 1, wherein:
the virtual space contains at least one related object associated with the instruction target object; and
the instructions are further configured to cause the related object to execute the predetermined motion.

15. The medium of claim 14, wherein the instructions are further configured to display, as attached to the substitute icon, information on the number of the related objects associated with the instruction target object.

16. The medium of claim 1, wherein the instructions are further configured to when the first operation is detected, provide an action information display representing an action which can be taken by the instruction target object, associated with the substitute icon processed by the first operation, on an object displayed in the display screen other than the instruction target object, the an action information display being provided as overlapping the object other than the instruction operation object.

17. An information processing apparatus for displaying, in a screen of a display device at an interval of a unit time, a virtual space containing at least one instruction target object which performs a predetermined motion based on an operation of a player, the apparatus comprising:
a processing system that includes at least one processor, the processing system configured to:
detect, at an interval of the unit time, the instruction target object which is located outside a predetermined area of the virtual space;
display a substitute icon associated with the instruction target object on the screen when the instruction target object which is located outside the predetermined area is detected outside the predetermined area;
obtain operation data from an operation device at an interval of the unit time;
calculate a pointed position on the screen pointed to by the operation device based on the operation data;
detect a first operation performed on the substitute icon;
detect the performance of a second operation, different from the first operation, after detection of the first operation; and
cause the instruction target object associated with the substitute icon processed by the first operation to perform a predetermined motion based on the pointed position when the second operation is detected.

18. The apparatus of claim 17, wherein the predetermined area is an area that is displayed on the screen.

19. The apparatus of claim 17, wherein the instruction target object associated with the substitute icon processed by the first operation is moved to a position in the virtual space corresponding to the pointed position.

20. The apparatus of claim 17, wherein the instruction target object is caused to perform a predetermined motion on an object located at a position in the virtual space corresponding to the pointed position.

21. The apparatus of claim 17, wherein the substitute icon is displayed at a position in the screen closest to the instruction target object associated with the substitute icon.

22. The apparatus of claim 21, wherein the substitute icon includes a plurality of the substitute icons and the processing system is further configured to adjust display positions of the plurality of substitute icons so that the substitute icons do not cross each other.

23. The apparatus of claim 17, wherein the processing system is further configured to generate a line connecting the instruction target object associated with the substituted icon processed by the first operation and a position in the virtual space corresponding to the pointed position; and
   display the line on the screen, after the first operation is detected and before the second operation is detected.

24. The apparatus of claim 23, wherein the processing system is further configured to display information regarding a distance between the substituted icon or the instruction target object associated with the substituted icon and the position in the virtual space corresponding to the pointed position.

25. The apparatus of claim 17, wherein:
   the operation device includes at least one key;
   the first operation is associated with predetermined key among the at least one key being pressed in the state where the substitute icon and the pointed position overlap each other; and
   the second operation includes cancellation of pressing the predetermined key.

26. The apparatus of claim 17, wherein:
   the operation device includes an imager for imaging an imaging target;
   the operation data includes at least any of data on a taken image imaged by the imager, data representing two predetermined positions of the imaging target in the taken image, and data representing a position of the imaging target in the taken image; and
   the pointed position is calculated from any of the data on the taken image imaged by the imager, the data representing two predetermined positions of the imaging target in the taken image, and the data representing the position of the imaging target in the taken image.

27. The apparatus of claim 17, wherein:
   the operation device includes an analog stick, which is an analog system direction pointing device; and
   the processing system is further configured to scroll the screen in accordance with a direction pointed by the analog stick.

28. The apparatus of claim 17, wherein the processing system is further configured to determine whether or not the pointed position overlaps a predetermined area including any of top, bottom, right, and left ends of the screen, and when the pointed position overlaps, scrolling the screen in accordance with the direction represented by the end included in the overlapping predetermined area.

29. The apparatus of claim 17, wherein the processing system is further configured to display, as attached to the substitute icon, information based on a parameter representing a state of the instruction target object associated with the substitute icon.

30. The apparatus of claim 17, wherein:
   the virtual space contains at least one related object associated with the instruction target object; and
   wherein the processing system is further configured to cause the related object to execute the predetermined motion.

31. The apparatus of claim 30, wherein the processing system is further configured to display, as attached to the substitute icon, information on the number of the related objects associated with the instruction target object.

32. The apparatus of claim 17, wherein the processing system is further configured to when the first operation is detected, provide an action information display representing an action which can be taken by the instruction target object, associated with the substitute icon processed by the first operation, on an object displayed in the screen other than the instruction target object, the action information display being provided as overlapping the object other than the instruction operation object.

33. A non-transitory computer-readable storage medium having stored thereon an information processing program to be executed by a computer of an information processing apparatus for displaying, in a screen at an interval of a unit time, a virtual space containing at least one instruction target object which performs a predetermined motion based on an operation of a player, the information processing program causing the computer to:
   detect, at an interval of the unit time, the instruction target object which is located outside a predetermined area of the virtual space;
   display a substitute icon associated with the instruction target object in the screen when the instruction target object is detected as being located outside the predetermined area;
   display the substitute icons while adjusting display positions thereof so that the substitute icons do not cross each other when there are a plurality of the substitute icons; and
   cause the instruction target object associated with the substitute icon to perform a predetermined motion based on a predetermined operation.

34. An information processing apparatus for displaying, in a screen at an interval of a unit time, a virtual space containing at least one instruction target object which performs a predetermined motion based on an operation of a player, the apparatus comprising:
   a processing system that includes at least one processor, the processing system configured to:
      detect, at an interval of the unit time, a plurality of instruction target objects which are located outside a predetermined area of the virtual space;
      display a plurality of substitute icons in the screen that are each respectively associated with one of the plurality of instruction target objects that are located outside the predetermined area, the display occurring when the plurality os finstruction target objects are detected outside the predetermined area;
      adjust display positions of each one of the plurality of substitute icons so that the substitute icons do not cross each other; and
      cause the instruction target object associated with the substitute icon to perform a predetermined motion based on a predetermined operation.

35. The medium of claim 1, wherein the instructions are further configured to display the instruction target object on the display screen,
   wherein the substitute icon associated with the instruction target object is not displayed on the display screen when the instruction target object is within the predetermined area.

36. The apparatus of claim 17, wherein the processing system is further configured to:

display the instruction target object on the screen of the display device, and wherein the substitute icon associated with the instruction target object is not displayed on the screen of the display device when the instruction target object is within the predetermined area.

37. The medium of claim 33, wherein the information processing program further causes the computer to:

display the instruction target object on the screen, wherein the substitute icon associated with the instruction target object is not displayed on the screen when the instruction target is within the predetermined area.

38. The medium of claim 1, wherein the processing system is further configured to:

display a first instruction target object on the screen, the first instruction target included in the plurality of instruction target objects, wherein the first instruction target object is associated with a first substitute icon that is among the plurality of substitute icons, wherein a first substitute icon is not displayed on the screen when the first instruction target is within the predetermined area.

* * * * *